United States Patent
Sidhu et al.

(10) Patent No.: US 9,351,203 B2
(45) Date of Patent: May 24, 2016

(54) VOICE CALL CONTINUITY IN HYBRID NETWORKS

(71) Applicant: Microsoft Corporation, Redmond, WA (US)

(72) Inventors: Gursharan Sidhu, Seattle, WA (US); Humayun Khan, Issaquah, WA (US); Tony Bell, Carnation, WA (US); Namendra Kumar, Redmond, WA (US); Sankaran Narayanan, Redmond, WA (US); Mahendra Sekaran, Sammamish, WA (US); Vishal Soni, Redmond, WA (US); John Bruner, Bellevue, WA (US); Jeffrey Kay, Bellevue, WA (US); Anish Desai, Bellevue, WA (US); Rod Fleck, Bellevue, WA (US); Abhilash Nair, Bellevue, WA (US); Gaurav Pancholi, Redmond, WA (US); Mansoor Jafry, Kirkland, WA (US); Ken Wolfe, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 97 days.

(21) Appl. No.: 14/026,933

(22) Filed: Sep. 13, 2013

(65) Prior Publication Data
US 2015/0078332 A1    Mar. 19, 2015

(51) Int. Cl.
*H04W 36/00* (2009.01)
*H04W 40/36* (2009.01)
*H04M 7/12* (2006.01)

(52) U.S. Cl.
CPC .......... *H04W 36/0066* (2013.01); *H04M 7/123* (2013.01); *H04M 7/1235* (2013.01); *H04W 36/0022* (2013.01); *H04W 40/36* (2013.01)

(58) Field of Classification Search
CPC .................................................. H04W 40/36
See application file for complete search history.

(56) References Cited

U.S. PATENT DOCUMENTS 6,148,206 A    11/2000    Karanja et al.
6,335,927 B1    1/2002    Elliott et al.
(Continued)

FOREIGN PATENT DOCUMENTS

CN    101656922 A    2/2010
EP    1432219 A1    6/2004
(Continued)

OTHER PUBLICATIONS

"Route to Home", Published on: Mar. 10, 2012, Available at: http://www.inovar.com/products/RouteToHome.html (1 page total).

(Continued)

*Primary Examiner* — Pao Sinkantarakorn
(74) *Attorney, Agent, or Firm* — Judy Yee; Micky Minhas

(57) ABSTRACT

Voice call continuity is provided for calls that are carried over a hybrid network infrastructure in which access connections are distributed over loosely coupled network portions including a backend network such as a core VoIP (Voice over Internet Protocol) service network, one or more cellular mobile networks, and a public switched telephone network ("PSTN"). The calls are routed through the core VoIP network regardless of their points of origination or termination in other network portions so that signaling and call context are anchored in the core VoIP network. The conditions under which user equipment operate are continuously monitored so that when a connection is determined to have been unacceptably degraded or is likely to be interrupted, and/or a more optimal connection is available, a handover of the call to another connection is initiated so that call continuity is maintained using the lowest cost connection that provides acceptable call quality.

20 Claims, 43 Drawing Sheets

(56) References Cited

U.S. PATENT DOCUMENTS

| | | |
|---|---|---|
| 6,343,220 B1 | 1/2002 | Van Der Salm |
| 6,490,449 B1 | 12/2002 | Thibert et al. |
| 6,518,957 B1 | 2/2003 | Lehtinen |
| 6,763,226 B1 | 7/2004 | McZeal, Jr. |
| 7,010,002 B2 | 3/2006 | Chow et al. |
| 7,110,750 B2 | 9/2006 | Oishi et al. |
| 7,411,911 B2 | 8/2008 | Huotari et al. |
| 7,483,984 B1 | 1/2009 | Jonker et al. |
| 7,631,270 B2 | 12/2009 | Cunningham et al. |
| 7,697,479 B2 | 4/2010 | Metke et al. |
| 7,706,291 B2 | 4/2010 | Luft et al. |
| 7,746,989 B2 | 6/2010 | Mazor |
| 7,796,998 B1 | 9/2010 | Zellner et al. |
| 7,830,863 B2 | 11/2010 | Biage et al. |
| 7,835,751 B2 | 11/2010 | Ibe |
| 7,894,807 B1 | 2/2011 | Drennan |
| 7,903,794 B1 | 3/2011 | Bales et al. |
| 7,986,943 B2 | 7/2011 | Bumiller |
| 7,995,565 B2 | 8/2011 | Buckley et al. |
| 8,000,710 B2 | 8/2011 | Jagadeesan et al. |
| 8,032,122 B2 | 10/2011 | Sigmund et al. |
| 8,126,465 B2 | 2/2012 | Lu et al. |
| 8,155,084 B2 | 4/2012 | Long et al. |
| 8,254,986 B2 | 8/2012 | Russell |
| 8,976,950 B2 | 3/2015 | Kramarenko |
| 9,001,787 B1 | 4/2015 | Conant |
| 2002/0059453 A1 | 5/2002 | Eriksson et al. |
| 2002/0146000 A1 | 10/2002 | Jonsson et al. |
| 2003/0231759 A1 | 12/2003 | Bedingfield, Sr. et al. |
| 2004/0047339 A1 | 3/2004 | Wang et al. |
| 2004/0121761 A1 | 6/2004 | Tripathy et al. |
| 2004/0203607 A1 | 10/2004 | Satapathy |
| 2004/0240430 A1 | 12/2004 | Lin et al. |
| 2005/0070291 A1 | 3/2005 | Shi |
| 2005/0186960 A1 | 8/2005 | Jiang |
| 2005/0249196 A1 | 11/2005 | Ansari et al. |
| 2005/0286466 A1 | 12/2005 | Tagg et al. |
| 2006/0029049 A1 | 2/2006 | Kobayashi et al. |
| 2006/0030357 A1 | 2/2006 | McConnell |
| 2006/0045069 A1 | 3/2006 | Zehavi et al. |
| 2006/0121902 A1 | 6/2006 | Jagadeesan et al. |
| 2006/0133582 A1 | 6/2006 | McCulloch |
| 2006/0187900 A1 | 8/2006 | Akbar |
| 2006/0198360 A1 | 9/2006 | Biage et al. |
| 2006/0245413 A1 | 11/2006 | Skalecki et al. |
| 2007/0070948 A1 | 3/2007 | Kezys et al. |
| 2007/0081518 A1 | 4/2007 | Jain et al. |
| 2007/0083918 A1 | 4/2007 | Pearce |
| 2007/0086584 A1 | 4/2007 | Rossini |
| 2007/0197224 A1 | 8/2007 | Winkler |
| 2007/0206568 A1 | 9/2007 | Silver |
| 2007/0206571 A1 | 9/2007 | Silver |
| 2007/0217366 A1 | 9/2007 | Sagi et al. |
| 2007/0263613 A1 | 11/2007 | Hara et al. |
| 2008/0026732 A1 | 1/2008 | Goldfarb |
| 2008/0032695 A1 | 2/2008 | Zhu et al. |
| 2008/0056235 A1 | 3/2008 | Albina et al. |
| 2008/0096560 A1 | 4/2008 | Felske et al. |
| 2008/0102815 A1 | 5/2008 | Sengupta et al. |
| 2008/0113683 A1 | 5/2008 | Paas |
| 2008/0123625 A1 | 5/2008 | Buckley |
| 2008/0192900 A1 | 8/2008 | Liu |
| 2008/0232352 A1 | 9/2008 | Terrill et al. |
| 2008/0242299 A1 | 10/2008 | Edwards |
| 2008/0254797 A1 | 10/2008 | Achtari et al. |
| 2008/0279176 A1 | 11/2008 | Cheng |
| 2009/0003316 A1 | 1/2009 | Lee |
| 2009/0086937 A1 | 4/2009 | Horn et al. |
| 2009/0097450 A1 | 4/2009 | Wallis et al. |
| 2009/0141682 A1 | 6/2009 | Zou et al. |
| 2009/0191876 A1 | 7/2009 | Jain et al. |
| 2009/0233602 A1 | 9/2009 | Hughes |
| 2009/0249247 A1 | 10/2009 | Tseng |
| 2009/0285175 A1 | 11/2009 | Nix |
| 2009/0305732 A1 | 12/2009 | Marcellino |
| 2010/0080128 A1 | 4/2010 | Hovey et al. |
| 2010/0124897 A1 | 5/2010 | Edge |
| 2010/0172323 A1 | 7/2010 | Rexhepi et al. |
| 2010/0172483 A1 | 7/2010 | Weiner |
| 2010/0226339 A1 | 9/2010 | Stephenson et al. |
| 2010/0246785 A1 | 9/2010 | Wang |
| 2010/0285785 A1 | 11/2010 | Wang |
| 2010/0304724 A1 | 12/2010 | Lawler |
| 2010/0316199 A1* | 12/2010 | Martin, II .................. 379/88.08 |
| 2011/0044293 A1 | 2/2011 | Nagasawa |
| 2011/0103576 A1 | 5/2011 | Partington et al. |
| 2012/0014273 A1 | 1/2012 | Notton et al. |
| 2012/0115490 A1 | 5/2012 | Nicholson |
| 2012/0120914 A1 | 5/2012 | Sedlacek et al. |
| 2012/0196644 A1 | 8/2012 | Scherzer et al. |
| 2012/0236868 A1 | 9/2012 | Yan |
| 2012/0296963 A1 | 11/2012 | Lu |
| 2013/0007286 A1 | 1/2013 | Mehta et al. |
| 2013/0035138 A1 | 2/2013 | Abbott |
| 2013/0064106 A1 | 3/2013 | Sylvain |
| 2013/0067056 A1 | 3/2013 | Purkayastha et al. |
| 2013/0100887 A1 | 4/2013 | Kim |
| 2013/0196706 A1 | 8/2013 | Patel et al. |
| 2013/0331101 A1 | 12/2013 | Thomas et al. |
| 2014/0068314 A1 | 3/2014 | Kim |
| 2014/0070991 A1 | 3/2014 | Liu |
| 2014/0254491 A1 | 9/2014 | Lindholm |
| 2014/0269495 A1 | 9/2014 | Frantz |
| 2015/0038156 A1 | 2/2015 | Kilpatrick, II |
| 2015/0065134 A1* | 3/2015 | Vandemoere et al. ......... 455/436 |

FOREIGN PATENT DOCUMENTS

| | | |
|---|---|---|
| EP | 1519526 A1 | 3/2005 |
| EP | 1858270 A1 | 11/2007 |
| EP | 2009887 A1 | 12/2008 |
| EP | 2096843 A2 | 9/2009 |
| EP | 2112849 A2 | 10/2009 |
| EP | 2271171 A1 | 1/2011 |
| JP | 2002-262336 A | 9/2002 |
| WO | 0013454 A1 | 3/2000 |
| WO | 02/11475 A1 | 2/2002 |
| WO | 2004/057845 A1 | 7/2004 |
| WO | 2005055626 | 6/2005 |
| WO | 2005101785 A1 | 10/2005 |
| WO | 2008110664 A1 | 9/2008 |
| WO | 2009040645 A1 | 4/2009 |
| WO | 2013025698 A1 | 2/2013 |

OTHER PUBLICATIONS

"Smart Call Routing", Retrieved on: Dec. 31, 2013, Available at: http://www.roamware.com/downloads/datasheets/Smart%20Call%20Routing.pdf (2 pages total).

"Roaming Call Optimizer", Published on: Mar. 22, 2011, Available at: http://www.starhome.com/call-optimization.html (1 page total).

"Optimal Call Routing", Retrieved on: Dec. 31, 2013, Available at: http://www.bics.com/content/ocr (2 pages total).

"Mobile Collaboration", Retrieved on: Dec. 31, 2013, Available at: http://www.cisco.com/en/US/docs/voice_ip_comm/cucm/srnd/collab09/mobilapp.htmln (39 pages total).

Kalmanek, et al., "A Network-Based Architecture for Seamless Mobility Services", In IEEE Communications Magazine, vol. 44, Issue 6, Jun. 2006 (7 pages total).

Salkintzis, et al., "Voice Call Handover Mechanisms in Next-Generation 3GPP Systems", In IEEE Communications Magazine, vol. 47, Issue 2, pp. 46-56, Feb. 2009 (11 pages total).

"Voice Call Flow Overview", 2007 Cisco Systems, Inc., pp. 1-14, Retrieved from: http://www.cisco.com/en/US/docs/ios/voice/monitor/configuration/guide/vt_callflow_ov.pdf, Retrieved on: Jun. 17, 2013 (14 pages total).

J. Rosenberg, "Interactive Connectivity Establishment (ICE): A Protocol for Network Address Translator (NAT) Traversal for Offer/Answer Protocols", IETF Trust (Apr. 2010), Retrieved from: http://www.rfc-editor.org/rfc/rfc5245.txt, Retrieved on: Sep. 12, 2013 (110 pages total).

(56) References Cited

OTHER PUBLICATIONS

M. Baugher, et al., "The Secure Real-time Transport Protocol (SRTP)", The Internet Society (Mar. 2004), Retrieved from: http://www.rfc-editor.org/rfc/rfc3711.txt, Retrieved on: Sep. 12, 2013 (53 pages total).
J. Rosenberg, et al., "SIP: Session Initiation Protocol", The Internet Society (Jun. 2002), Retrieved from: http://www.rfc-editor.org/rfc/rfc3261.txt, Retrieved on: Sep. 12, 2013 (252 pages total).
H. Schulzrinne, et al., "RTP: A Transport Protocol for Real-Time Applications", The Internet Society (Jul. 2003), Retrieved from: http://www.rfc-editor.org/rfc/rfc3550.txt, Retrieved on: Sep. 12, 2013 (98 pages total).
Bryan, et al., "SOSIMPLE: A SIP/SIMPLE Based P2P VoIP and IM System," Computer Science Department, College a of William and Mary, Williamsburg, VA, Retrieved from: http://www.enseirb.fr/~kadionik/sip/paper, Retrieved Date: Sep. 16, 2013 (6 pages total).
Rauhala, J., "Universal SIP client for consumer devices," Helsinki University of Technology, Department of Electrical Communications Engineering, Thesis submitted May 13, 2003, Retrieved from: http://scholar.google.com/url?sa=U&q=http://antoine.fressancourt.free.fr/exjobb/BX_Universal, Retrieved Date: Sep. 16, 2013 (64 pages total).
Santos, et al., "Deployment of a Wireless Hybrid and Mobile Network for VoIP Services Based on Open Source Software," Universidade Federal de Campina Grande, Retrieved From: http://www.inf.int-evry.fr/~olberger/wfs2006/danilo, Retrieved Date: Sep. 16, 2013 (20 pages total).
"International Search Report and Written Opinion Received for PCT Patent Application No. PCT/US2014/068685", Mailed Date: Feb. 11, 2015, 7 pages.
"International Search Report and Written Opinion Issued in PCT Patent Application No. PCT/US2014/054633", Mailed Date: Dec. 16, 2014, 10 Pages.
Achour et al., "Inter-Domain Mobility Management Solution for Service Continuity in IMS-Based Networks", IEEE Consumer Communications and Networking Conference, Jan. 14, 2012, pp. 559-564, 6 pages.
Bellavista, et al., "An IMS Vertical Handoff Solution to Dynamically Adapt Mobile Mulitmedia Services", IEEE Symposium on Computers and Communications, Jul. 6, 2008, pp. 764-771, 8 pages.
Whitwam, Ryan, "Republic Wireless Moto X Review: A Great Deal with Very Few Compromises", Published on: Dec. 4, 2013, Available at: http://www.androidpolice.com/2013/12/03/republic-wireless-moto-x-review-a-great-deal-with-very-few-compromises/ (12 pages total).
Perenson, Melissa, "Republic Wireless: Everything You Need to Know", Published on: Aug. 28, 2013, Available at: http://blog.laptopmag.com/republic-wireless-faq (6 pages total).
"ip4calls-iTelHybridDialer", Published on: Jul. 17, 2013, Available at: https://play.google.com/store/apps/details?id=com.revesoft.hybriddialer.first_united_international_general_trading_ip4calls&hl=en (2 pages total).
Whitwam, Ryan, "A Google Engineer Explains Why KitKat has White Status Bar Icons and Only Shows Connectivity in Quick Settings", Published on: Nov. 18, 2013, Available at: http://www.androidpolice.com/2013/11/18/a-google-engineer-explains-why-kitkat-has-white-status-bar-icons-and-only-shows-connectivity-in-quick-settings/ (9 pages total).
Ormond, et al., "Dynamic Network Selection in Wireless LAN/MAN Heterogeneous Networks", In Proceedings of Mobile WiMAX: Towards Broadband Wireless Metropolitan Area Networks, Dec. 10, 2007, (60 pages total).
Alkhwlani, et al., "Access Network Selection using Combined Fuzzy Control and MCDM in Heterogeneous Networks", In Proceedings of International Conference on Computer Engineering & Systems, Nov. 27, 2007, (6 pages total).
Porjazoski, et al., "Radio Access Technology Selection in Heterogeneous Wireless Networks Based on Service Type and User Mobility", In Proceedings of 18th International Conference on Systems, Signals and Image Processing, Jun. 16, 2011, (4 pages total).
Adamopoulou, et al., "Intelligent Access Network Selection in Heterogeneous Networks", In 2nd International Symposium on Wireless Communication Systems, Sep. 7, 2005, (5 pages total).
Alkhawlani, et al., "Hybrid Approach for Radio Network Selection in Heterogeneous Wireless Networks", In International Journal of Advanced Science and Technology, vol. 44, Jul. 2012, (16 pages total).
Cai, et al., "Dynamic and User-Centric Network Selection in Heterogeneous Networks", In Proceedings of IEEE International Performance, Computing, and Communications Conference, Apr. 11, 2007, (7 pages total).
Gharsellaoui, et al., "Optimizing Access Point Selection in Wireless Local Area Networks", In Proceedings of International Conference on Communications and Information Technology, Mar. 29, 2011, (6 pages total).
Jafry, et al., "Call Handoff Initiation in Hybrid Networks", U.S. Appl. No. 14/144,668, filed Dec. 31, 2013.
Calhan, et al., "An Adaptive Neuro-Fuzzy Based Vertical Handoff Decision Algorithm for Wireless Heterogeneous Networks", In IEEE 21st International Symposium Personal Indoor and Mobile Radio Communications, Sep. 26, 2010, (6 pages total).
Yan, et al., "A Survey of Vertical Handover Decision Algorithms in Fourth Generation Heterogeneous Wireless Networks", In Computer Networks: The International Journal of Computer and Telecommunications Networking, vol. 54, Issue 11, Aug. 2010, (16 pages total).
Liu, et al., "Performance Analysis and Optimization of Handoff Algorithms in Heterogeneous Wireless Networks", In IEEE Transactions on Mobile Computing, vol. 7, Issue 7, Jul. 2008, (12 pages total).
Wong, et al., "A Pattern Recognition System for Handoff Algorithms", In IEEE Journal on Selected Areas in Communications, vol. 18, Issue 7, Jul. 2000, (12 pages total).
Nelson, et al., "Hybrid Telecommunications Network Connection Indicator", U.S. Appl. No. 14/220,071, filed Mar. 19, 2014.
"International Search Report and Written Opinion Issued in PCT Patent Application No. PCT/US2015/020848", Mailed Date: Jun. 9, 2015, (11 Pages total).
"International Search Report & Written Opinion Received for PCT Application No. PCT/US2015/023453", Mailed Date: Jun. 22, 2015, (12 Pages total).
"International Preliminary Report on Patentability Issued in PCT Application No. PCT/US2014/068685", Mailed Date: Jun. 26, 2015, (6 Pages total).
"International Search Report and Written Opinion Issued in PCT Application No. PCT/US2015/39310", Mailed Date: Oct. 14, 2015, (10 Pages total).
"International Search Report and Written Opinion Issued in PCT Application No. PCT/US2015/028679", Mailed Date: Aug. 26, 2015, (11 Pages total).
"International Preliminary Report on Patentability Issued in PCT Application No. PCT/US2014/054633", Mailed Date: Aug. 21, 2015, 6 Pages total.
Ryan Whitman, "A Google Engineer Explains Why KitKat Has White Status Bar Icons and Only Shows Connectivity in Quick Settings", available at <http://www.androidpolice.com/2013/11/18/a-goog le-eng ineer-explains-why-kitkat-has-wh ite-status-baricons-and-only-shows-connectivity-in-quick-settings/>, available on Nov. 18, 2013, (3 pages total).
International Search Report and Written Opinion Issued in PCT Application No. PCT/US2015/056290, Mailed Date: Feb. 1, 2016, (15 Pages total).
Second Written Opinion Issued in PCT Application No. PCT/US2015/023453, Mailed Date: Mar. 1, 2016, (6 Pages total).

\* cited by examiner

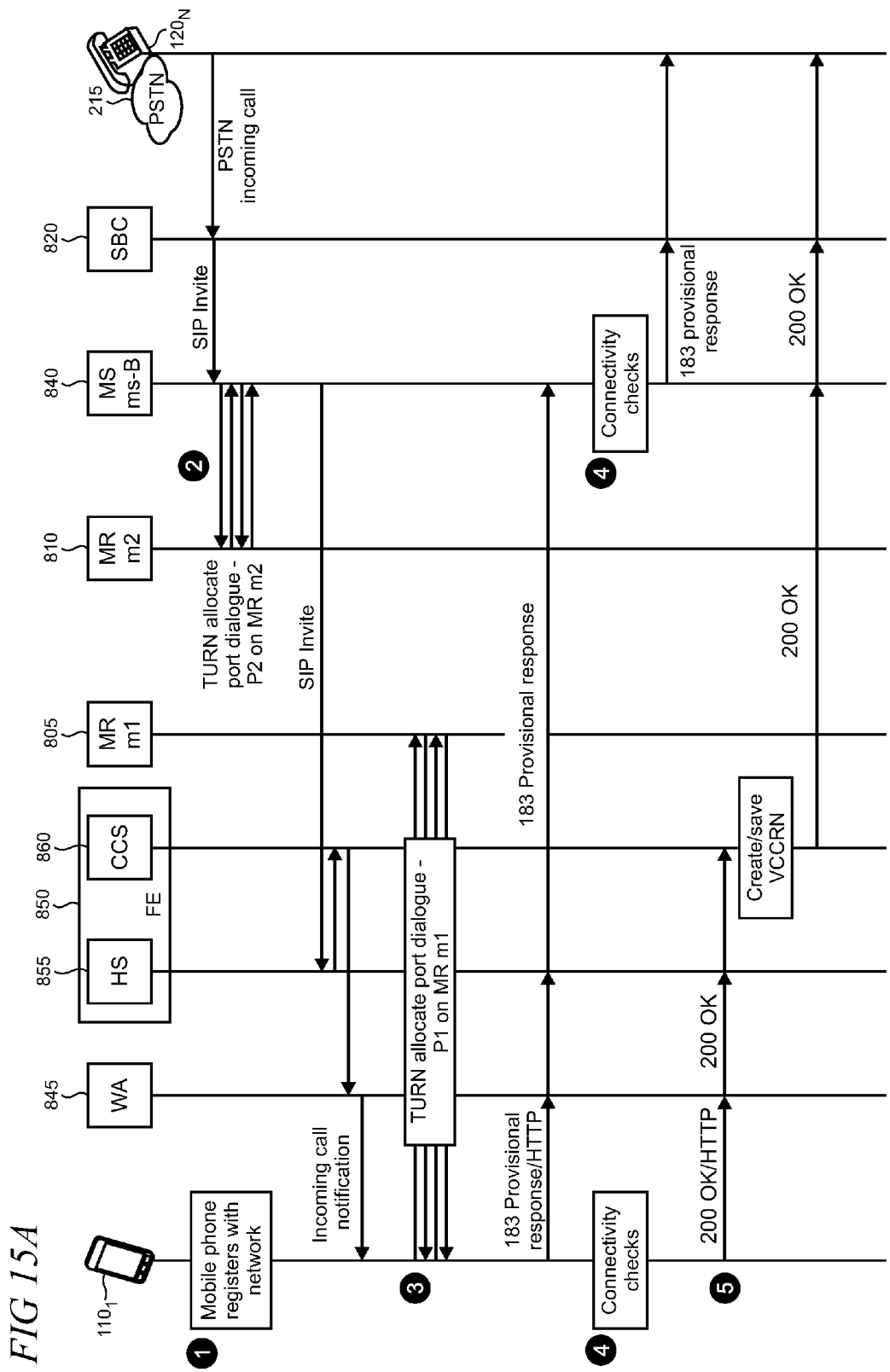

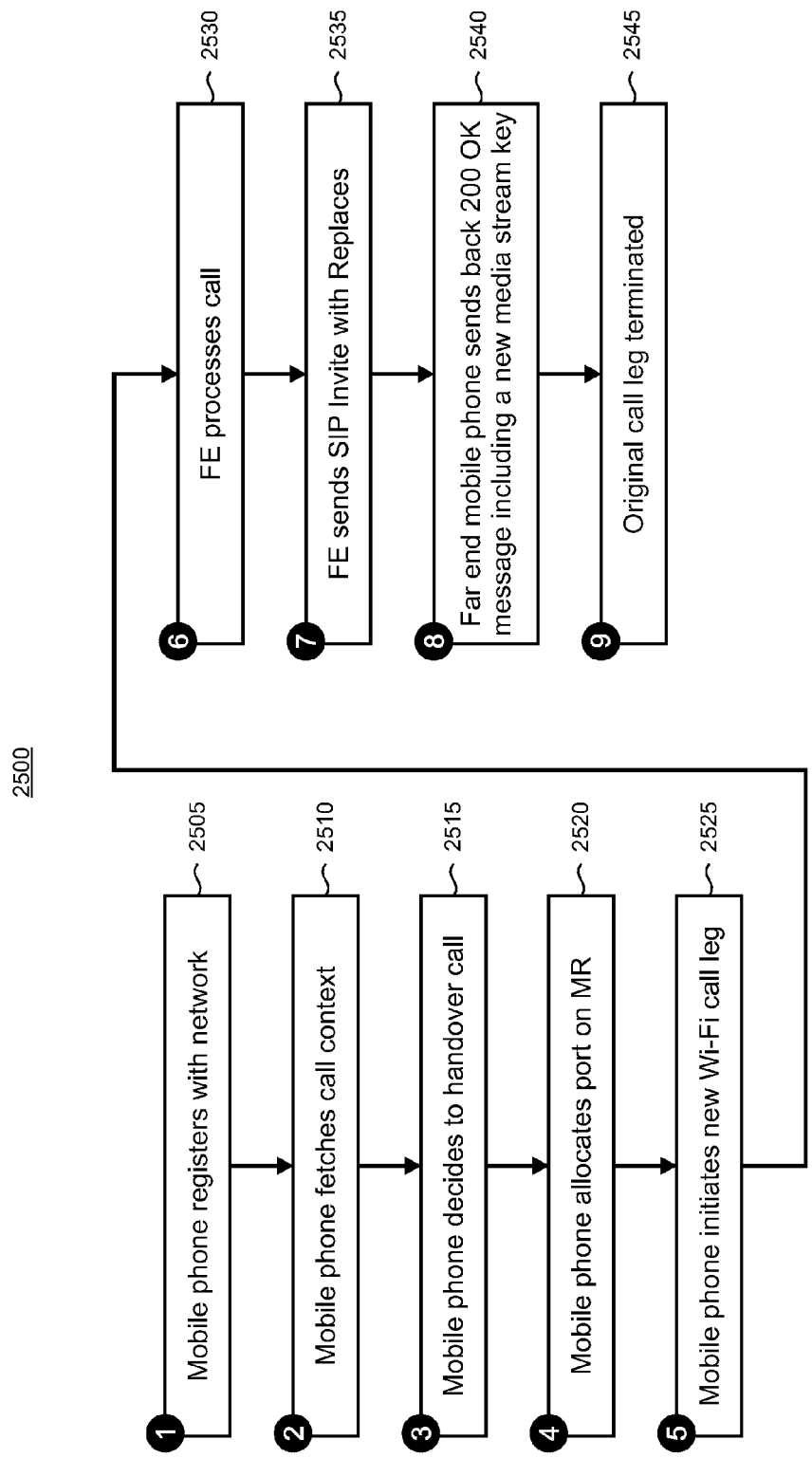

VOICE CALL CONTINUITY IN HYBRID NETWORKS

BACKGROUND

Wi-Fi data packet connectivity is anticipated to increasingly become a lower-cost connection alternative to traditional cellular networks for mobile devices such as cell phones and smartphones that will enhance coverage and economy of voice calls and other multimedia communication services. Availability of high-quality Wi-Fi from the home, work, and public places offers the prospect of a seamless user experience even in cases of user mobility and environmental changes so that calls can proceed with user-acceptable call continuity.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Voice call continuity is provided for calls that are carried over a hybrid network infrastructure in which access connections are distributed over loosely coupled network portions which may include a backend network such as a core VoIP (Voice over Internet Protocol) service network, one or more Wi-Fi networks, one or more cellular mobile networks, and a public switched telephone network ("PSTN"). The calls are routed through the core VoIP network regardless of their points of origination or termination in other network portions so that media, signaling, and call context are anchored in the core VoIP network. The conditions under which user equipment (such as smartphones and other devices that have the capability to use multiple connection types such as Wi-Fi, circuit-switched voice, and packet-switched data connections) operate are continuously monitored so that when a connection is determined to have been unacceptably degraded, is likely to be interrupted, and/or a more optimal connection is available (e.g., one that is less expensive, more reliable, higher quality, provides additional features such as high-definition ("HD") audio, etc.), a handover of the call to another connection is initiated so that call continuity is maintained using the lowest cost connection that provides acceptable call quality.

In an illustrative example, an alternative connection is first selected and a new call leg is created over the alternative connection which is associated with the original ongoing call. When the new call leg is stable, the original call leg is removed from the call and the handover to the new connection is completed. In some implementations, the new call leg is set up while the original call leg is still operating so that parallel media paths are in place simultaneously. In this intermediate state, media flows can be directed to and from the user equipment over the parallel media paths until one of the two flows is terminated. Such simultaneous operation enables the call to be maintained without any perceived interruption during the handover. In other implementations, for example when only one of two network connections may be operated at a time, then parallel media paths may not be simultaneously opened so a handover may possibly cause a perceived interruption in the call. However, application of the present voice call continuity techniques to this situation will ensure that the call is not dropped and will resume to a normal operating state once the handover is complete.

Each call to and from a given user equipment is assigned a voice call continuity ("VCC") identifier by a service running in the core VoIP network. The VCC identifier functions to associate all the call legs relating to a particular call during a handover and thus may be saved with the context for each call, both in the network and locally on the user equipment. The VCC identifier can take the form of a conventional telephone number or a URI/URL (Universal Resource Identifier/Uniform Resource Locator). The VCC identifier is unique for each call to and from the user equipment, including active and on-hold calls, so that one unique VCC identifier may be used, for example, for an active call, and another unique VCC identifier may be used for an on-hold call. Since the calls are anchored in the core VoIP network, for example via media servers including media relays or conference bridges, the user equipment can discover the VCC identifier as it interacts with the network—either during call setup, during registration with the core VoIP network, or in response to a request made prior to handover initiation.

The VCC identifier is used to enable the new call leg's media stream to be connected to the same port on a media relay in the core VoIP network as the original call leg when a handover is initiated. In an illustrative example in the case of a handover from a Wi-Fi connection to a cellular voice (i.e., circuit-switched or "CS") connection, the VCC identifier, here in the form of a telephone number, is used by the user equipment as the called party number when setting up the new call leg. The VCC identifier is purposely selected to be capable of communication in a field suitable for a telephone number. It could, for example, be selected using the format of a telephone number that is associated with the core VoIP network. In some cases, the VCC identifier may be implemented as a telephone number that is conventionally routable by the cellular network. In other cases, the VCC identifier may be implemented as a telephone number that is not conventionally routable by the cellular network.

The core VoIP network recognizes the VCC identifier and associates it with the original call leg. This enables the new call leg that is accessing the hybrid network using the CS connection to be routed back through the core VoIP network so that the network is anchoring both the original call leg and new call leg. The core VoIP network can then ensure security of the end-to-end media flow with the new call leg before the original call leg is terminated to complete the handover. In the event that the original call leg is dropped after the new call leg creation is initiated, the call is sustained by holding media relay ports in their current state for a certain time interval after the original call leg is dropped. This prevents the overall call from being dropped during a potential call handover.

The decision to perform a handover may be made by the user equipment or within the core VoIP network portion of the hybrid network. The decision to initiate handover for a call may be made based on an assessment of various parameters, such as connection, network, or environmental conditions observed by the user equipment or by network elements in the core VoIP network. Location and location history may also be utilized as handover decision parameters in some cases. The call handover can be initiated by the user equipment or alternatively by the core VoIP network (and in some cases by the user equipment in consultation with the VoIP network).

The anchoring of the media path in the core VoIP network enables the delivery of a variety of mid-call treatments to be implemented such as the insertion of audible indications and audio capture and playback.

Advantageously, even if a current connection from the user equipment suddenly degrades or fails, the present call handover techniques may be used to ensure that the call is maintained when connectivity again becomes satisfactory. If the drop-off occurs during a call handover, then such maintenance is implemented in the core VoIP network—the new call leg is enabled and the call reconnection is enabled through use of the VCC identifier, the anchoring of the call media, as well as the signaling state in the network. For other call drop-offs, the network sustains the call until the equipment can re-associate with the ongoing call when connectivity becomes available again.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 15A and 15B show an illustrative call flow for an initial call setup in which a call is terminated by a mobile phone on a Wi-Fi connection;

FIG. 25 shows a flowchart for an illustrative immediate state of call handover from a CS service on an MO network to a VoIP network;

Like reference numerals indicate like elements in the drawings. Elements are not drawn to scale unless otherwise indicated.

DETAILED DESCRIPTION

Voice call continuity functionality is defined here as the maintenance of ongoing voice calls for a device that is capable of placing and receiving voice calls in the face of changes in prevailing connection conditions perhaps due to user mobility or other environmental factors. For example, the connection currently being used, such as Wi-Fi under IEEE (Institute of Electrical and Electronic Engineers) 802.11, could start demonstrating worsening radio signal and/or network congestion conditions, or the user could move to a location where the Wi-Fi connection does not work at all. In addition, other connection options may become available that are lower cost, or provide a better user experience, and therefore either or both the user and network operator may wish to utilize such connection options.

In typical implementations, the two goals of the present voice call continuity are to: 1) maintain call continuity so that an ongoing voice call is sustained in the face of changing connection conditions; and 2) use the lowest cost connection option so that a call is moved (referred to here as handover or hand off) to the lowest cost viable connection. Generally, it is desirable to implement solutions to achieve these goals so that a user at the far end of a given call does not hear or otherwise perceive an interruption during handover. In addition, it is typically desirable that the underlying network be aware of call handover events so that they can be recorded for various operational needs, and to provide support to users who may be experiencing problems or service issues. Records may also be utilized to document call related events in order to accurately capture information that may be needed for usage, billing, settlement/reconciliation, or support purposes. In typical telecommunication environments such records are commonly referred to as initial Call Detail Records ("CDRs").

Figure 1:
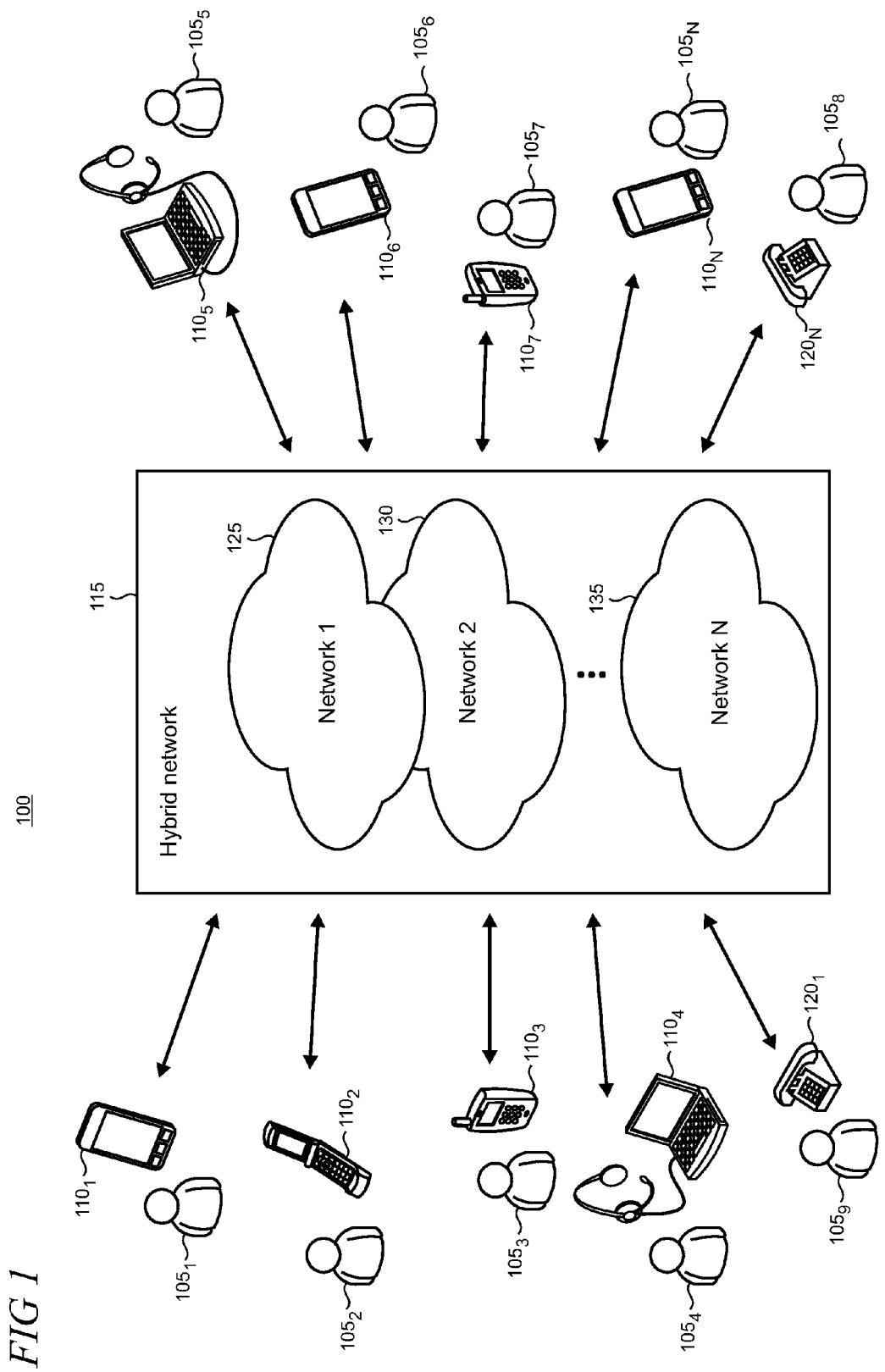
FIG. 1 shows an illustrative telecommunications environment in which devices having telephony capabilities communicate over a hybrid network.

Turning now to the drawings, FIG. 1 shows an illustrative telecommunications environment 100 in which various users 105 employ respective devices 110 that communicate over a hybrid telecommunications network 115. The devices 110 provide voice telephony capabilities, typically in addition to various other features. The devices 110 may include, for example, user equipment, mobile phones, cell phones, and smartphones which users often employ for voice calls. However, alternative types of electronic devices are also envisioned to be usable within the telecommunications environment 100 so long as they are configured with telephony capabilities and can connect to the hybrid network 115, as described in more detail below. Such alternative devices variously include handheld computing devices, PDAs (Personal Digital Assistants), portable media players, wearable computers, navigation devices such as GPS (Global Positioning System) systems, laptop PCs (personal computers) desktop computers, multimedia consoles, gaming systems, or the like. In the discussion that follows, the use of the term "mobile phone" is intended to cover all devices that are configured with telephony capabilities and are capable of wireless connectivity to the hybrid network 115.

Other types of telephony equipment may also be present in the telecommunications environment 100 such as conventional desktop phones 120 which are operatively coupled to a public switched telephone network ("PSTN"). Other examples may include equipment that connects to the PSTN using private branch exchanges ("PBXs") and equipment coupled to call services that are accessed using telephone numbers. This other telephony equipment may still be utilized in various scenarios involving voice call continuity, even though it might not implement voice call continuity functionality itself. For example, a mobile phone 110 may make or receive a call to a desktop phone 120 and employ voice call continuity as the prevailing connection conditions change such as the mobile phone user moving from a car to home during the call.

The hybrid network 115 comprises several networks 1, 2 ... N, identified in FIG. 1 by reference numerals 125, 130, and 135, respectively. Typically, the various networks will be accessed using different types of wireless connections including Wi-Fi, cellular packet-switched ("PS") data, or cellular circuit-switched ("CS"). Thus, the networks in the hybrid network 115 typically include a Voice over Internet Protocol ("VoIP") network and a mobile operator ("MO") network which typically includes an access network portion and a core network portion that provides for switching, routing, transport and other functionalities. A PSTN may also be included as part of the hybrid network in some implementations, as discussed in more detail below.

Each mobile phone 110 will typically have a prearranged association with one or more of the networks underlying the hybrid network 115. For example, a user 105 will typically be a subscriber to a cellular telephone service so that the user's mobile phone 110 can access a given cellular network as valid and authenticated user equipment. Similarly, the mobile phone 110 may include functionality and credentials to access a Wi-Fi network. The mobile phones 110 may also be provided with voice call continuity functionality and interoperate with a core VoIP network (shown below in FIG. 5) according to a prearranged association. Such mobile phones are termed "VCC-equipped" in the description below.

Figure 2:
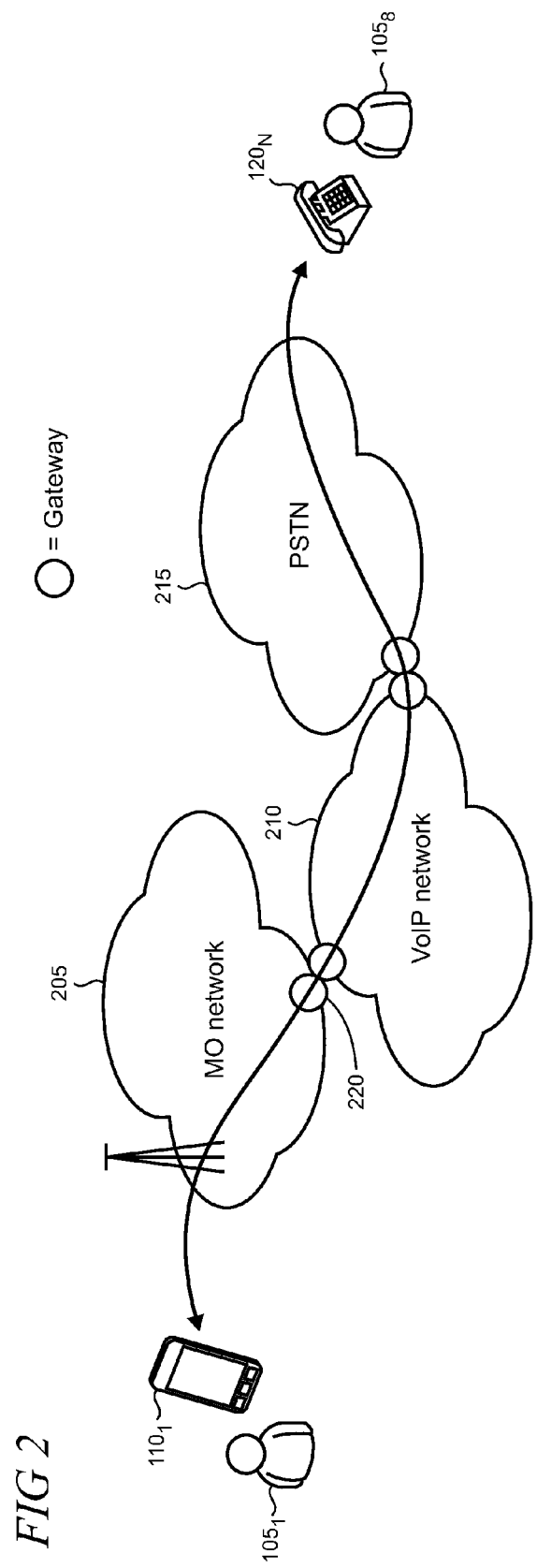
FIG. 2 shows an illustrative example in which a call is carried over multiple types of telecommunications networks.

A characteristic of the hybrid network 115 is that two or more of the underlying networks (e.g., networks 125, 130, 135) are considered loosely coupled. That is, in one illustrative example, the VoIP network and the MO network are typically operated independently so that one network cannot exercise significant or substantial control over the operation of the other. However, as shown in FIG. 2, the underlying networks while loosely coupled are still interoperable so that calls can traverse an MO network 205, VoIP network 210, and PSTN 215. Such interoperability is commonly facilitated using gateways, as representatively indicated by reference numeral 220. It is becoming increasingly common for significant portions of a given call to be transported over the VoIP network 210 because such networks can often provide very high quality transportation at the lowest cost to the network operators. In such cases, the MO network 205 and the PSTN network 215 essentially function as access networks to the mobile phone/equipment at each end of the call while the VoIP network 210 performs the bulk of the routing and transport for the call. Other access networks may also be utilized in order for a call to reach the VoIP network 210 including both cellular circuit-switched and packet-switched networks, and Wi-Fi access points such as public Wi-Fi "hotspots" and those provided by home and office Internet Service Providers ("ISPs").

While such hybridization can provide cost-effective and high quality transport, the loose coupling has traditionally presented difficulties for voice call continuity. In this case, parts of the hybrid network 115, such as the cellular MO network, are not generally controllable by the mobile phone or the rest of the hybrid network. As a result, previous solutions for voice call continuity typically involved some form of user intervention and have often resulted in some form of call interruption or other type of degraded user experience. Such intervention often necessitates that the user be aware that connection options are changing and therefore make a proactive request that the ongoing call be handed over to a different available connection. For example, a user would traditionally need to proactively implement a handover from a Wi-Fi to a cellular connection (e.g., cellular voice or cellular data), or vice versa, in order to ensure voice call continuity. Because these traditional solutions depend on the user to initiate the call handoff, there is often a high risk that the call could be dropped altogether if the initiation occurs at the wrong time.

Figure 3:
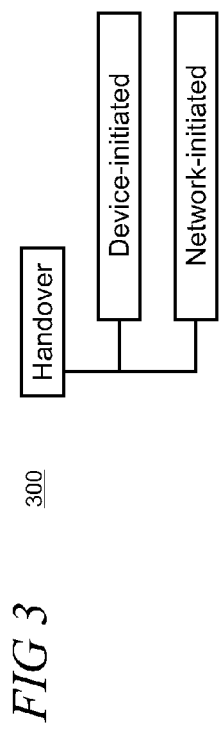
FIG. 3 shows an illustrative taxonomy of two handover types.

The present voice call continuity may enable handover to be implemented automatically and transparently to the user as conditions change in typical usage scenarios. A mobile phone's environment is continually monitored so that uninterrupted calls may be provided over the lowest cost available connection. When the monitoring indicates that the conditions are such that the connection is likely to degrade unacceptably or be interrupted in the imminent future, or when a less expensive or more reliable connection is available (and/or a connection having a desirable feature such as HD audio is available), a handover of the call to such a connection is initiated. As shown in the illustrative taxonomy 300 in FIG. 3, the decision to initiate handover to another connection may typically be made by the device (e.g., the mobile phone), however in some cases the handover may be initiated in a network (e.g., the VoIP network), or using techniques in which the handover decision is implemented using a combination of network and device decision making or initiation. Primarily for reasons of unpredictable latency in call setup over a cellular network, there may be advantages to the handover decision being device-initiated in many implementations. Generally, a connection is selected that meets the two goals noted above in most cases—maintaining call continuity using the lowest cost connection.

Figure 4:
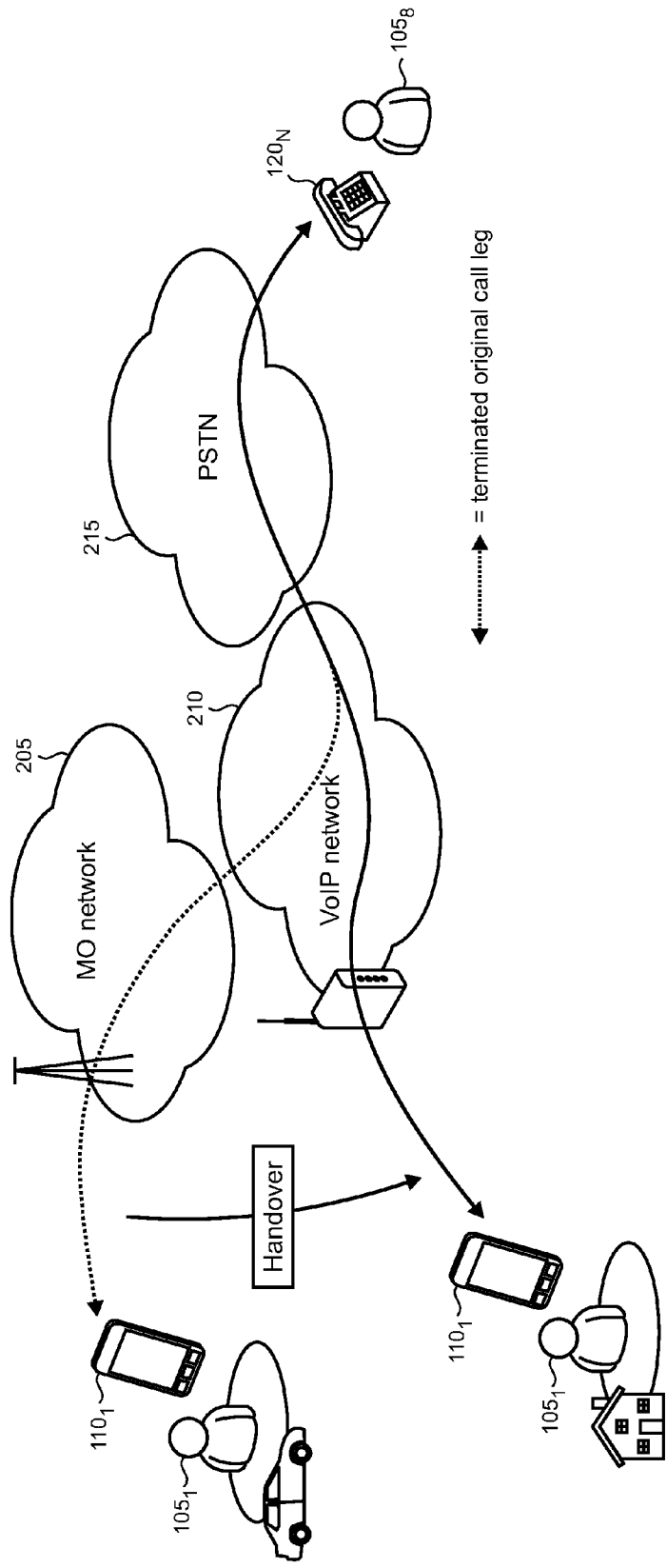
FIG. 4 shows an illustrative example in which a call is handed over between two different networks.

For example, as shown in FIG. 4, a user 105 may be in the car when initiating a call over the MO network 205. When the user 105 returns home, another call leg is then created over a selected connection which in this example is the home Wi-Fi connection to the VoIP network 210. The selected connection is associated with the call, preferably while the original call is still ongoing (in what is termed a "make-before-break" handover). When the new call leg is stable, the original call leg is removed from the call and the handover to the new connection is complete.

If the handover is initiated so that both the original and newly selected connections are operative simultaneously then there will be an intermediate state in which both call legs will be running in parallel. Media flows can be directed to and from the mobile phone over these parallel connections, until one of the two flows is terminated. Such intermediate state enables the call to be maintained in an uninterrupted manner as perceived by the parties on both ends of the call. During the intermediate state, the mobile phone can typically choose to connect to one of the two flows as it deems appropriate.

In some implementations only one of the two connections can be operated at a time. For example, with some CDMA (Code Division Multiple Access) networks (e.g., 3GPP2 EVDO (Enhanced Voice Data Optimized)) only one of the two cellular connections CS or PS can be used at a time. Here, a "break-before-make" handover is implemented in which an interruption will typically occur that may be perceived by the user or far end party. However, the present voice call continuity techniques will still ensure that the call is not dropped and it will resume to its normal state after the handover is completed.

Figure 5:
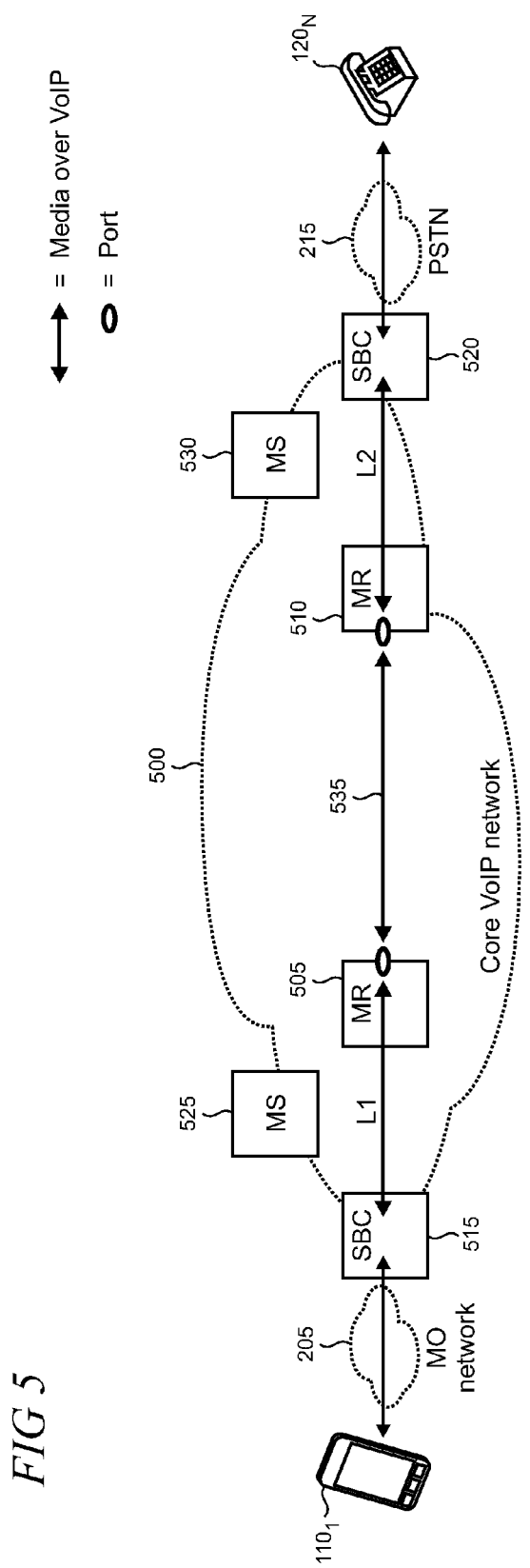
FIG. 5 shows an illustrative core VoIP (Voice over Internet Protocol) network in which portions of a call are anchored in the network using media servers such as media relays.

The present voice call continuity utilizes features provided from a backend network such as a core VoIP network 500 as shown in FIG. 5. In particular, calls to and from VCC-equipped phones have their media streams anchored in the core VoIP network 500 regardless of their origination or termination in other networks. This means that the MO network will route all calls to the VCC-equipped mobile phones to the core VoIP network 500, as described in more detail below. Such anchoring enables controlling the call for voice call continuity purposes and for providing additional mid-call treatments as described below in the text accompanying FIG. 33. Other benefits not discussed in detail here include implementation of intercept capability in accordance with various legal requirements and generation of CDRs. While a core VoIP network is shown in FIG. 5, it is emphasized that any of a variety of network types may be utilized for the backend network, in various combinations, including Wi-Fi, mobile cellular networks (including circuit and packet-switched), circuit-switched voice networks, PSTNs, and the like.

As shown, the core VoIP network 500 includes media relays ("MR") 505 and 510 which are employed as anchor points for the media streams including the two legs of the call, L1 and L2. Alternative network elements which may provide the anchoring function include other types of media servers such as conference bridges. A session border controller ("SBC") server 515 operates as a gateway with the MO network 205 for both media and signaling planes. Similarly, an SBC server 520 operates as a gateway with the PSTN 215 in this example.

Call signaling (not shown for sake of clarity in FIG. 5) may be processed in the core VoIP network 500 using mediation servers ("MS") 525 and 530. A mediation server is a signaling plane element that buffers the differences in capability between the core VoIP network 500 and the SBC servers. In some instances MS can also provide media plane functionality to mediate the differences between the VoIP network core and SBC server. The call leg from the mobile phone over IP to the media relay will generally be over an unmanaged network and thus be of unpredictable quality. It is thus generally desirable to choose a media relay that is relatively close to the mobile phone. The portion between media relays, indicated by reference numeral 535 in FIG. 5 will normally be over a managed and secure network which will offer better delay/jitter, congestion, reliability, and security characteristics.

Figure 6:
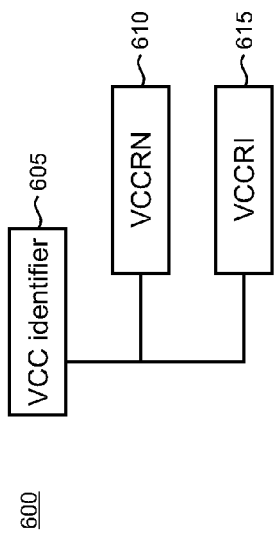
FIG. 6 is an illustrative taxonomy of a voice call continuity ("VCC") identifier.

The core VoIP network 500 is arranged to interoperate with special voice call continuity capabilities that are instantiated in VCC-equipped mobile phones 110. More specifically, each call for a particular mobile phone is assigned a VCC identifier upon the call's creation by a call continuity service ("CCS") that operates in the core VoIP network 500, as described in more detail below. As shown in the taxonomy 600 in FIG. 6, the VCC identifier 605 may take a variety of forms. For example, it may have the form of a VCC routing number ("VCCRN"), as indicated by reference numeral 610 or a VCC resource identifier ("VCCRI"), as indicated by reference 615. The VCCRN and VCCRI are functionally equivalent and differ only in form. The VCCRN has the format of a telephone number such as an MSISDN (Mobile Station International Subscriber Directory Number) number, while the VCCRI has the form of a URI (Uniform Resource Identifier), for example an E.164 number under the ITU-T (International Telecommunications Union Telecommunication Standardization Sector). In the discussion that follows the term VCCRN is consistently utilized when referring to the VCC identifier. However, which equivalent form of the identifier is applicable will be apparent from the context of the discussion.

The VCC identifier 605 is used to associate all the various call legs pertaining to a given call which are created for that mobile phone during the call continuity and handover procedures. For example, for the purpose of call handover, when a new mobile phone call leg is generated, the new call leg is associated with the same value of the VCCRN as the original call leg for the mobile phone. The VCCRN is unique for each call to a given mobile phone, which may be simultaneously executing, and also over a guard time interval to ensure uniqueness among the mobile phone's calls. Although the VCCRN can take the form of an MSISDN telephone number, it typically does not need to be routable over the PSTN and thus is not included in the LERG (Local Exchange Routing Guide) or BIRRDS (Business Integrated Routing and Rating Database System) databases. However, in alternative implementations the VCCRN may be included in such databases in scenarios in which the VCCRN is a routable telephone number that is associated with the core VoIP network 500.

Figure 7:
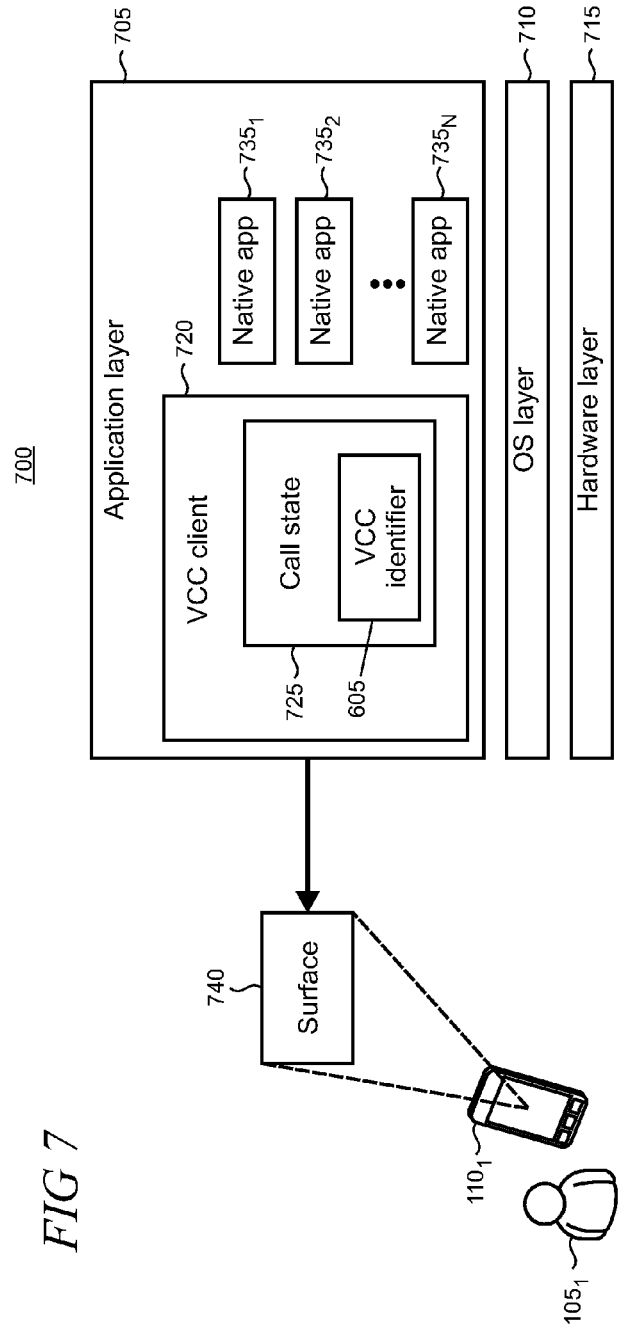
FIG. 7 is an illustrative software architecture that supports a VCC application.

FIG. 7 shows an illustrative architecture 700 of functional components that may be instantiated on a given mobile phone 110. The architecture 700 is typically implemented in software, although combinations of software, firmware, and/or hardware may also be utilized in some cases. The architecture 700 is arranged in layers and includes an application layer 705, an OS (operating system) layer 710, and a hardware layer 715. The hardware layer 715 provides an abstraction of the various hardware used by the mobile phone 110 (e.g., input and output devices, networking hardware, etc.) to the layers above it.

The application layer 705, in this example, supports a VCC client 720 that supports VCC functionality, including for example VCC identifier 605 discovery during the mobile phone's interaction with the core VoIP network 500, for example during the call's signaling or upon request when the phone has IP connectivity. The VCC client 720 may store the VCC identifier 605 in order to maintain a local call state, as indicated by reference numeral 725. The VCC client 720 may also include functionality and logic to make device-initiated handover decisions. Handover decisions typically comprise evaluating a variety of parameters related to the expected call quality for each connection including radio/network and call quality characteristics at the present time and a prediction of the parameters' state in the near future. Traffic and loading conditions may also be evaluated. In addition, environmental factors such as sensed user-activity state and ambient conditions can also be factored into the evaluation, as well as history of usage patterns for the mobile phone's user and the phone's location. When this evaluation indicates that a handover should be performed, then the new connection is selected and the handover process initiated.

While the VCC client 720 resides in the application layer 705 in this illustrative example, in alternative arrangements the VCC client may be incorporated in the OS layer 710 or hardware layer 715, or its functionality distributed across layers. As shown in FIG. 7, the application layer 705 also supports a variety of native applications $735_{1, 2 \ldots N}$ that are generally implemented using locally executing code for the most part. In some cases, however, the native applications 735 may also rely on services and/or remote code execution provided by remote servers. A surface component 740, in typical implementations, is exposed by the OS layer 710 and/or hardware layer 715 so that the applications can draw a user interface ("UI") including various user controls that may be rendered on the display screen of the computing device 110. With some devices, the display operates as a touchscreen.

A discussion of three groups of handovers in which voice call continuity is maintained is now presented. The first group is IP to CS handover, the second group is CS to IP handover, and the third group is IP to IP handover. In the first group of IP to CS handover, there are two sub-cases including Scenario A (Wi-Fi to CS) and Scenario A' (PS to CS). In Scenario A, a mobile phone user in a voice call over a Wi-Fi connection, for example at home or in the office, is leaving to drive to another location, but wants to continue with the call. The call is automatically handed over to the phone's cellular CS connection. In Scenario A', this type of handover is used when the user moves to a location where the PS connection will not provide acceptable call quality or there is a high risk of the connection being dropped. Although this might seem very similar to scenario A, there are special challenges in the case of some CDMA networks where the mobile phone cannot simultaneously use both CS and PS connections, as noted above.

In the second group of CS to IP handover, there are two sub-cases including Scenario B (CS to Wi-Fi) and Scenario B' (CS to PS). In Scenario B, a mobile phone user in a call over a CS connection moves into an area that has good Wi-Fi coverage, such as at home or in the office. The call is handed over to use the less expensive Wi-Fi alternative. In Scenario B', a mobile phone user in a call over a CS connection moves into an area where PS is known to provide acceptable quality for VoIP service. In this situation, it will typically be beneficial to hand over the call to the cheaper PS alternative. However, in the case of some CDMA networks this scenario presents challenges similar to those for Scenario A' and may indeed be worse since it may not be possible to determine if the PS connection can be used for the call handover.

In the third group of IP to IP handover, there are three sub-cases including Scenario C (PS to Wi-Fi), Scenario C' (Wi-Fi to PS), and Scenario C" (Wi-Fi to Wi-Fi). Scenario C is the same as Scenario B except that the handover is performed from a PS connection. Scenario C' is the same as Scenario A except that the less expensive connection provided by PS is used instead of CS. Scenario C" is one in which Wi-Fi to Wi-Fi handover may be performed, for example in cases where one Wi-Fi connection degrades as a user changes location and another acceptable Wi-Fi connection is available.

The three handover groups are summarized in the Table below in which the rows correspond to the original call leg and the columns are the new call leg to which the call is to be handed over.

TABLE

|    |                   | IP             |                    | CS                     |
|----|-------------------|----------------|--------------------|------------------------|
|    |                   | VoIP/<br>Wi-Fi | VoIP/<br>Cell-Data | Cellular Voice<br>(CS) |
| IP | VoIP/Wi-Fi        | X              | X                  | X                      |
|    | VoIP/Cell-Data    | X              |                    | X                      |
| CS | Cellular Voice (CS) | X            | X                  |                        |

Figure 8:
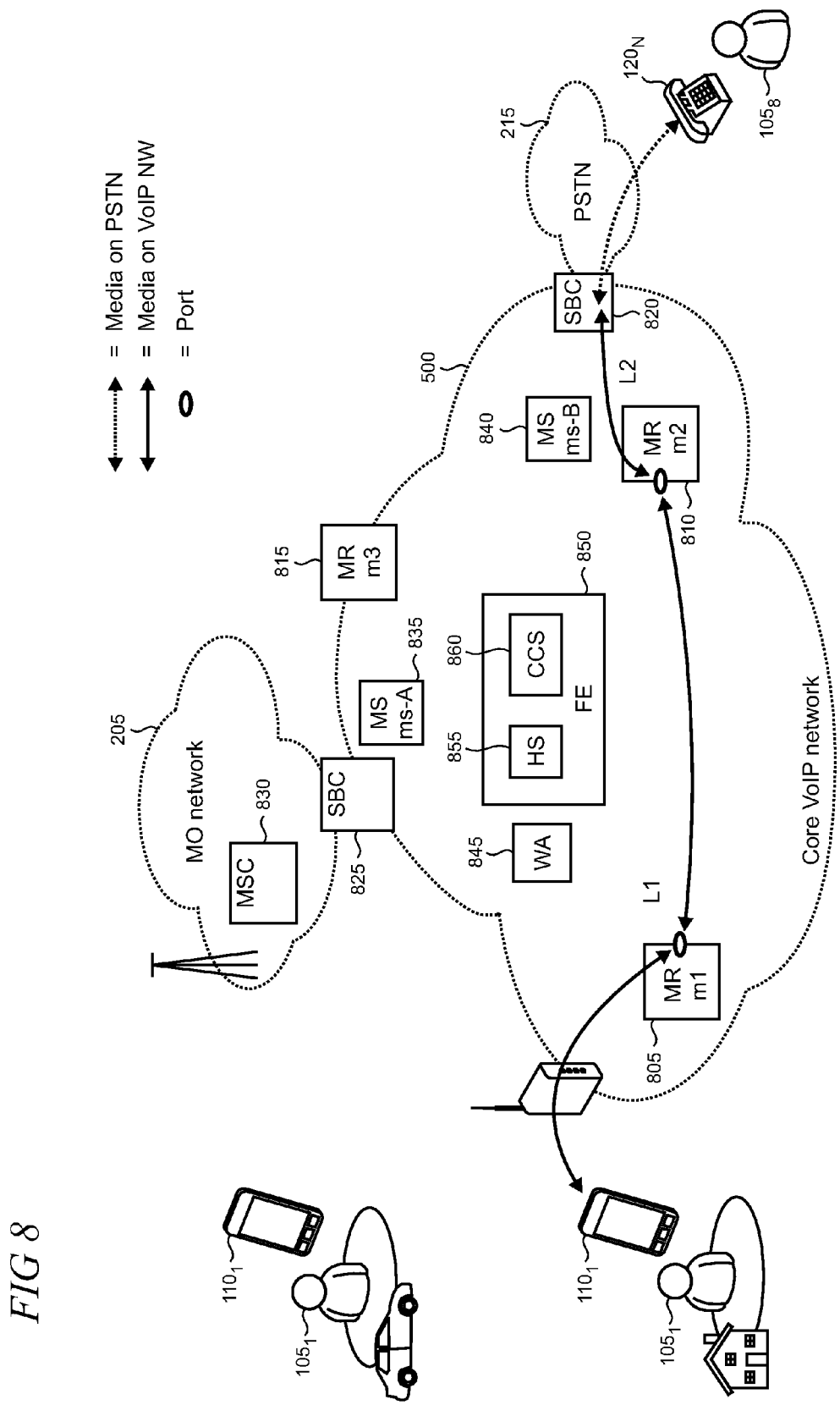
FIG. 8 shows an illustrative initial state of a hybrid network topology for a call between a mobile phone on a VoIP connection and a device on a public switched telephone network ("PSTN")

An overview of voice call continuity is now presented using Scenario A as an illustrative case in which a call is made between a mobile phone on a Wi-Fi connection and a conventional phone on a PSTN. The initial state is shown in the topology in FIG. 8. It may be assumed that the mobile phone 110 has already discovered and stored in its local call state the VCCRN value for the call for which handover is to be performed. As shown in FIG. 8, the core VoIP network includes media relays m1, m2, and m3, as respectively indicated by reference numerals 805, 810, and 815. An SBC server 820 operates as the gateway to PSTN 215 and an SBC server 825 operates as a gateway to the MO network 205 which includes a mobile switching center ("MSC") 830. Mediation servers ms-A and ms-B, respectively indicated by reference numerals 835 and 840 are also supported in the core VoIP network 500.

The core VoIP network 500 also supports a web access ("WA") server 845 and a front end ("FE") 850 that includes a home server ("HS") 855 and the CCS 860. The WA 845 functions as a signaling plane server with which the mobile phone 110 carries out all signaling interaction with the core VoIP network 500. The WA 845 also acts as an agent on behalf of the mobile phone in interactions with the other signaling plane elements of the core VoIP network 500. The FE 850 provides call handling in the signaling plane including various functions such as call routing. The HS 855 provides signaling proxy in the core VoIP network 500. As noted above, the CCS 860 is responsible for maintaining the call state in the core VoIP network 500 and generates the related parameters including the VCCRN.

At some point in time, the VCC client 720 (FIG. 7) on the mobile phone 110 determines that conditions are such to warrant a handover to the cellular CS connection. For example, the user 105 moves from home to a car. The handover is performed in three stages (in which the hybrid network may be viewed as being in a particular state—i.e., initial state, intermediate state, and final state—in each corresponding stage). In particular, a new call leg is created in the initial stage, parallel media paths are created in an intermediate stage, and the handover is completed in the final stage.

Figure 9:
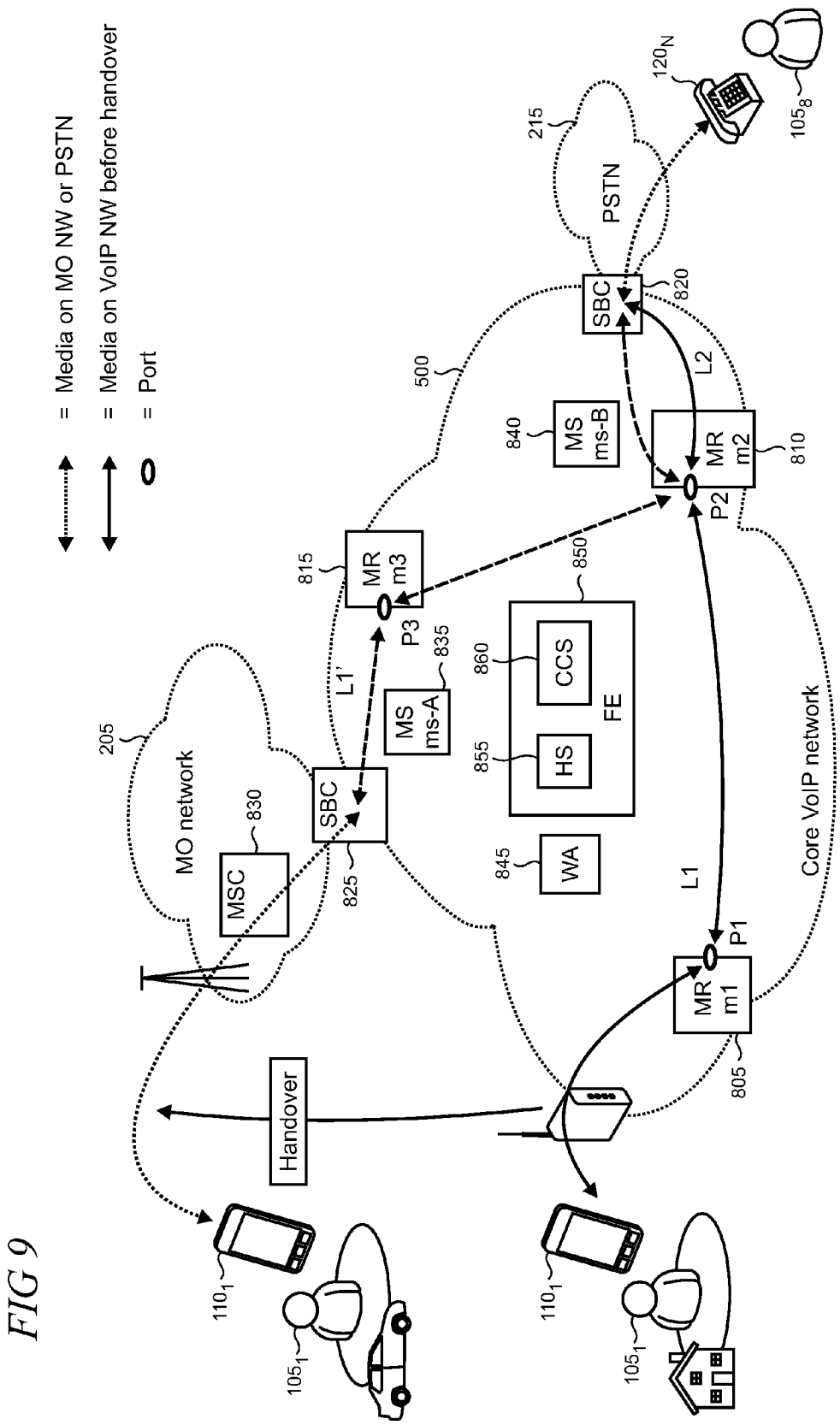
FIG. 9 shows an illustrative intermediate state of a hybrid network topology for a call in which handover is underway.

As shown in FIG. 9, during the new call leg, the mobile phone 110 places a call over its CS connection signaling the call parameters including calling party number, CgPN=mobile phone number ("MDN" or "MPhone#") and called party number, CdPN=VCCRN. The MSC 830 in the MO network 205 forwards the call signaling to the SBC 825 which, in turn, sends the call signaling to the mediation server ms-A 835. As noted above, calls to and from the VCC-equipped mobile phones that are associated with the core VoIP network 500 are routed to that network regardless of the point of origin or termination of the call. The mediation server ms-A 835 allocates a port P3 on a nearby media relay m3 815 and continues with the call signaling. The core VoIP network 500 then implements voice call continuity using a saved call state from the stored VCCRN to relate the new call leg to the original call. This enables the new call leg L1' to be incorporated into the original call via the media relay m3 815 on port P3 to the port P2 on media relay m2 810.

During the intermediate stage of call handover, the additional parallel call leg L1' is created from the mobile phone 110 to the media relay m3 815 over the new connection. Accordingly, for some time interval, there will be two parallel call legs, L1 and L1'—one on each of the CS and VoIP/Wi-Fi connections between the mobile phone 110 and the respective media relays m1 and m3. The media stream coming from the far end of the call on the PSTN 215 will be delivered over both of the L1 and L1' legs to the mobile phone 110. The VCC client 720 (FIG. 7) on the mobile phone 110 will enable one of the two media streams to be connected to the mobile phone's audio capture-and-rendering hardware, which may include for example, a microphone and speaker output.

Figure 10:
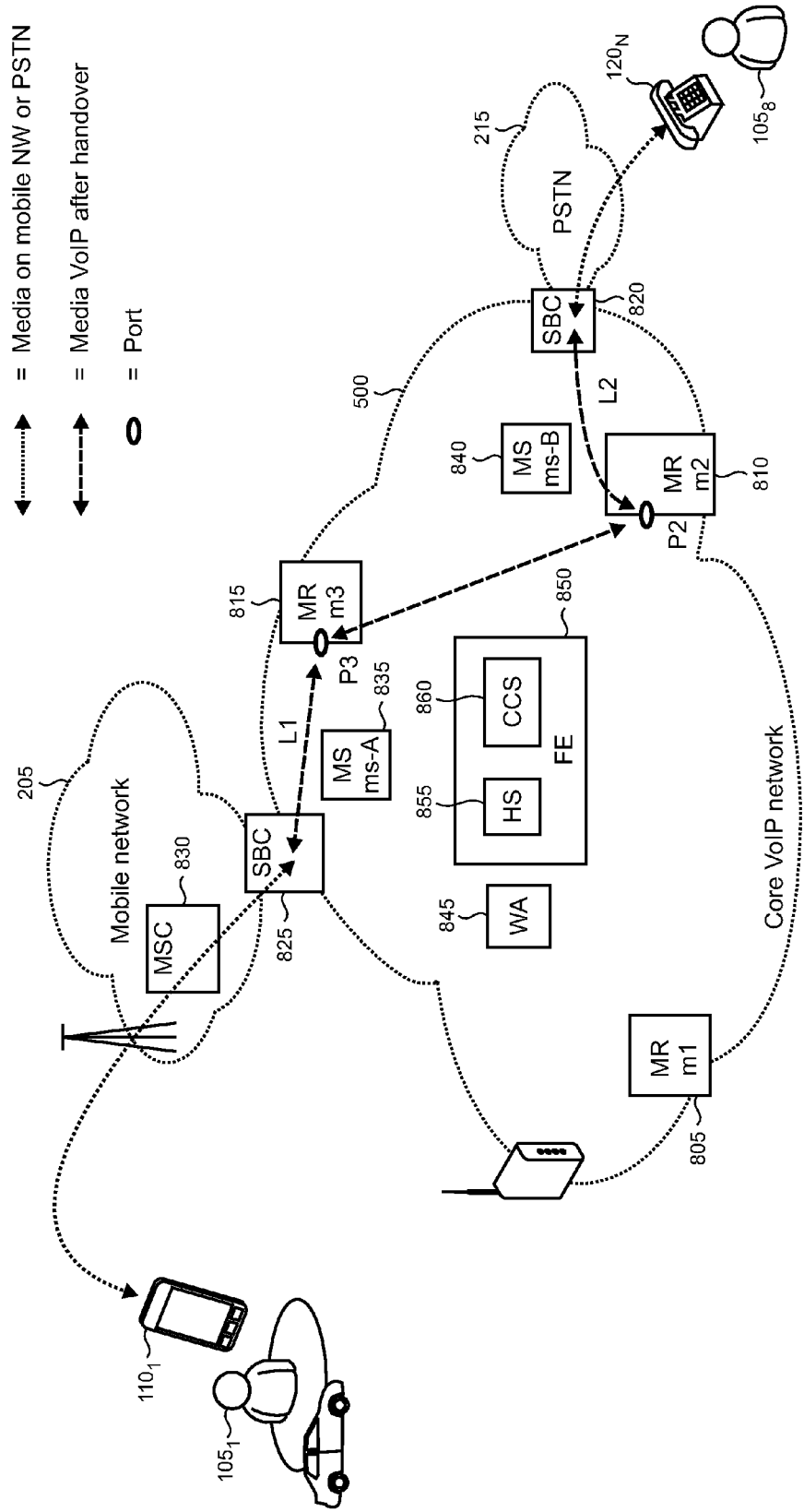
FIG. 10 shows an illustrative final state of a hybrid network topology for a call in which handover is completed.

When the newly established CS leg is stable (or the quality of the Wi-Fi connection becomes unacceptable), the VCC client 720 on the mobile phone 110 will disconnect the VoIP/Wi-Fi stream from the user's audio capture-and-render hardware. The old call leg L1 then becomes superfluous and will be torn down. Handover of the call is now complete as shown in FIG. 10. If at this stage of handover the Wi-Fi connection fails, the network should remove the leg L1 after a suitable guard time interval. Clean-up of the call state will also typically be performed to ensure that it accurately reflects the handover and the media flow over the new call leg.

The media and signaling call flow for handover in each of the three handover groups shown in the Table above is now presented. The call flow is presented by describing an initial call setup, followed by a description of the call flows for adding a new leg and completing the handover.

Figure 11:
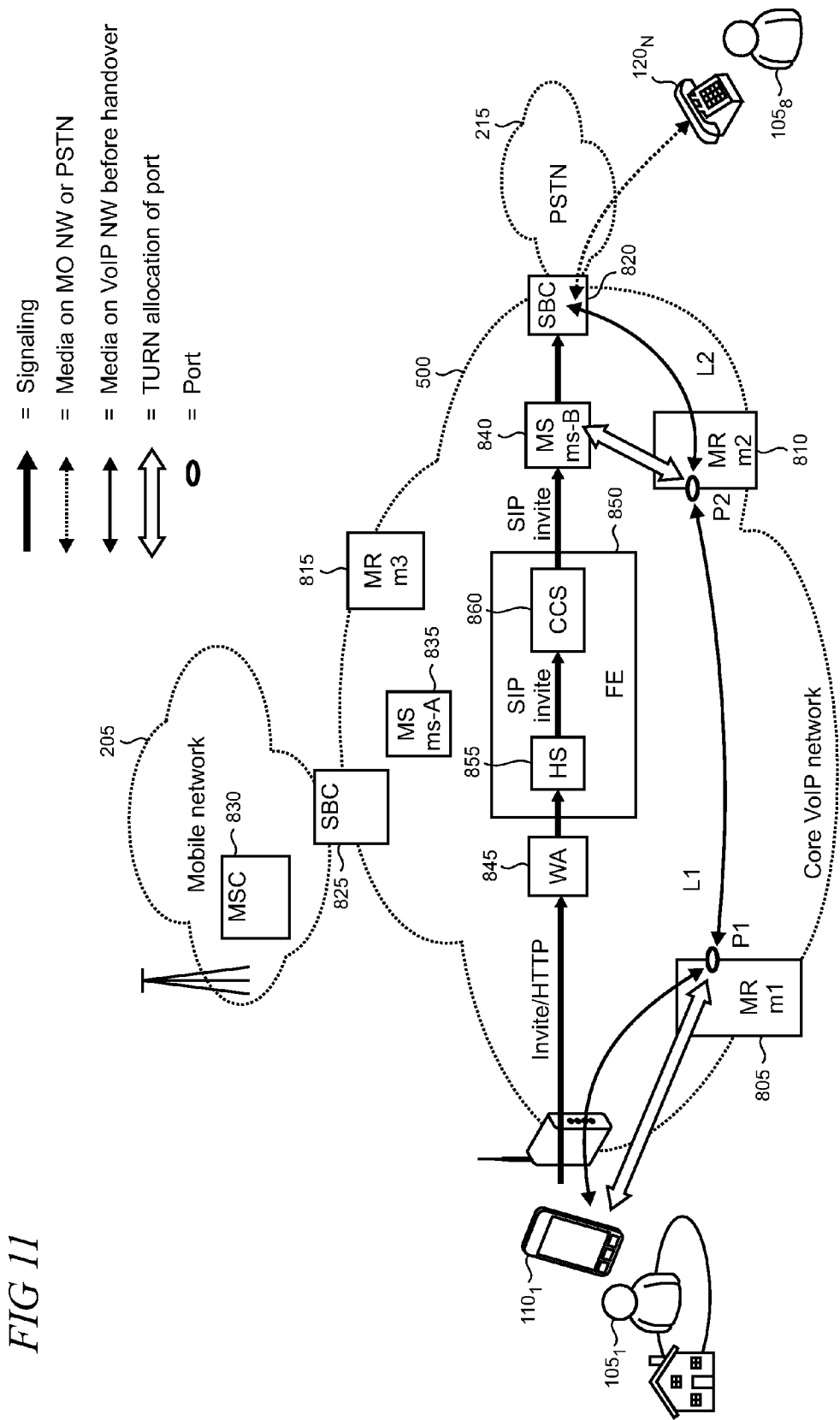
FIG. 11 shows illustrative hybrid network topology for media and signaling call flow for an initial call setup for a call between a mobile phone on a Wi-Fi connection and a device on a PSTN.
Figure 12:
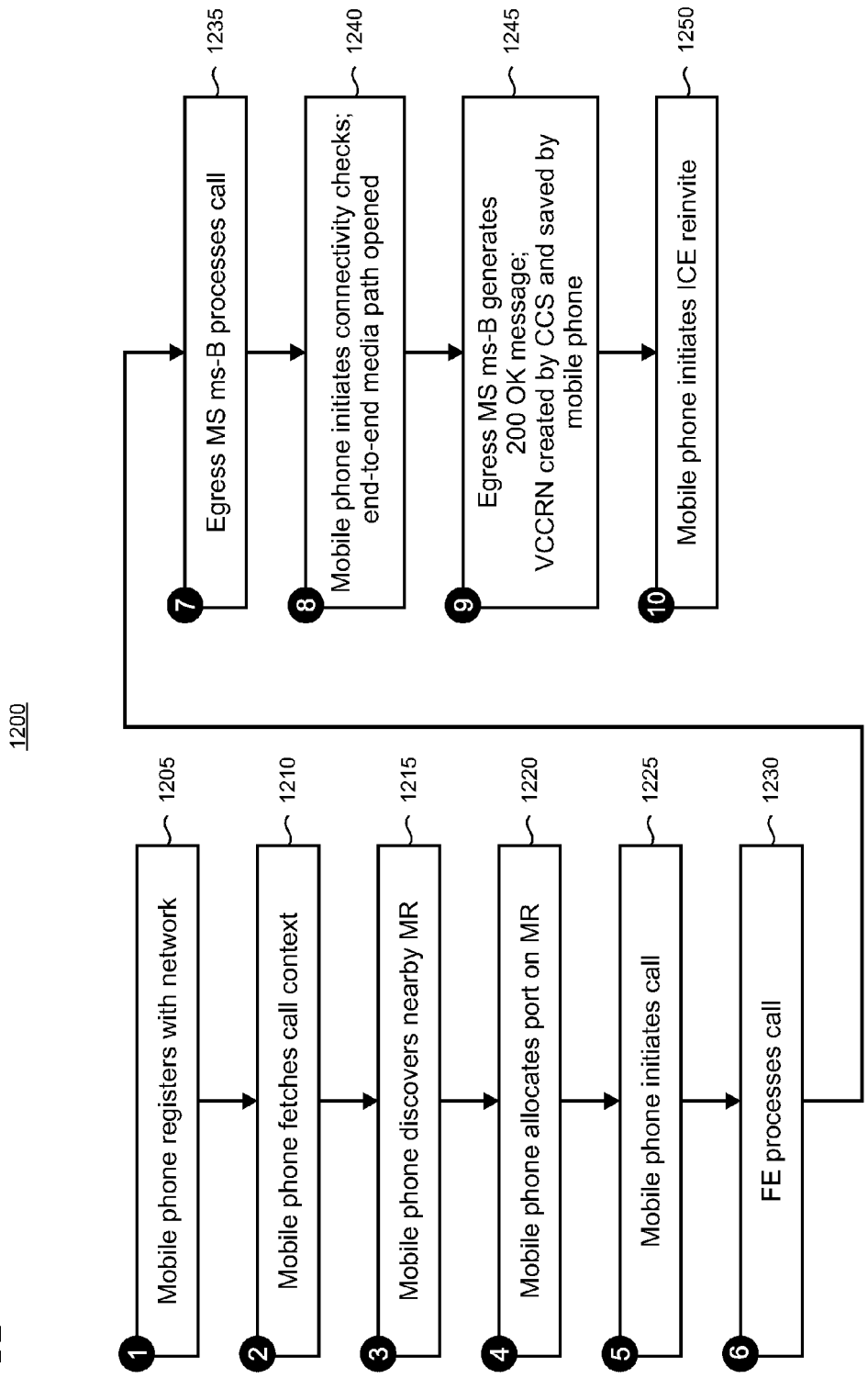
FIG. 12 shows a flowchart of an illustrative call flow for an initial call setup in which a call is originated by a mobile phone on a Wi-Fi connection.

FIG. 11 shows an illustrative hybrid network topology for media and signaling call flow for an initial call setup for a call between a mobile phone 110 on the core VoIP network 500 and a phone 120$_N$ on the PSTN 215. FIG. 12 shows a flowchart 1200 of an illustrative call flow of an initial call setup on the hybrid network topology shown in FIG. 11. The flowchart 1200 includes circled numbers 1-10 that are indexed to the illustrative call flow diagrams shown in FIGS. 13A and 13B. Accordingly, the reader may wish to refer to FIGS. 13A and 13B as the discussion of flowchart 1200 is presented below.

Unless specifically stated, the methods or steps shown in the flowcharts of FIGS. 12, 14, 17, 20, 22, 25, 27, 29, and 34-36 and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Referring again to flowchart 1200 in FIG. 12, in step 1 at block 1205, the mobile phone 110 registers with the hybrid network and acquires a bundle of information from an MRAS (Media Relay Authentication Server) service relating to its nearby media relay from the FE 850 via the WA 845. The MRAS bundle of information includes the FQDN (Fully Qualified Domain Name), media relay credentials to enable secure interactions with all the media relays in the core VoIP network, and identification of ports to be used for accessing the media relays.

In step 2 at block 1210, using an inband request, the mobile phone 110 fetches the context from the CCS 860 for its current calls, including its active and on-hold calls. The context can include a variety of information about the current calls including VCCRN values for the current calls, call IDs, and target end points. The reason for this query is that a previous call establishment may have been for a CS call and during that call setup signaling of information from the VoIP network would be prevented on some CDMA networks due to lack of simultaneous CS and PS connectivity.

In step 3 at block 1215, the mobile phone 110 performs a DNS (Domain Name System) query to discover its nearby media relay. It then engages in a TURN (Traversal Using Relays around NAT (network address translator)) Allocate dialogue, in step 4 at block 1220, with media relay m1 805 to allocate a port P1 on the media relay. The media relay m1 805 returns port information to the mobile phone 110. The mobile phone 110 creates and saves a PortContextBlock ("PCB") which includes the IP addresses of media relay m1 and port P1, a placeholder for a VCC identifier (e.g., VCCRN), MRAS credentials, and a VCC-equipped mobile device identifier (e.g., MSISDN etc.).

In step 5 at block 1225, the mobile phone 110 initiates a VoIP call. The mobile phone sends an Invite over HTTP (HyperText Transfer Protocol) to the WA 845 which offers call parameters. The offered parameters may include, for example, CgPN=MDN (Mobile Directory Number); CdPN=PSTN-destination#; offered SDP (Session Description Protocol) called "SDP1" with port P1 as the highest priority port; and offered codecs.

In step 6 at block 1230, the FE 850 processes the call in which the WA 845 creates a SIP (Session Initiation Protocol) Invite with the SDP1 and sends it to the HS 855 in the FE 850. The HS 855 examines the call signaling parameters in order to route the call among other treatments. A routing function determines the least-cost route based on the destination CdPN and selects the appropriate mediation server (here mediation server ms-B 840) for call egress. The FE 850 forwards the Invite to the CCS 860 along with the route information. The CCS 860 uses the CgPN and the CdPN to determine if the Invite is associated with a new call or comprises a request for a new leg for an existing call. If the CdPN is a VCCRN value then the request is for a new call leg for an existing call. The CCS 860 looks up the saved call contexts for CgPN and discovers the one corresponding to this particular VCCRN value. The CCS 860 thus obtains the various parameters required to set up the new call leg, including identification of the media relay and port on which the existing call is anchored. The CCS 860 initiates new call leg processing, as described in more detail below. If the Invite is for a new call, then the CCS routes the SIP Invite with SDP1 to the destination selected by the HS 855, which in this case is mediation server ms-B 840.

Figure 13A:
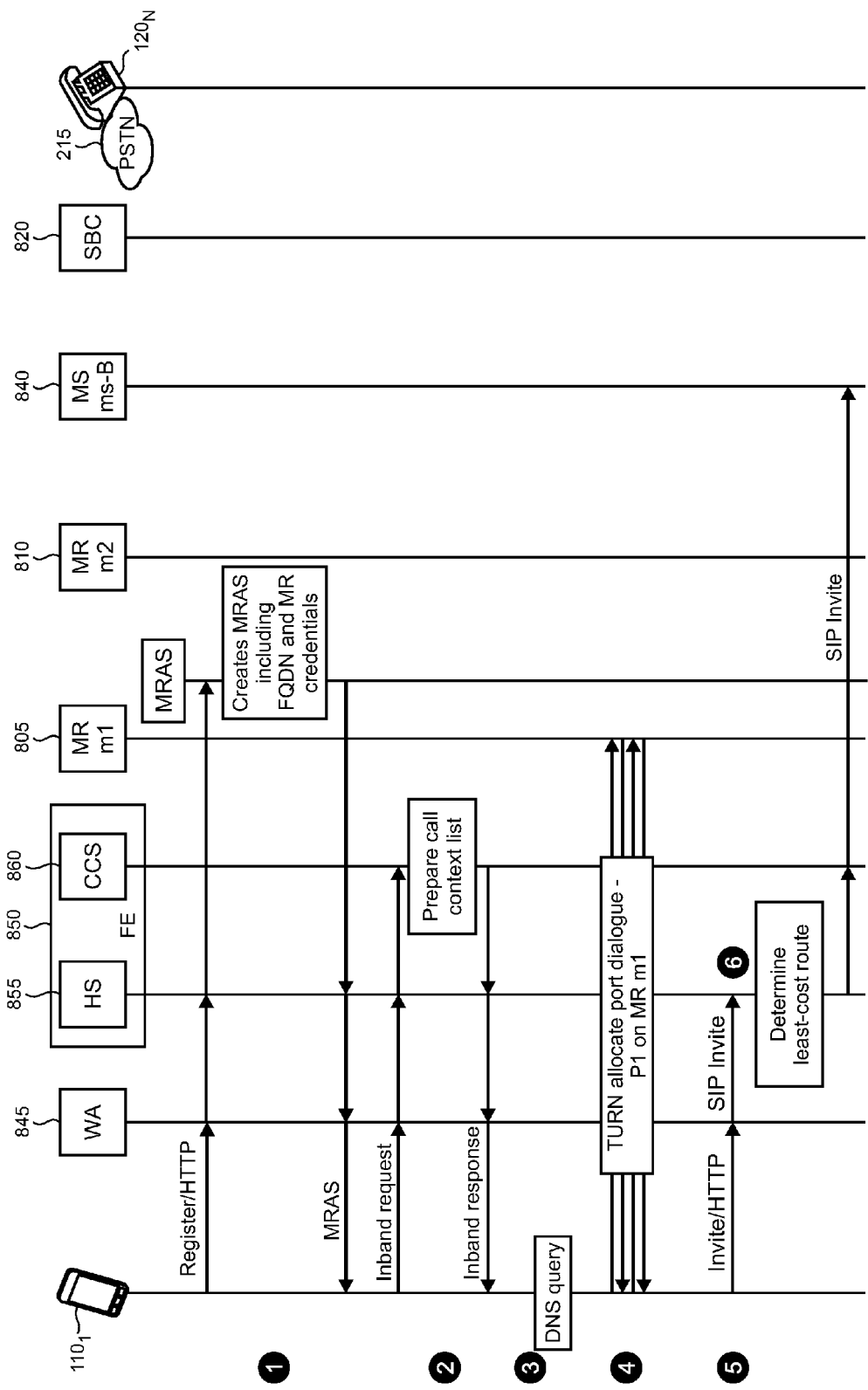
FIGS. 13A and 13B show an illustrative call flow for an initial call setup in which a call is originated by a mobile phone on a Wi-Fi connection.
Figure 13B:
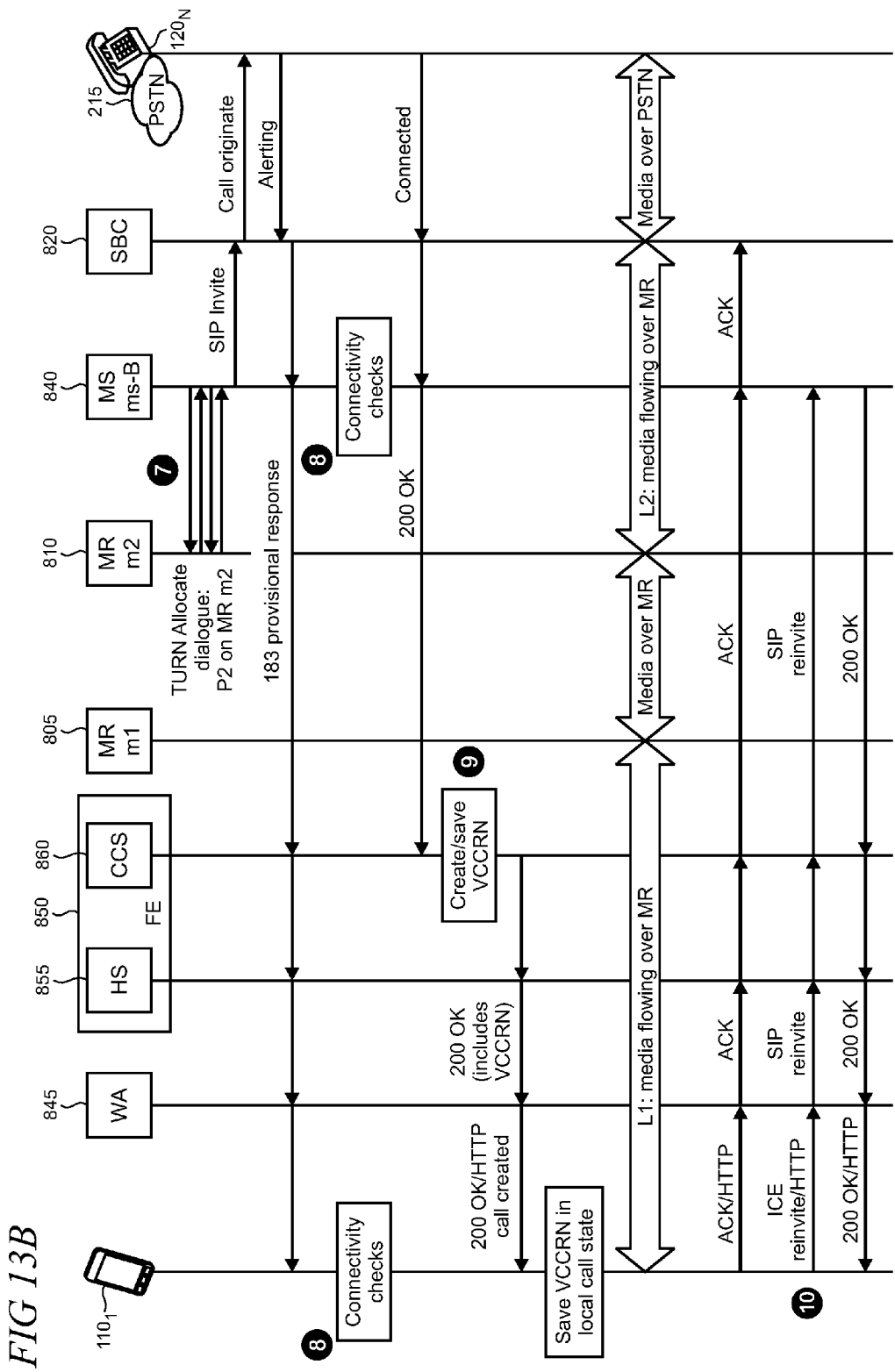

In step 7 at block 1235, the egress mediation server ms-B 840 processes the call by allocating a port on the nearby media relay m2 810 using a TURN dialogue. Here, the mediation server ms-B functions as a SIP B2BUA (back-to-back user agent) so that the core VoIP network 500 is isolated from the SBC 820. Effectively this means that the SIP dialogue on the left side of ms-B in FIGS. 13A and 13B is different from the dialogue on the right side (i.e. towards the SBC 820). For example, the SIP dialog on the right side will have a different SDP in the SIP Invite which will include port P2 as the offered port rather than port P1. And the call-ID of these two dialogs will also be different. The mediation server ms-B 840 is responsible for bridging these two SIP dialogues to achieve the end-to-end objectives of the call signaling and media flow.

The mediation server ms-B 840 prepares a new dialogue with SDP2 that includes port P2 as the offered port but with the same codecs as SDP1 and sends this invite to the SBC 820 for termination on the PSTN 215. The mediation server ms-B 840 then returns a 183 provisional response back to the mobile phone 110 via the return path of the left-hand call signaling dialogue through the FE 850. The response includes SDP1 but now with the information about P2 as the destination port. At this stage, this is a provisional value of SDP1 since the codecs selected by the SBC are not available to the mediation server ms-B 840.

In step 8 at block 1240, the mobile phone 110 and mediation server ms-B 840 perform ICE (Interactive Connectivity Establishment) connectivity checks to open the forwarding interrelationship for ports P1 and P2. At this stage, the media path is enabled end-to-end via the media relays m1 and m2. The media path consists of two bi-directional call legs L1 and L2 bridged via media relays m1 and m2. Once the ICE connectivity checks have been completed and the definitive media path selected, the last stages of the call signaling dialogue can be completed.

In step 9 at block 1245, when the mediation server SBC 820 receives a Call Connected signal from the PSTN 215, it generates a 200 OK message and routes it back to the ms-B 840. The ms-B now generates a 200 OK message and then sends it on the left side dialogue to the front end 850 with the correct SDP information which is then delivered to the CCS 860. These elements examine the CdPN for the call and observe that it is not the VCCRN. The CCS 860 will therefore decide that the call is a new call and will then proceed to generate a VCCRN value in accordance with the uniqueness rules described above.

An alternative call flow would comprise not delivering the VCCRN during this stage of call establishment. Instead, after the call media path has been established the mobile phone 110 may obtain call context information that includes the VCCRN value from the FE 850 via a request to the WA 845 using an additional INFO message exchange. Advantages to this alternative approach include preventing initiation of a handover of the call before it has been established fully and has become stable.

The CCS 860 stores the generated VCCRN value in the network's call state in a storage substrate (which may be, for example, either monolithic or distributed) that is accessible by the FE 850 and sends the 200 OK message to the mobile phone 110 via the HS 855 and WA 845. The CCS 860 can include the VCCRN value in the 200 OK message. The VCC client in the mobile phone 110 saves the VCCRN value from the 200 OK message in its local call state. The mobile phone 110 then initiates the process of sending an ACK to the SBC 820 at the far end via the FE 850.

In step 10 at block 1250, upon completion of the ICE connectivity checks, the mobile phone 110 will initiate an ICE Reinvite. The ICE Reinvite includes complete port information and the final SDP information. The call is now set up and the relationship between the media relays m1 and m2 will carry RTP (Real-time Protocol) streams bi-directionally between the two ends of the call. The mobile phone 110 also has the VCCRN of its local call leg in local call context for the just established call.

Figure 14:
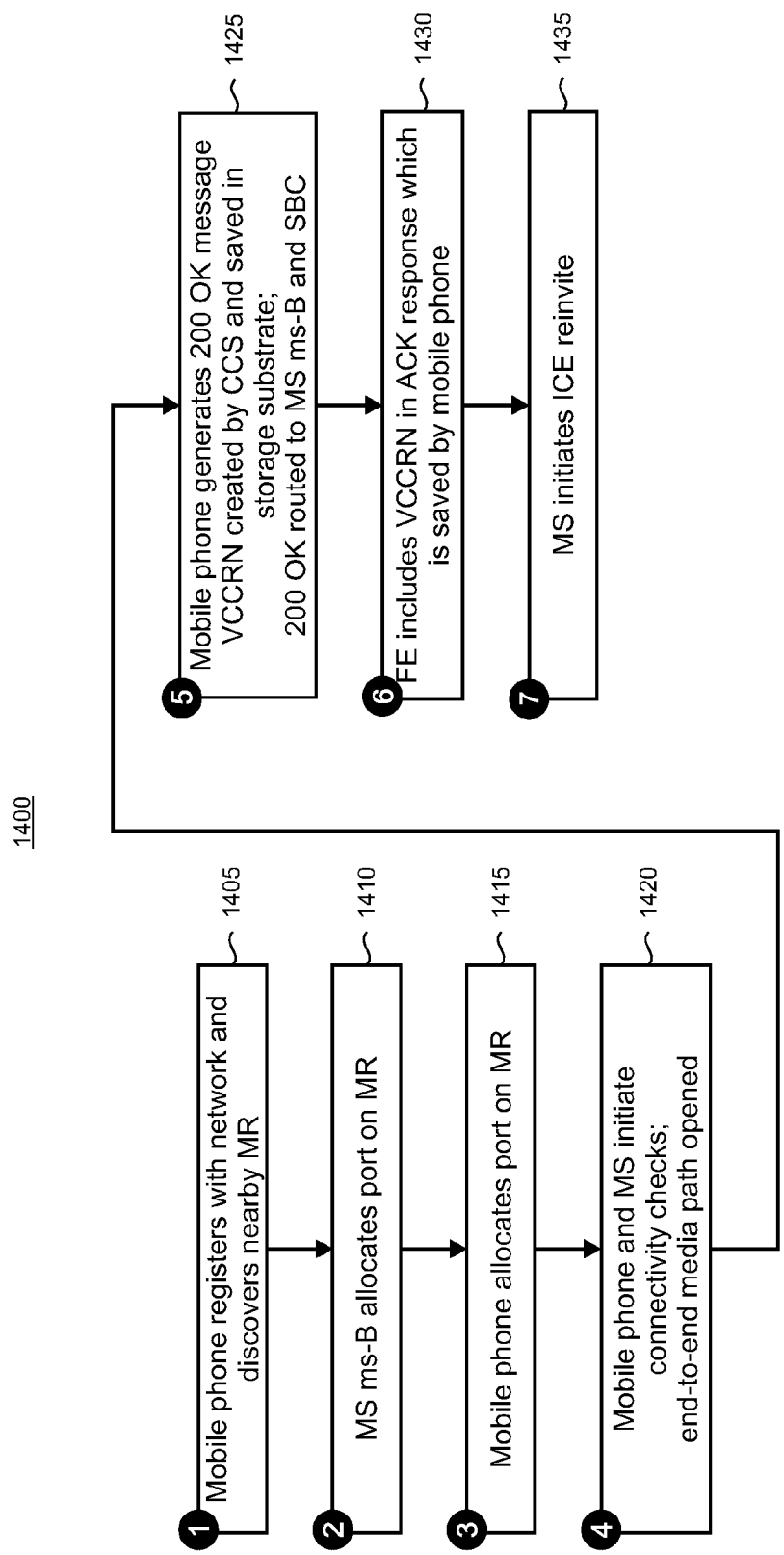
FIG. 14 shows a flowchart of an illustrative call flow for an initial call setup in which a call is terminated by a mobile phone on a Wi-Fi connection.
Figure 15B:
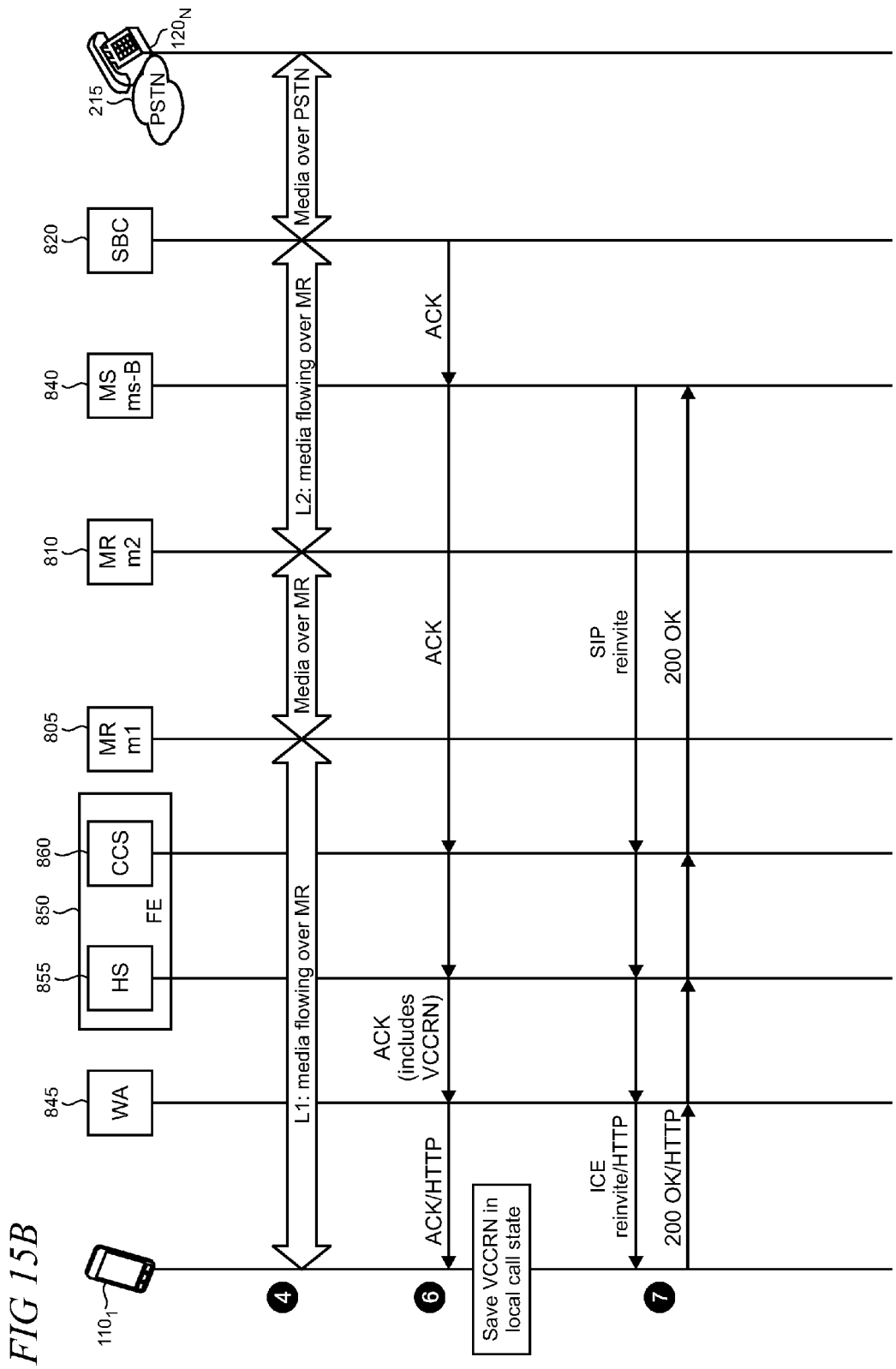

FIG. 14 shows a flowchart 1400 of an illustrative call flow for an initial call setup in which a call is terminated by a mobile phone on a Wi-Fi network. The applicable hybrid network topology is similar to that shown in FIG. 11, but in this example the call originates from the PSTN 215. Much of the call flow is similar to that shown in the flowchart 1200 however, there are notable differences with regard to the VCCRN. The flowchart 1400 includes circled numbers 1-7 that are indexed to the illustrative call flow diagrams shown in FIGS. 15A and 15B.

In step 1 at block 1405, the mobile phone 110 registers with the core VoIP network and obtains information needed to discover and interact with a nearby media relay (here, media relay m1). In step 2, at block 1410, the call originates at the PSTN 215 and arrives at the SBC 820. The SBC 820 sends a SIP Invite to the mediation server ms-B 840 which then uses TURN Allocate to allocate a port P2 on the nearby media relay m2. The mediation server ms-B 840 creates the left side dialogue and sends a SIP Invite to the HS 855 in the FE 850 along with information about port P2. The SIP Invite is processed at the FE 850 where the CCS 860 determines from the CdPN that the called party is not a VCCRN. The incoming call is notified and routed to the mobile phone 110 via the WA 845 over the incoming call notification channel.

In step 3 at block 1415, the mobile phone allocates a port P1 on the nearby media relay m1 using TURN and then responds with a provisional response that includes preliminary SDP information. The response is routed back via the WA 845 to the FE 850 and to the mediation server ms-B 840. In step 4 at block 1420, both the mobile phone 110 and the mediation server ms-B initiate ICE connectivity checks and an end-to-end media path is established.

In step 5 at block 1425, when the mobile phone user answers the call, the mobile phone 110 sends a 200 OK message via WA 845 and the FE 850. The CCS 860 examines the CgPN and CdPN and determines that it needs to create a new VCCRN which is saved in the call state, for example, on the FE's storage substrate.

The 200 OK message is routed on to the mediation server ms-B and the SBC 820 which responds with an ACK at step 6 at block 1430. The ACK is routed back via the FE 850 where the VCCRN value is aggregated to the ACK before routing it to the mobile phone 110. The VCC client on the mobile phone then saves this value in its local call state. In step 7 at block 1435, the mediation server ms-B initiates an ICE Reinvite dialogue upon completion of the connectivity checks in order to communicate the final SDP and related information for securing the media path.

Figure 16:
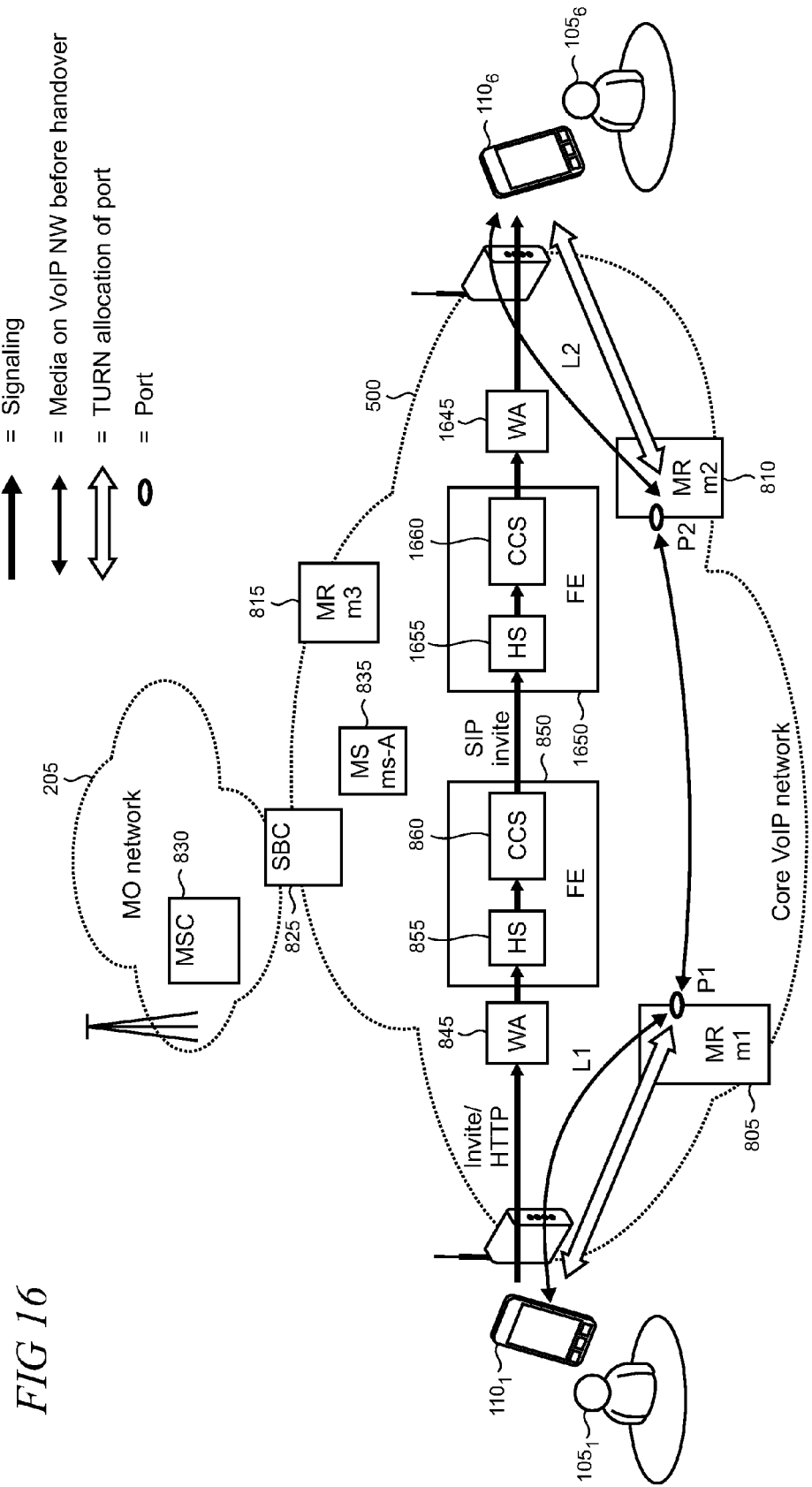
FIG. 16 shows an illustrative hybrid network topology for media and signaling call flow for an initial call between two mobile phones over IP connections.

A call flow for an initial call between two mobile phones 110 using IP connections is now presented. The IP connections can be made using Wi-Fi or PS. FIG. 16 shows the hybrid network topology supporting the mobile phone connected to the IP call flow. The call flow is similar to the call flows for the IP to PSTN case discussed above in the text accompanying FIGS. 11-15. The significant difference is that there are two CCS elements 860 and 1660 in the flow, corresponding to each of the two mobile phones 110 on the call. In addition, during the 200 OK message flow, each CCS generates a different value for the VCCRN for each mobile phone and its respective call leg.

Figure 17:
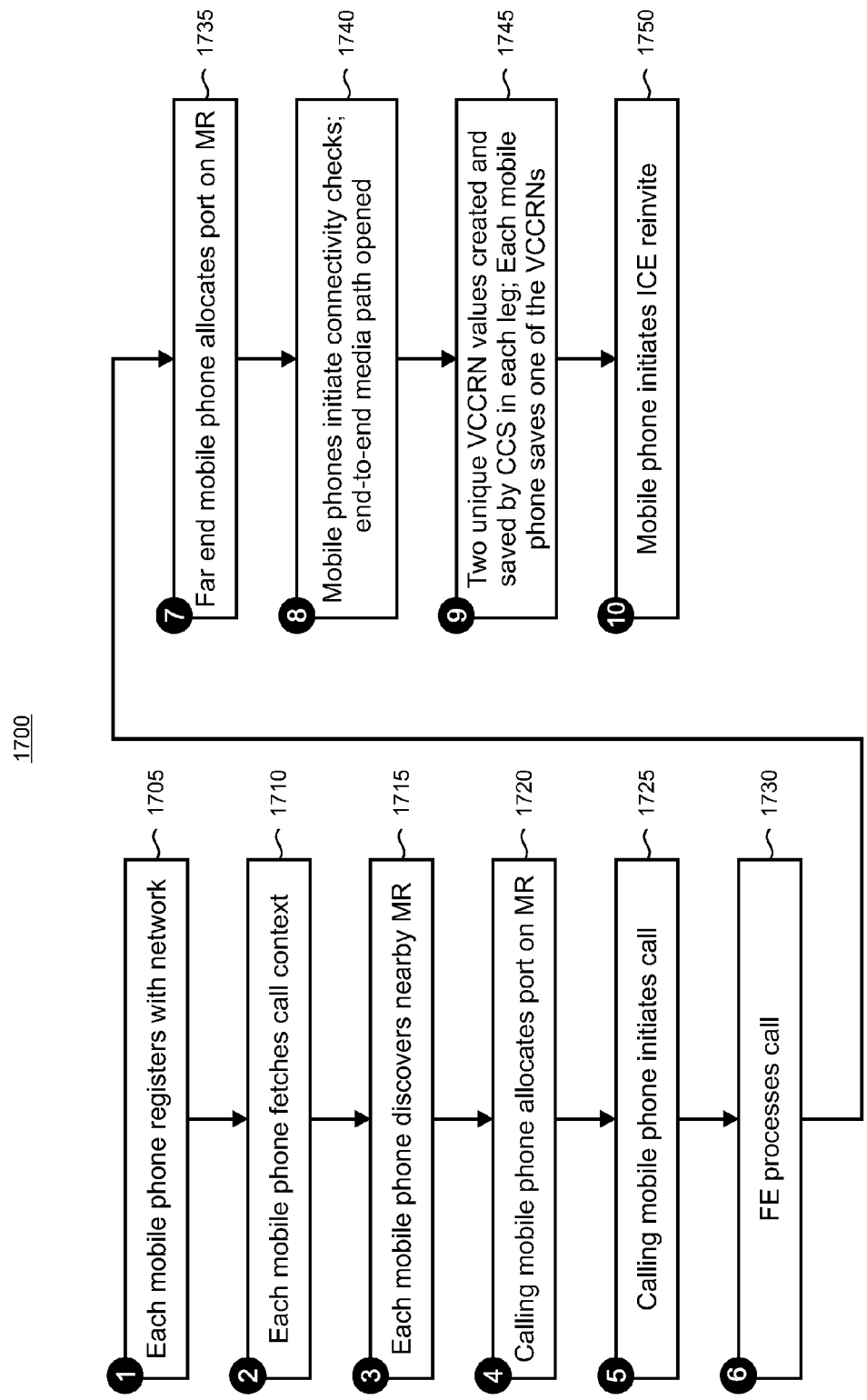
FIG. 17 shows a flowchart of an illustrative call flow for an initial call setup for a call between mobile phones over IP connections.

FIG. 17 shows a flowchart 1700 of this call flow. The flowchart 1700 includes circled numbers 1-10 that are indexed to the illustrative call flow diagrams shown in FIGS. 18A and 18B.

In step 1 at block 1705, each mobile phone 110 registers with the core VoIP network 500. Each mobile phone 110 fetches call context via an inband request/response in step 2 at block 1710. In step 3 at block 1715, each mobile phone 110 will discover a nearby media relay using a DNS query. In step 4 at block 1720, the calling mobile phone $110_1$ allocates a port P1 on media relay m1. In step 5 at block 1725, the calling mobile phone $110_1$ initiates the call by sending an Invite over HTTP to the WA 845 which offers call parameters. In step 6 at block 1730, the FE 850 processes the call in which the WA 845 creates a SIP Invite which is forwarded to the far end as an incoming-call notification to the mobile phone $110_6$. In response to the notification, the mobile phone $110_6$ allocates a port P2 on the nearby media relay m2, in step 7 at block 1735, and sends a provisional answer.

In step 8 at block 1740, each mobile phone 110 initiates connectivity checks and the media path is enabled end-to-end via the media relays m1 and m2. The far end phone answers the call and sends an Accept over HTTP to WA 1645 which then proceeds to send a 200 OK message via FE 1650 to the calling phone. Along the flow of this 200 OK message, in step 9 at block 1745, a unique VCCRN value is created by each respective CCS elements 860 and 1660 and saved in the network's call state for the corresponding call leg for each of mobile phones 110. The CCS 860 forwards the 200 OK message and includes the unique VCCRN value generated by this CCS (here, designated as VCCRN1) to the mobile phone $110_1$ via the WA 845. The VCC client in the mobile phone $110_1$ saves the VCCRN1 value from the 200 OK message in its local call state.

The mobile phone $110_1$ then initiates the process of sending an ACK message to the far end via the WA 845 and the FE 850. When the ACK message is received by the FE 1650, it includes the unique VCCRN value for that call leg (here, designated as VCCRN2) in the ACK message which is then received by the far end mobile phone $110_6$. The VCC client in the mobile phone $110_6$ saves the VCCRN2 value from the ACK message in its local call state.

As the discussion above shows, the VCCRN1 is delivered to the calling mobile phone $110_1$ with the 200 OK message while the VCCRN2 is delivered to the called mobile phone $110_6$ with the ACK message. In an alternative call flow, each mobile phone 110 could obtain its respective VCCRN values from their FEs 850 and 1650 by placing requests to its respective WAs 845 and 1645.

In step 10 at block 1750, the mobile phone $110_1$ initiates an ICE Reinvite and receives a 200 OK message from the far end mobile phone $110_6$.

Figure 18A:
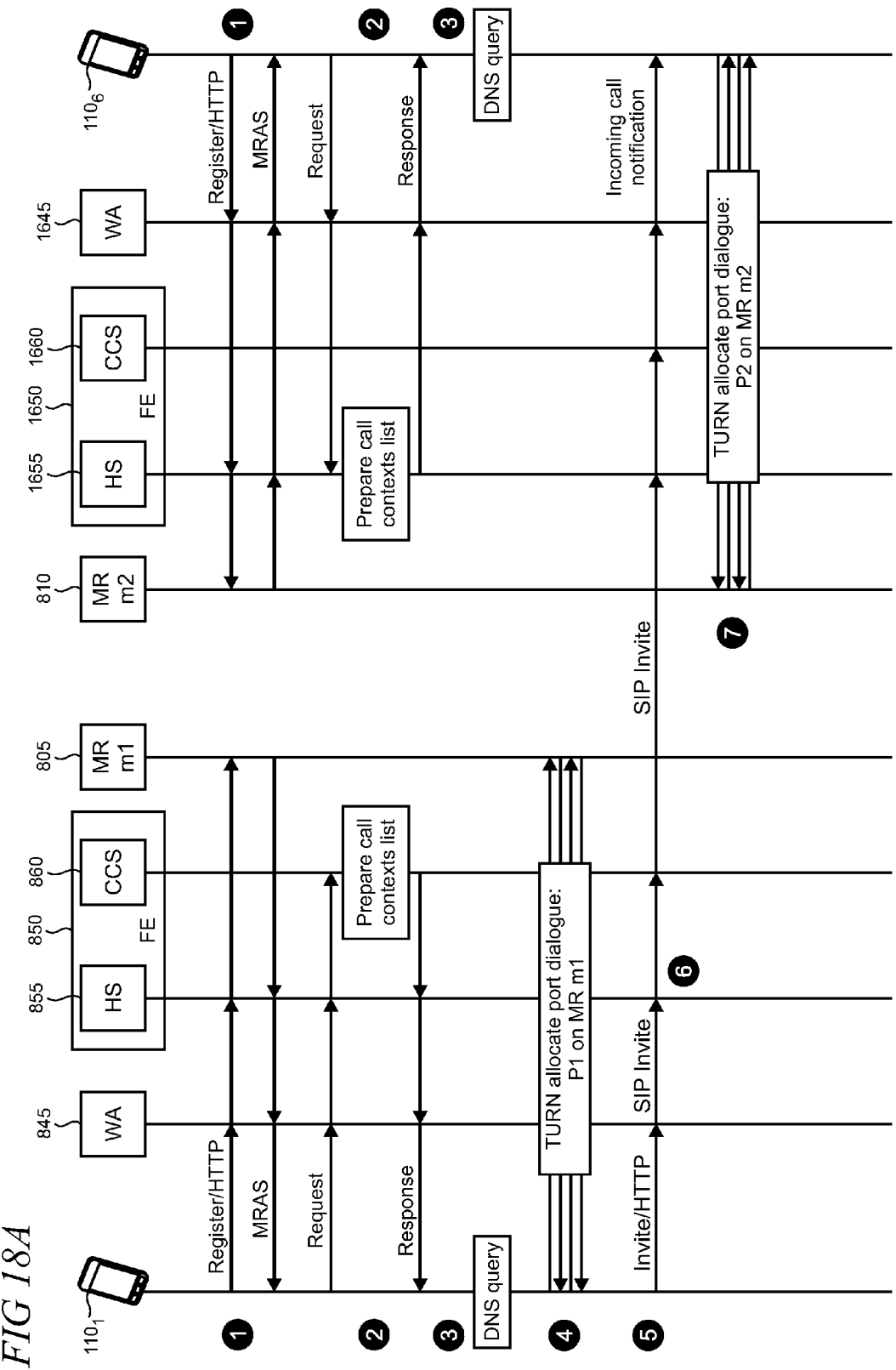
FIGS. 18A and 18B show an illustrative call flow for an initial call setup for a call between mobile phones over IP connections.
Figure 18B:
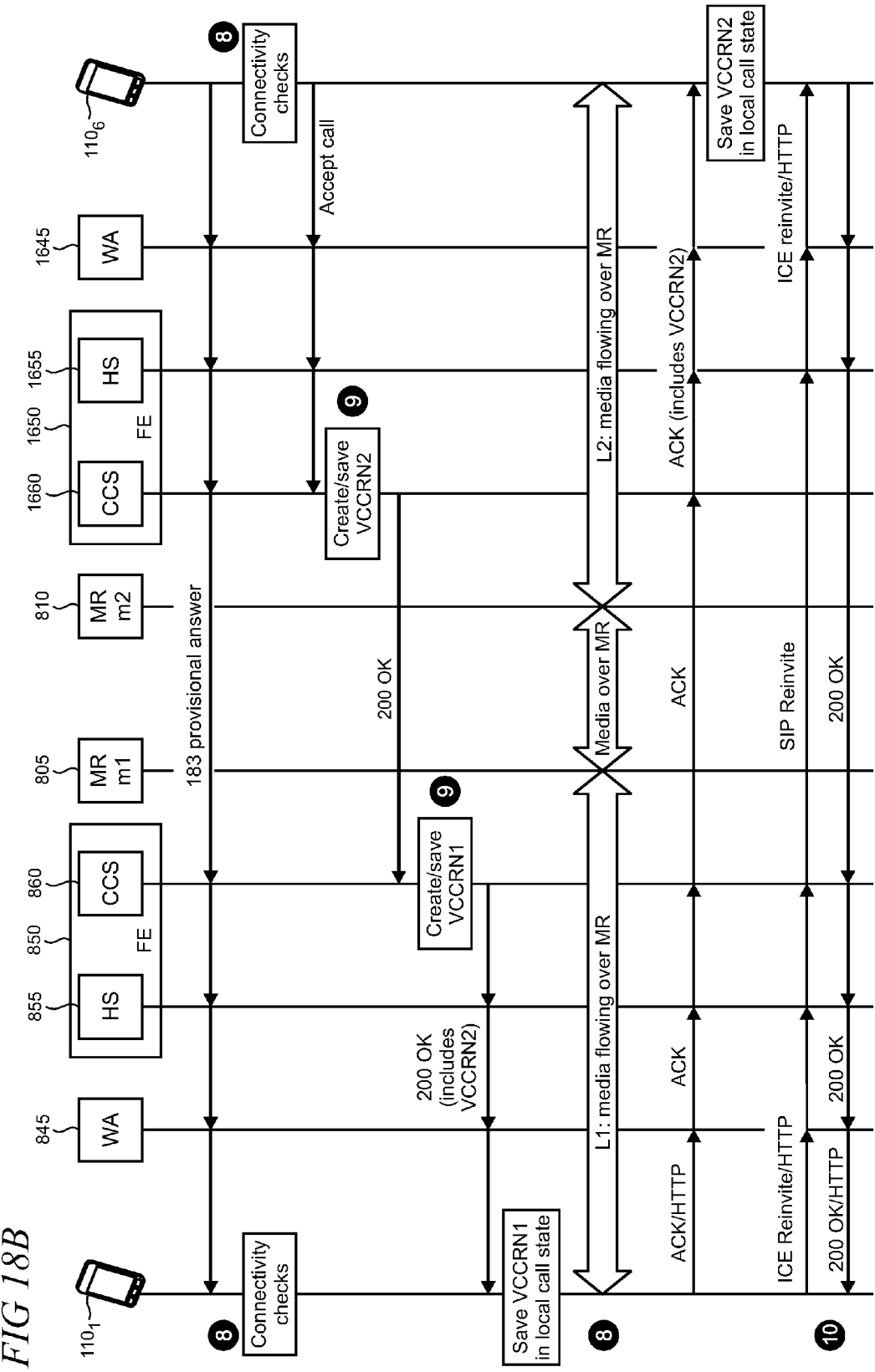
Figure 19:
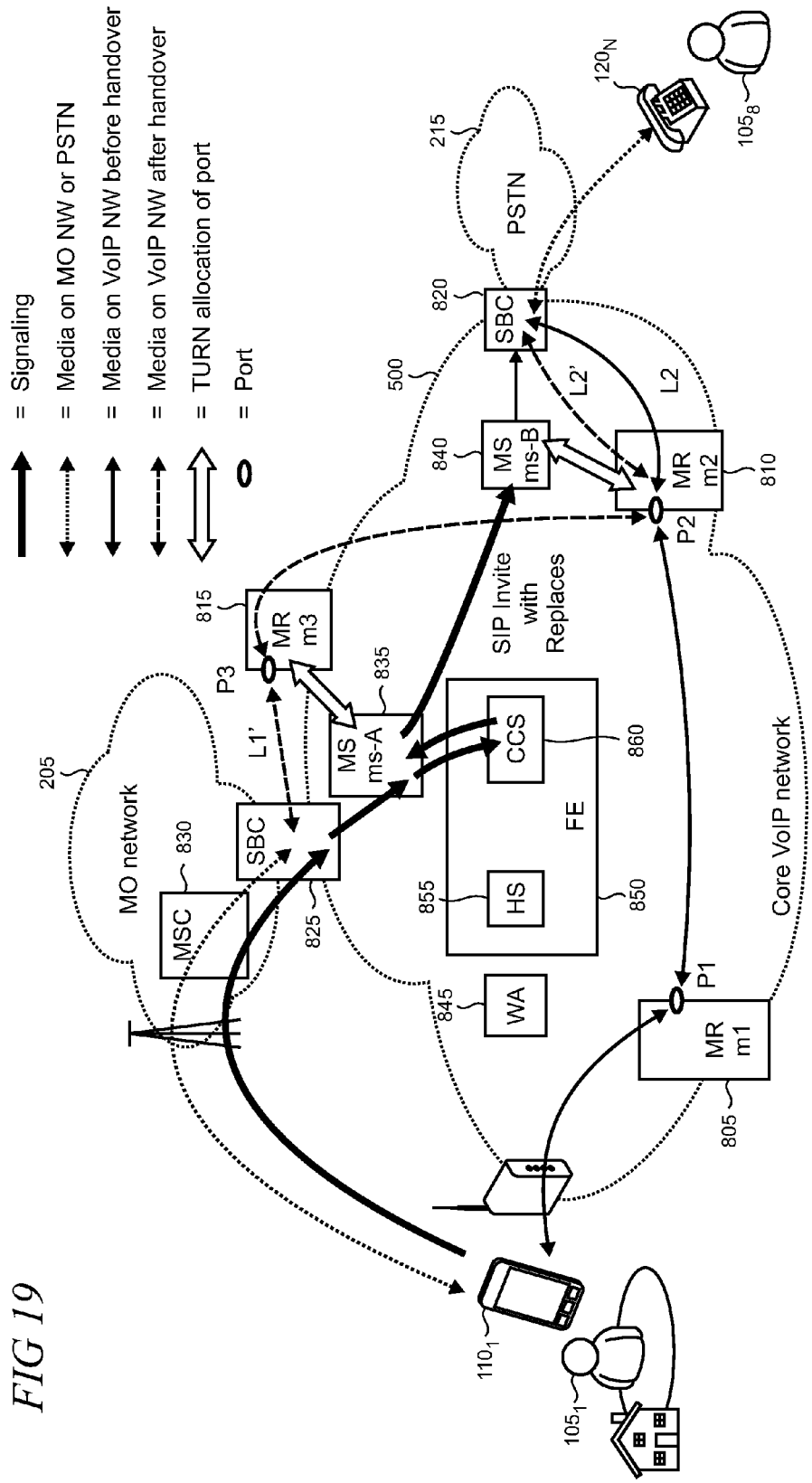
FIG. 19 shows an illustrative hybrid network topology for media and signaling call flow in which a call is handed over from a Wi-Fi connection to a circuit-switched ("CS") service provided by a mobile operator ("MO") network.
Figure 20:
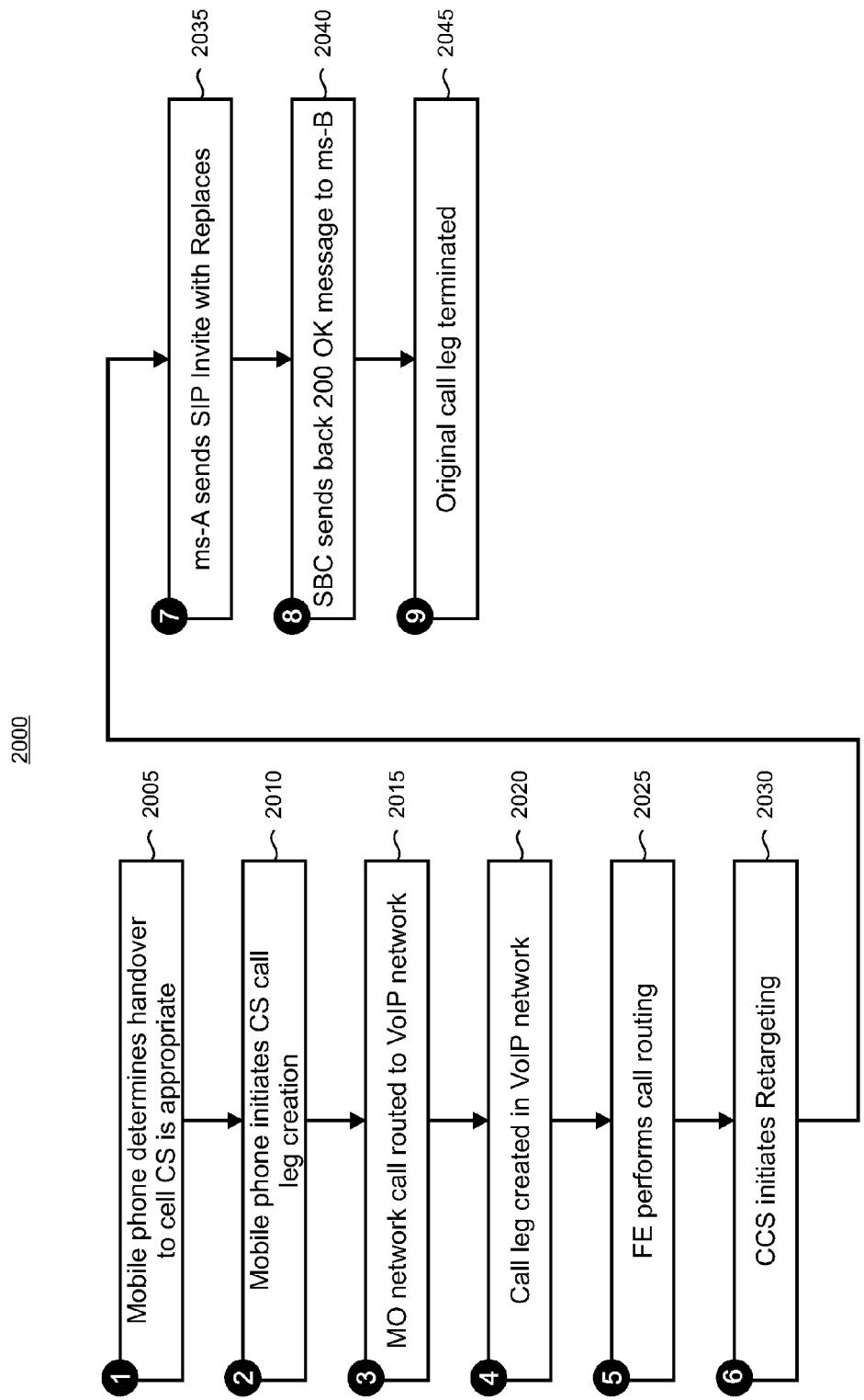
FIG. 20 shows a flowchart for an illustrative immediate state of call handover from an IP connection to a CS service on an MO network.
Figure 21A:
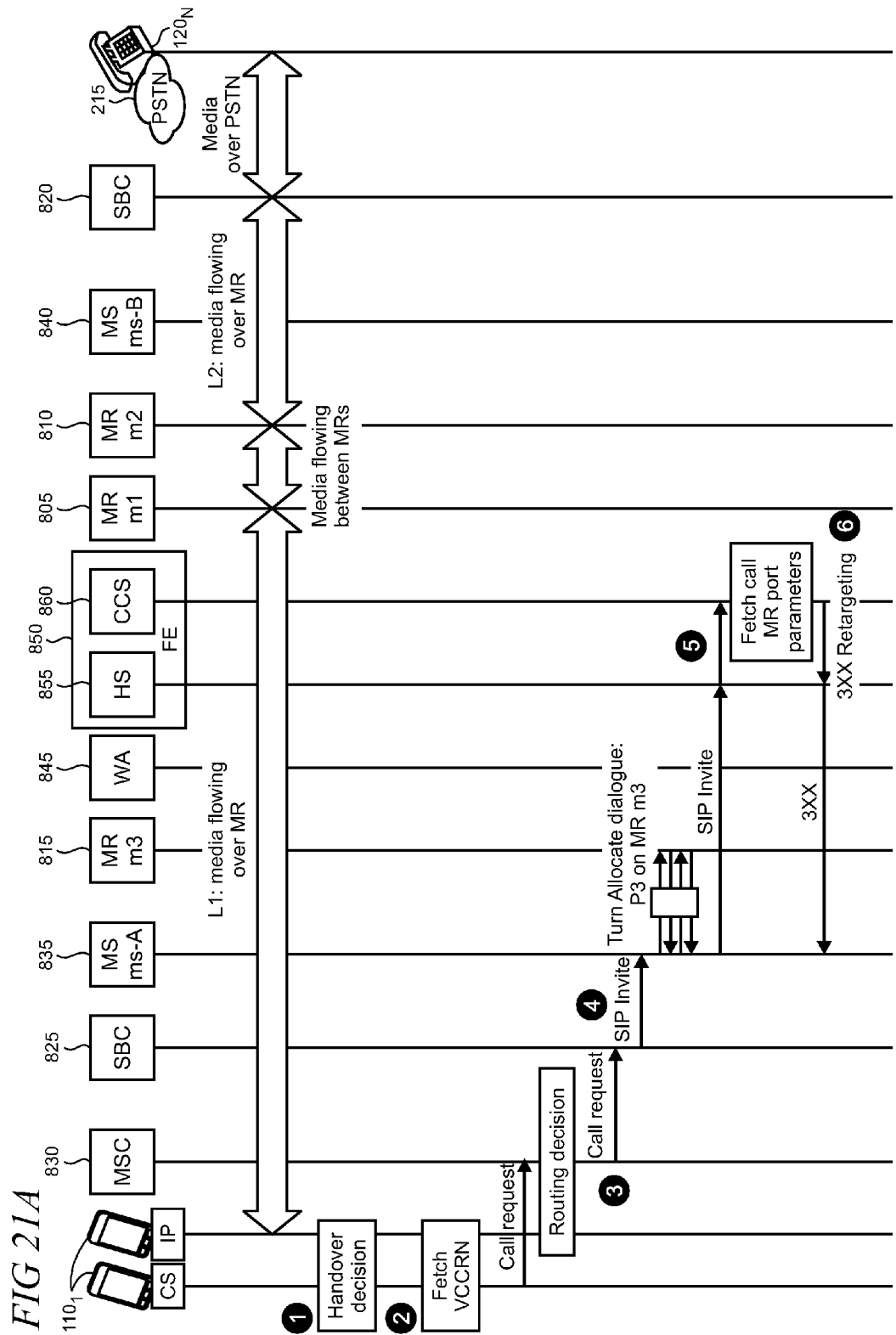
FIGS. 21A and 21B show an illustrative call flow for an immediate state of call handover from an IP connection to a CS service on an MO network.
Figure 21B:
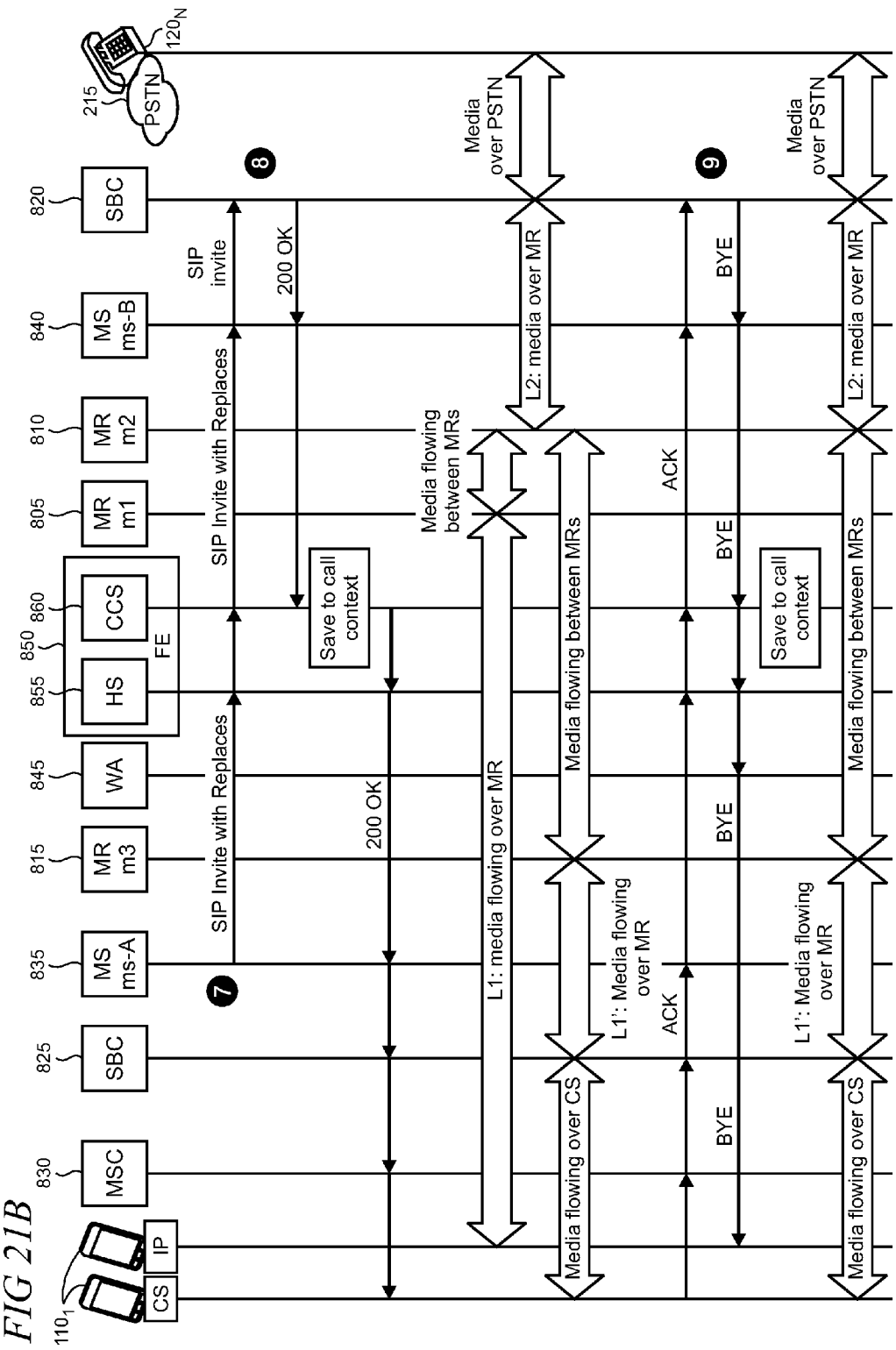

In the discussion accompanying FIGS. 11-18, call flows for initial calls were presented. A call flow for Scenario A in which handover is performed from Wi-Fi to CS is now presented. This scenario could occur, for example, because a mobile phone 110 determines that Wi-Fi conditions are worsening so it needs to initiate a handover to a CS connection. FIG. 19 shows a topological view of the handover from Wi-Fi to CS. FIG. 20 shows a flowchart 2000 of the call flow for the handover which includes circled numbers 1-9 that are indexed to the illustrative call flow diagrams shown in FIGS. 21A and 21B. The discussion that follows assumes that the mobile phone 110 has already received and stored the VCCRN for the initial call that was set up over Wi-Fi.

In step 1 at block 2005, the mobile phone determines that a handover to CS is appropriate. A discussion of handover decision making by the mobile phone was presented above at the text accompanying FIG. 7. In step 2 at block 2010, the mobile phone 110 retrieves the ongoing call's VCCRN from its local call state and initiates creation of a new CS call leg. The mobile phone 110 signals a CS call setup to the MSC 830 in the MO network 205 and includes the parameters CgPN=MDN (or =MPhone#), and CdPN=VCCRN.

In step 3 at block 2015, the MO network 205 routes the call to the core VoIP network 500. The MO network 205 will determine that the call request is related to a mobile phone associated with the core VoIP network (since the CgPN belongs to such a mobile phone) and will thus route it to the SBC 825. In step 4 at block 2020, a new call leg is created in the core VoIP network 500. The SBC 825 initiates a new SIP call dialogue with a new call-ID and sends the SIP Invite to the mediation server ms-A 835. The SIP Invite includes the parameters CgPN=MDN (or =MPhone#), and CdPN=VCCRN. When the mediation server ms-A receives the SIP Invite, it allocates a port P3 on the nearby media relay m3 815 using TURN. The mediation server ms-A, functioning as a B2BUA, performs call routing based on the CgPN and CdPN and routes the call to the FE 850 for further processing in the core VoIP network 500.

In step 5 at block 2025, the HS 855 as part of the origination treatment hands over the Invite to the CCS 860. The CCS 860 notes that the CdPN is a VCCRN and extracts information about the existing call leg from the saved call state so that the existing call leg can be replaced with the new call leg. The call state information also indicates that the existing call is flowing through the media relay m2 810 and that the far end of the call is controlled by the mediation server ms-B 840 which is functioning as a B2BUA.

In step 6 at block 2030, the CCS 860 initiates Retargeting of the call by generating a 3XX Retargeting message. The message includes the Call-IDs (both old and new), target End Points, and media relay information. The HS 855 routes it to the mediation server ms-A 835. In step 7 at block 2035, the mediation server ms-A 835 processes the 3XX message to determine information about the original call and sends a SIP Invite with Replaces to the FE 850 which routes the Invite to the egress mediation server ms-B 840. The Invite provides the original call information and the SDP (i.e., SDP3) relating to port P3. The B2BUA functionality in the mediation server ms-B generates a SIP Invite for the SBC 820 interfacing with the PSTN 215 which includes a new call-ID along with information relating to port P2, in a similar manner as with the prior Invite, however this Invite uses the codec provided by the mediation server ms-A 835 that is suitable for SBC 820.

In step 8 at block 2040, the SBC 820 sends back a 200 OK message to the mediation server ms-B 840 with the selected codec. The mediation server ms-B prepares a corresponding SDP for the left side dialogue and responds via the FE 850. The CCS 860 in the FE 850 saves the information about the new call leg from the message into the call context in the network's storage substrate, and then routes the message to the mediation server ms-A 835. The reverse ACK signaling completes the setup of the new call leg. This setup enables the media to flow on both paths in parallel to the mobile phone $110_1$.

In step 9 at block 2045, upon receiving the ACK, the SBC 820 on the PSTN far end sends a BYE message as part of the dialogue associated with the original call. This causes the original L1 leg to be terminated. The CCS 860 saves the call context in the network to appropriately reflect the post-handover state.

It is important to note that the IP connection at the mobile phone $110_1$ might be susceptible to dropping at any time during the handover process. However, as is evident from the call flow in FIGS. 21A and 21B, a dropped IP connection would not impede the establishment of the new call leg on the CS service. Nor would such drop prevent the network from recognizing the termination of the original call leg. However, the resulting loss of media stream would be noted by the media relay m1 805 on leg L1, thus an appropriate clean-up at the media relay could be implemented. Typically, such clean-up is delayed by some guard time interval to ensure that the handover can be completed without port P2 being torn down prematurely in the clean-up process.

Figure 22:
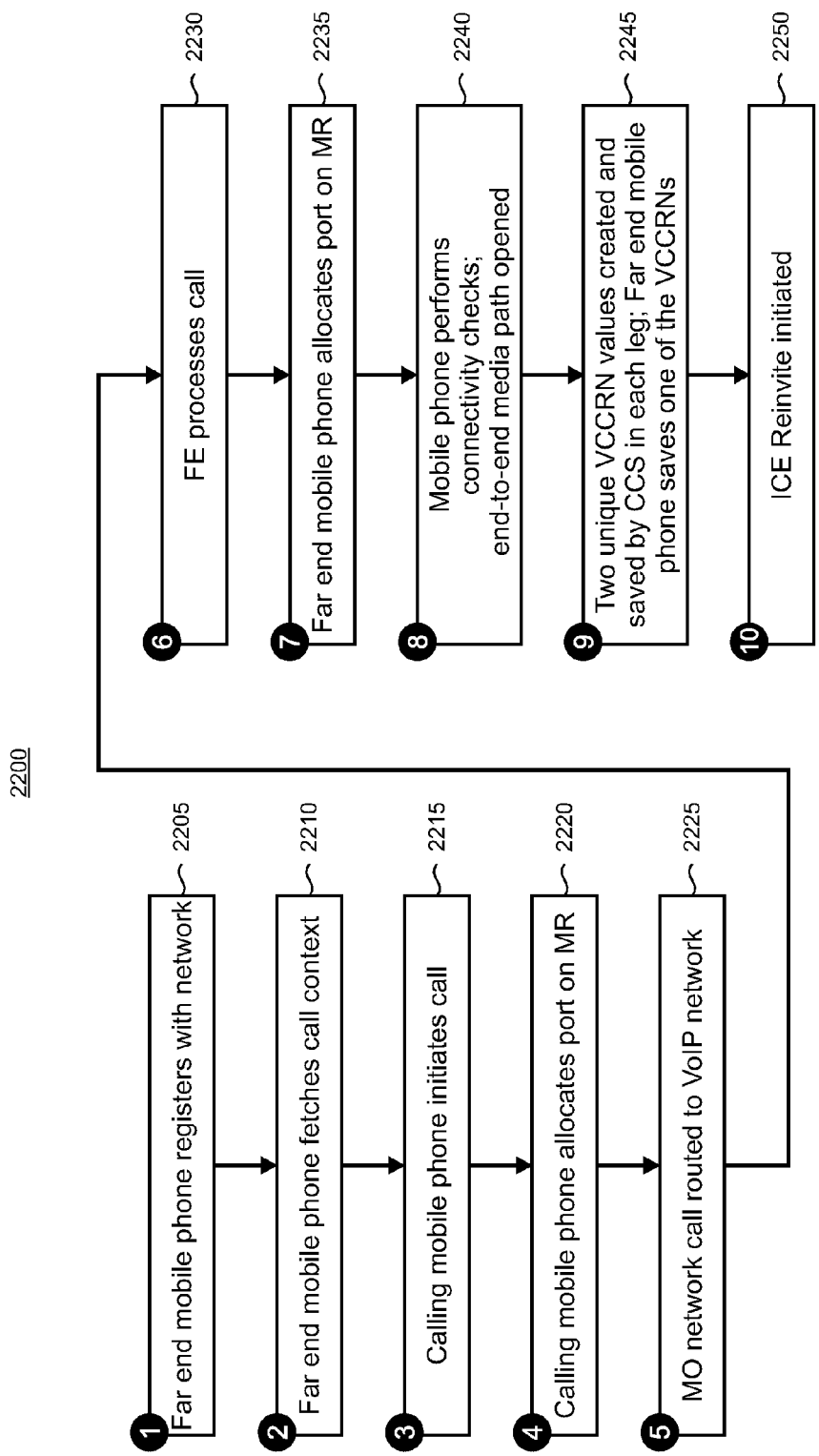
FIG. 22 shows a flowchart of an illustrative call flow for an initial call setup for a call originated by a mobile phone over a connection to a CS service on an MO network.
Figure 23A:
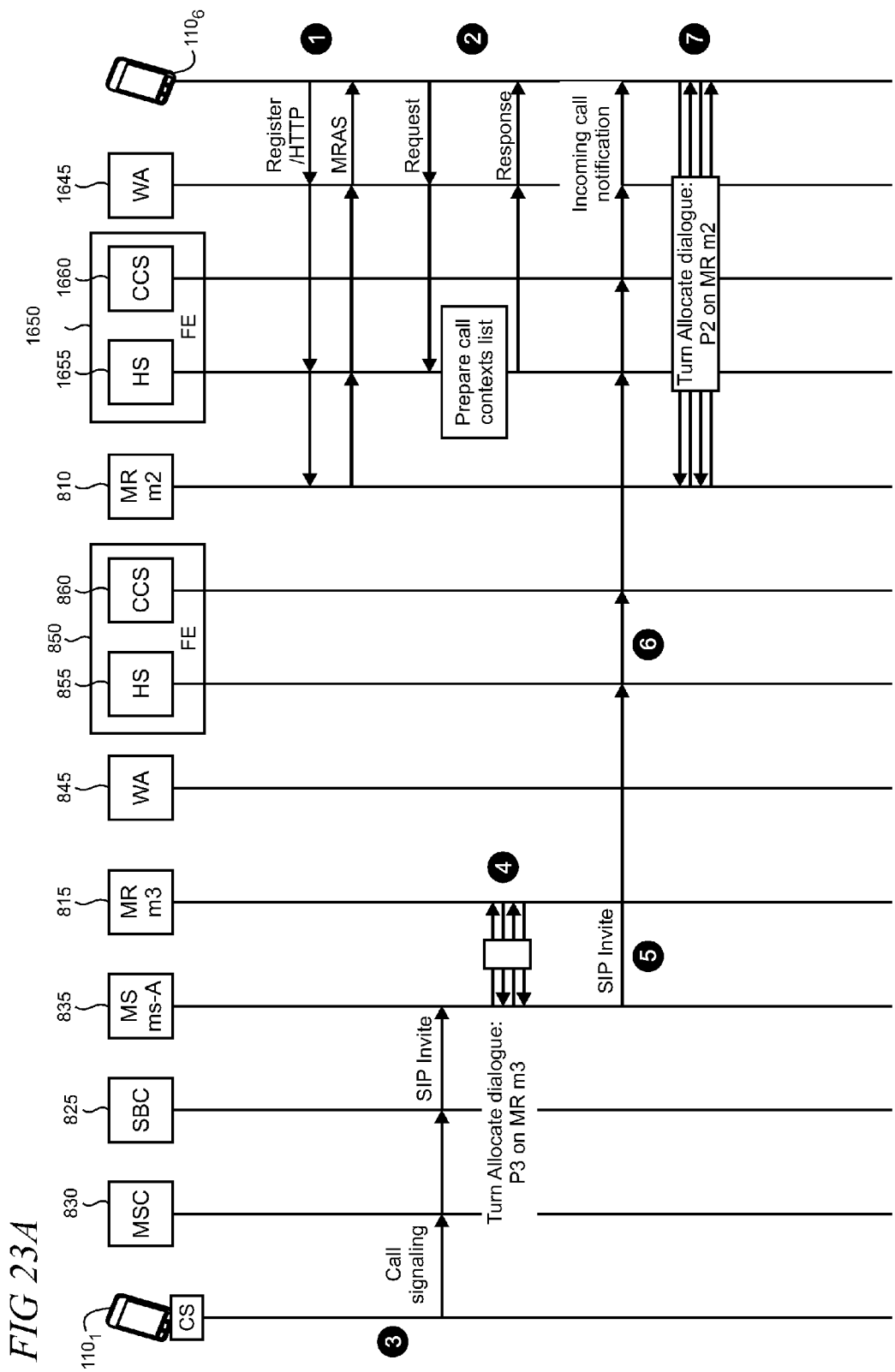
FIGS. 23A and 23B show an illustrative call flow for an initial call setup for a call originated by a mobile phone over a connection to a CS service on an MO network.
Figure 23B:
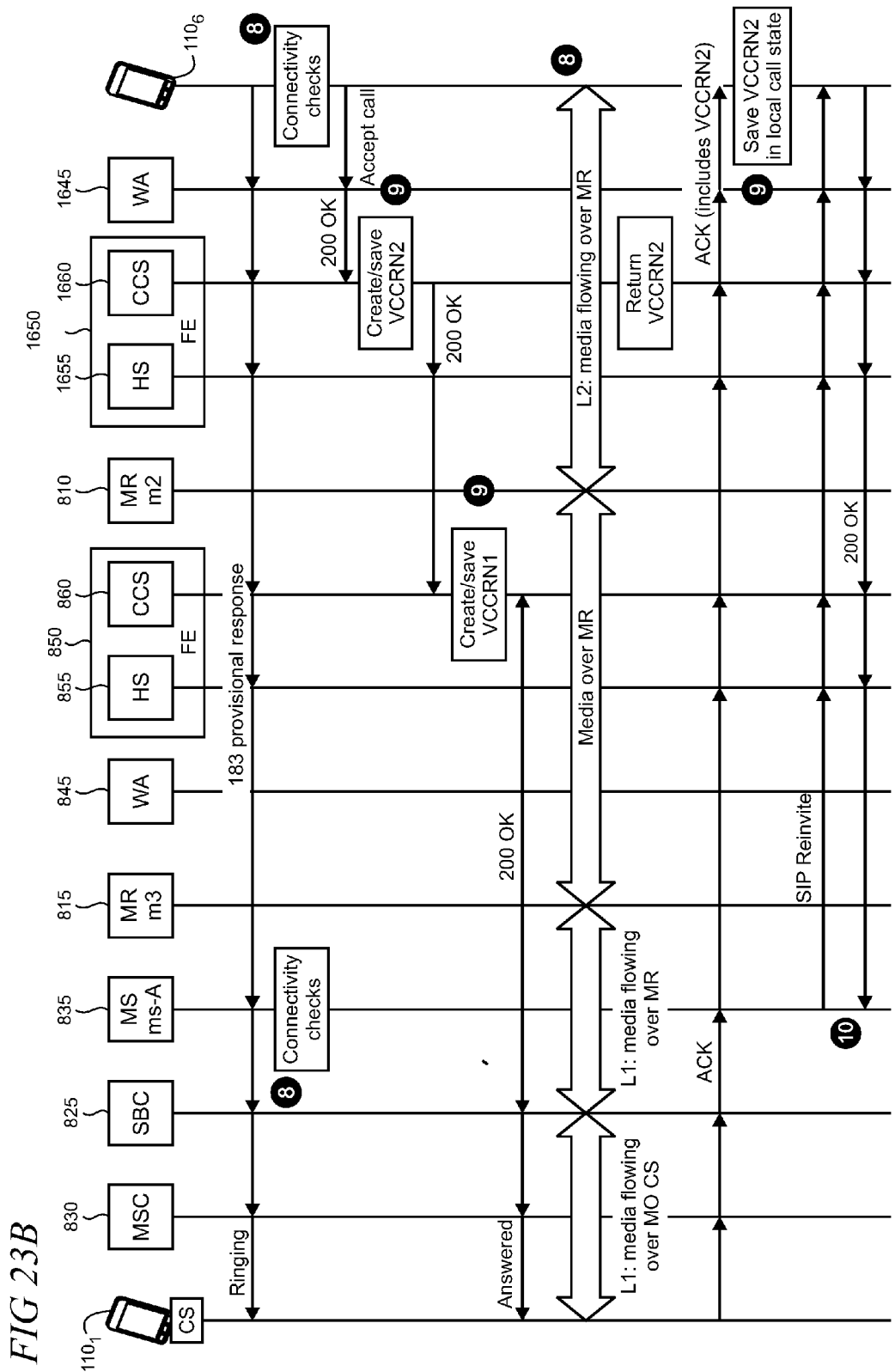

A call flow for Scenario B in which handover is performed from CS to IP (either Wi-Fi or PS) is now presented beginning with a review of the establishment of the initial call. FIG. 22 shows a flowchart 2200 of an illustrative call flow for an initial call setup for a call originated by a mobile phone over a connection to a CS service on the MO network. The flowchart 2200 includes circled numbers 1-10 that are indexed to the illustrative call flow diagrams shown in FIGS. 23A and 23B.

The far end mobile phone $110_6$ registers with the core VoIP network 500 in step 1 at block 2205 and fetches call context in step 2 at block 2210. In step 3 at block 2215, the calling mobile phone $110_1$ initiates a call over a CS connection which is forwarded through the SBC 825 to the mediation server ms-A 835. The mediation server ms-A allocates a port P3 on media relay m3 815 using TURN in step 4 at block 2220. In step 5 at block 2225, the mediation server ms-A generates a SIP Invite which is forwarded through the FE 850 for processing, in step 6 at block 2230, and to the far end as an incoming call notification. The far end mobile phone $110_6$ allocates port P2 on media relay m2 using TURN in step 7 at block 2235. An 18x message is sent back to the originating mobile phone $110_1$ to indicate ring back.

Figure 24:
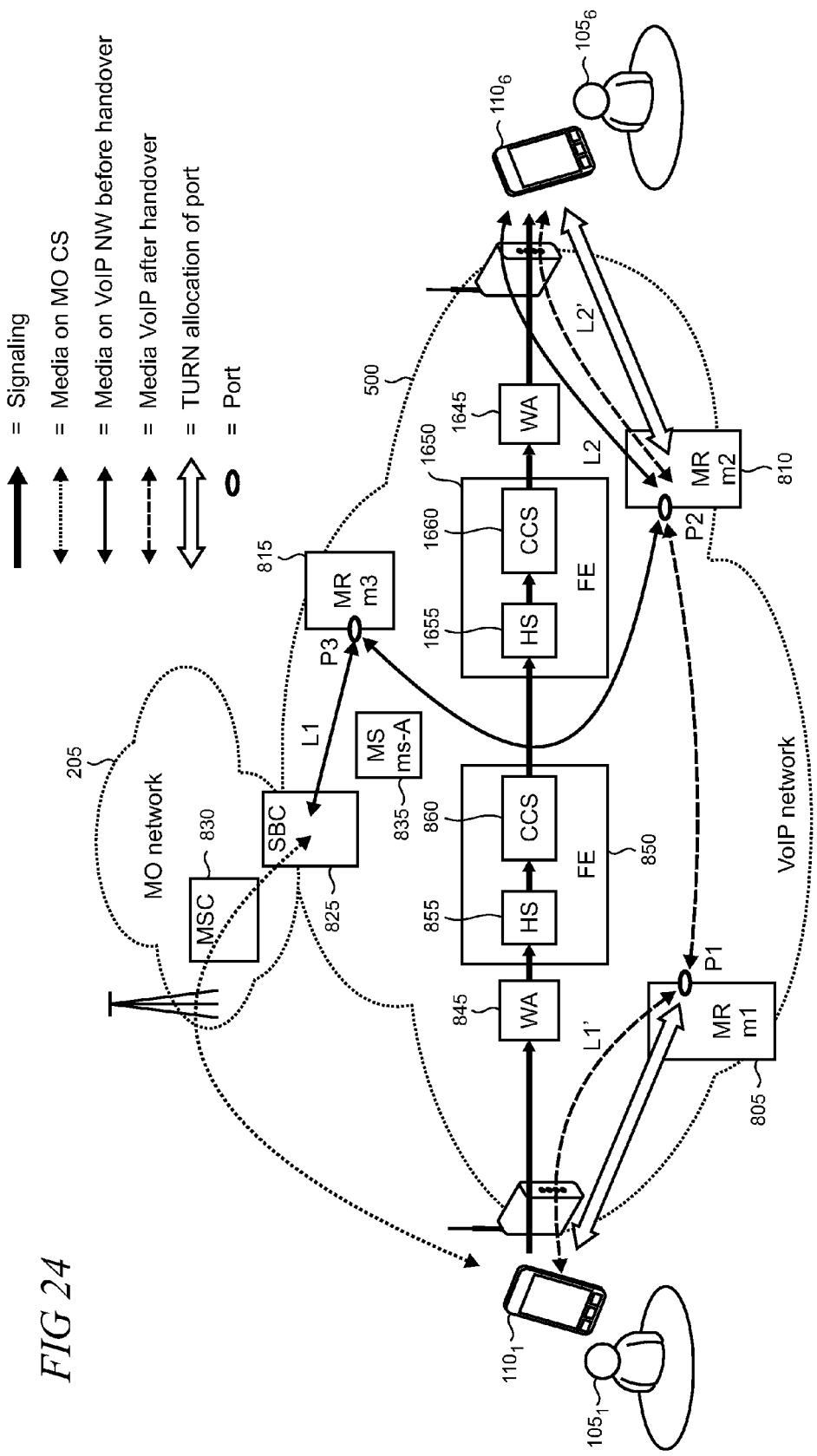
FIG. 24 shows an illustrative hybrid network topology for media and signaling call flow in which a call is handed over from a CS service on an MO network to a VoIP network.

In step 8 at block 2240, the mobile phone $110_6$ and the mediation server ms-A 835 perform ICE connectivity checks and an end-to-end media path is enabled from the CS service through the SBC and the media relays m3 and m2 (see FIG. 24). In step 9 at block 2245, when the far end mobile phone $110_6$ answers the call, it signals a 200 OK message over HTTP to the WA 1645 which then generates a 200 OK message that is sent back to the calling mobile phone $110_1$ via the FEs 1650 and 850. Receipt of the 200 OK message triggers the generation of a unique VCCRN value by each respective CCS elements 860 and 1660 which are saved in the network's call state for the respective call legs for each of mobile phones 110.

The calling mobile phone $110_1$ sends an ACK back through the network elements to the far end mobile phone $110_6$ to complete the call setup dialogue. An ICE Reinvite is initiated by the mediation server ms-A 835 in step 10 at block 2250.

When the ACK message is received at the CCS 1660, it will return one of the VCCRN values (here, VCCRN2) to the far end mobile phone $110_6$ with the ACK. However, unlike the call flow shown in FIGS. 18A and 18B in which a VCCRN value is returned with the 200 OK message, the calling mobile phone $110_1$ does not obtain its VCCRN value in this manner because the signaling in the MO's CS service does not support it. Therefore, the mobile phone $110_1$ does not have the value needed to perform handover with call continuity. This issue may be addressed using the alternative call flow discussed in the text accompanying FIG. 12 above, by performing an Inband Request over a data connection from the calling mobile phone $110_1$ to the FE 850 via the WA 845 to obtain call context information, including the VCRRN value, prior to the commencement of a handover.

Turning now to the Scenario B handover, FIG. 24 shows a topological view of handover from CS to Wi-Fi. FIG. 25 shows a flowchart 2500 of the call flow for the handover which includes circled numbers 1-9 that are indexed to the illustrative call flow diagrams shown in FIGS. 26A and 26B. In this call flow, after registering with the core VoIP network 500, the calling mobile phone will make the Inband Request to the WA to receive the call context, including the VCCRN, for each of its current calls (both active and on-hold).

In step 1 at block 2505, the mobile phone $110_1$ registers with FE 850 in the core VoIP network and fetches the call contexts for all current calls at step 2 at block 2510. The mobile phone $110_1$ determines that a handover from the CS connection to the Wi-Fi connection is appropriate in step 3 at block 2515. The mobile phone $110_1$ will initiate a TURN dialogue to allocate port P1 on a nearby media relay m1 805 in step 4 at block 2520.

In step 5 at block 2525, the mobile phone $110_1$ initiates a new call leg over Wi-Fi. The call parameters signaled in the request sent to WA 845 include the VCCRN, SDP, and a new SRTP key (additional details about SRTP re-keying are provided in the text accompanying FIG. 31 below). In step 6 at block 2530, the FE 850 processes the call and sends a SIP Invite with Replaces to the far end mobile phone $110_6$ in step 7 at block 2535. The Invite includes a new call-ID, the old call-ID, and the SDP.

In step 8 at block 2540, the far end mobile phone $110_6$ replies to the Invite with a 200 OK message that includes a new key. Each respective CCS (i.e., CCS 1660 and CCS 860) receiving the 200 OK message saves the information in it to the call context in the storage substrate. The calling mobile phone $110_1$ receives the 200 OK message which signifies a media stack event indicating that a new media stream is active and available. Two media streams thus operate in parallel—the L1 stream in the original call leg on CS, and the new L1' stream in the new call leg on Wi-Fi.

The calling mobile phone $110_1$ sends an ACK message which is acknowledged at the far end with a BYE message that is routed via the ms-A 835 to the SBC 825 and thus to the MSC 830. The MSC 830 in the MO network will then dismiss the original call leg in step 9 at block 2545 to complete the handover. Each respective CCS (i.e., CCS 860 and CCS 1660) saves the call context in the network to appropriately reflect the post-handover state.

Figure 27:
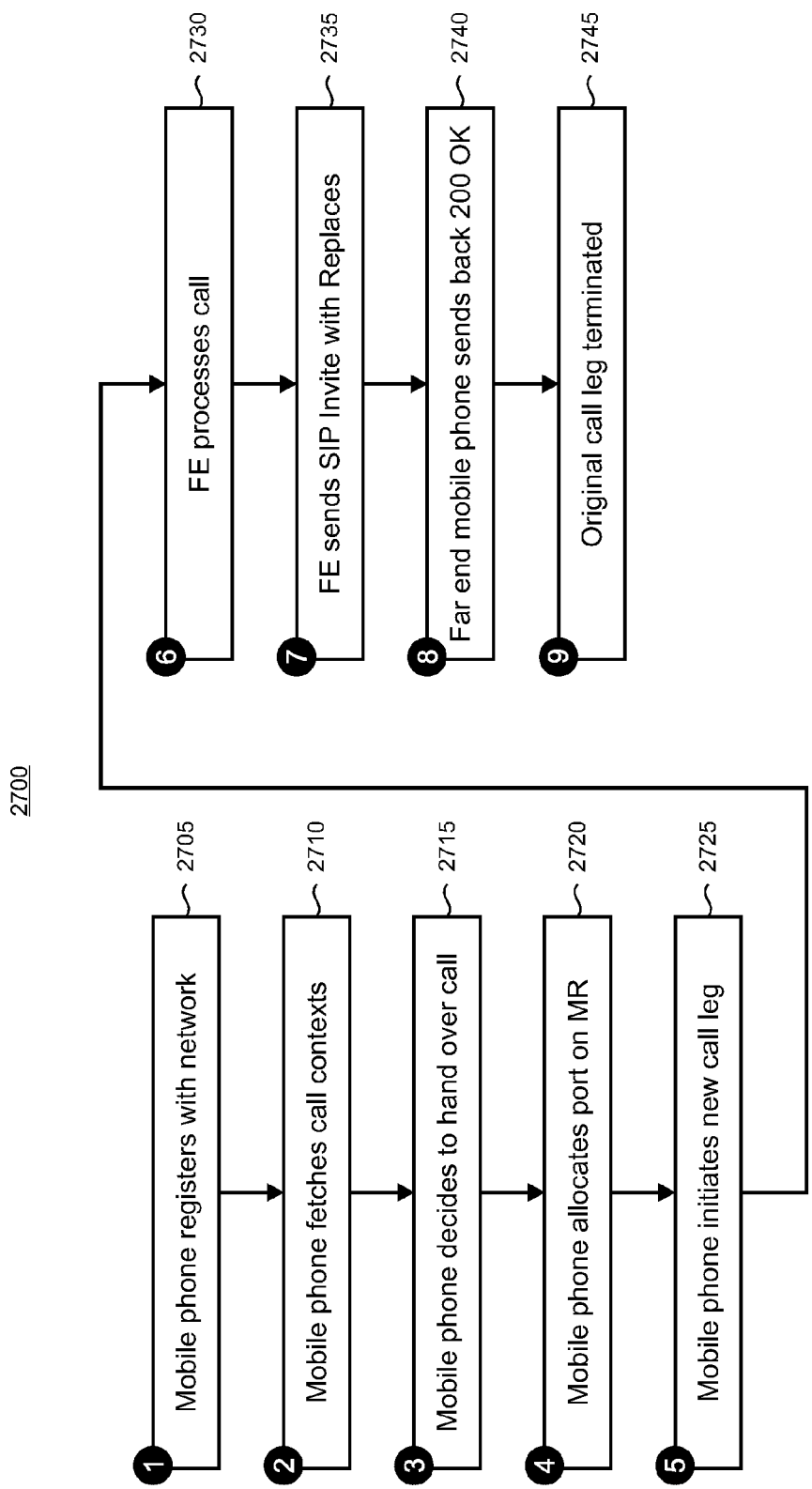
FIG. 27 shows a flowchart for an illustrative immediate state of call handover from a cell data service on an MO network to a VoIP network.
Figure 28A:
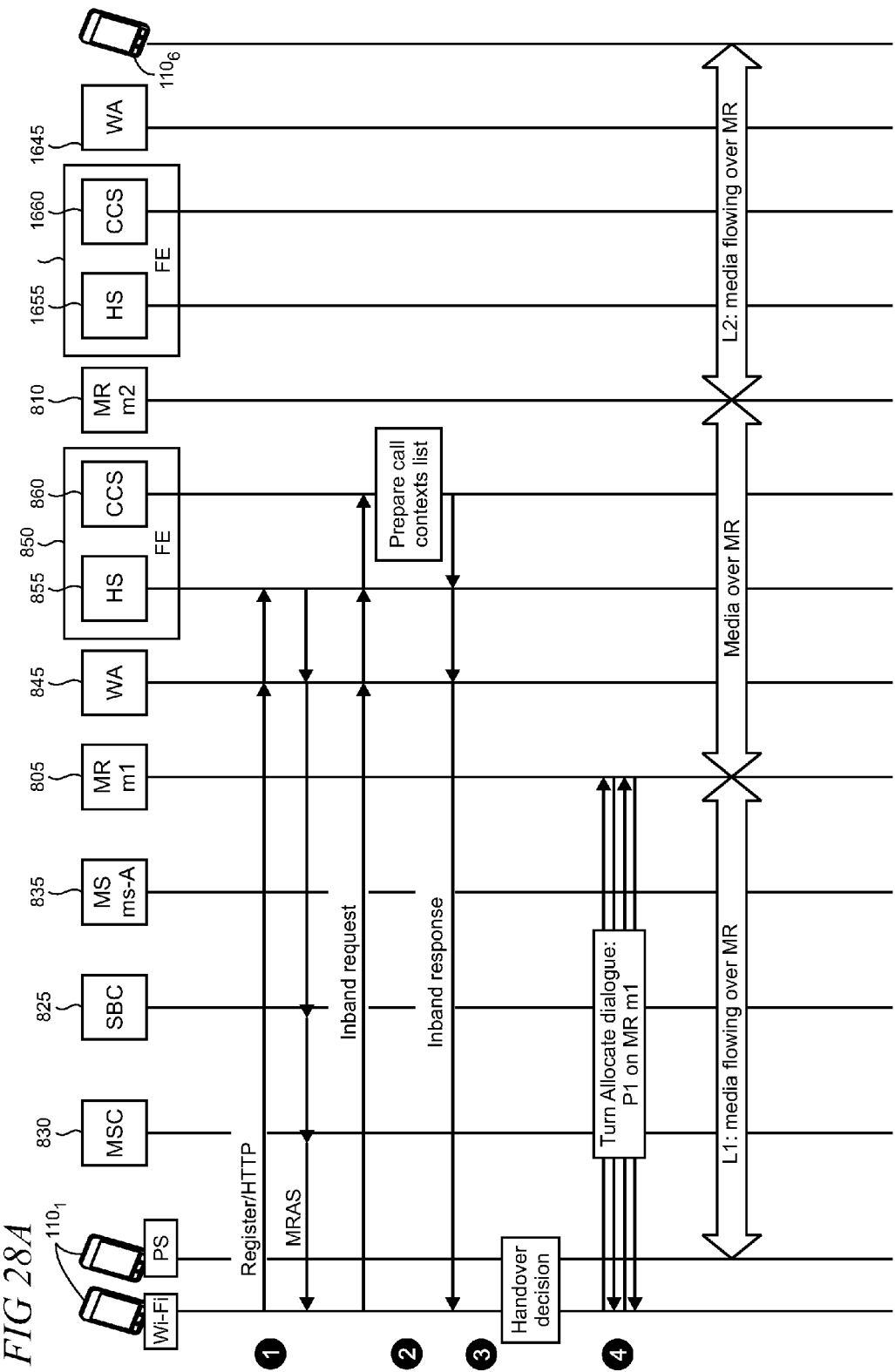
FIGS. 28A and 28B show an illustrative call flow for an immediate state of call handover from a cell data service on an MO network to a VoIP network.
Figure 28B:
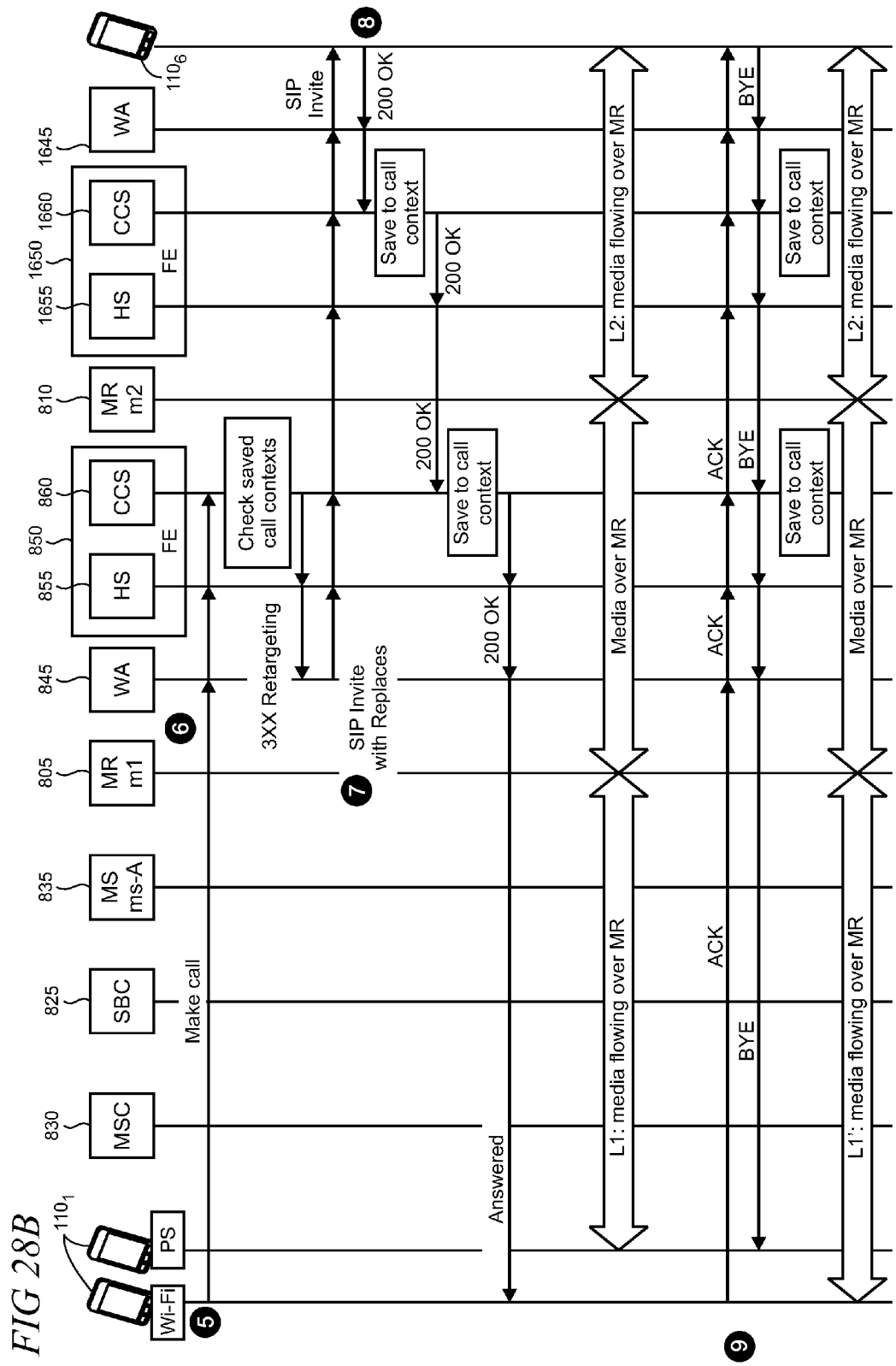

Turning now to the Scenario C handover, FIG. 27 shows a flowchart 2700 of the call flow for an IP (PS) to IP (Wi-Fi) handover which includes circled numbers 1-9 that are indexed to the illustrative call flow diagrams shown in FIGS. 28A and 28B. The initial call setup between mobile phones 110 is shown in FIGS. 17, 18A, and 18B and described in the accompanying text. For the discussion of this Scenario C, it may be assumed that the mobile phone $110_1$ on the left side in FIGS. 18A and 18B was initially connected via a PS connection. At some point in time, the mobile phone $110_1$ finds itself in a location with excellent Wi-Fi connectivity and thus wants to handover the call to this less expensive connection.

In step 1 at block 2705, the mobile phone $110_1$ registers over Wi-Fi with FE 850 in the core VoIP network and fetches the call contexts for all current calls at step 2 at block 2710. The mobile phone $110_1$ determines that a handover from the PS connection to the Wi-Fi connection is appropriate in step 3 at block 2715. The mobile phone $110_1$ will initiate a TURN dialogue to allocate port P1 on media relay m1 805 in step 4 at block 2720.

In step 5 at block 2725, the mobile phone $110_1$ initiates a new call leg over Wi-Fi. The call parameters include the VCCRN and SDP. In step 6 at block 2730, the FE 850 processes the call and sends a SIP Invite with Replaces to the far end mobile phone $110_6$ in step 7 at block 2735 using a retargeting approach described earlier. The Invite includes a new call-ID, the old call-ID, and the SDP.

In step 8 at block 2740, the far end mobile phone $110_6$ replies to the Invite with a 200 OK message. Each respective CCS (i.e., CCS 1660 and CCS 860) receiving the 200 OK message saves the information in it to the call context in storage substrate. The calling mobile phone $110_1$ receives the 200 OK message. Two media streams thus operate in parallel—the L1 stream in the original call leg on PS, and the new L1' stream in the new call leg on Wi-Fi.

The calling mobile phone $110_1$ sends an ACK message to the far end mobile phone $110_6$ which then dismisses the original call leg in step 9 at block 2745 to complete the handover. Each respective CCS (i.e., CCS 860 and CCS 1660) saves the call context in the network to appropriately reflect the post-handover state.

A discussion of the special circumstances of CDMA is now presented. As noted above, a key limitation of some CDMA networks is that a mobile phone can only have a CS or PS session active at any given time over a cellular connection. For voice call continuity, a mobile phone will discover and save the VCCRN value assigned to a given call by the core VoIP network. The VCCRN value is used when setting up new calls legs to implement handover. However, the methods used to communicate the VCCRN back to the mobile phone during the initial call setup utilize connections over IP, for example using the 200 OK and ACK messages, as described above. For a CDMA mobile phone which establishes a call over CS in a location that does not have Wi-Fi connectivity, these aforementioned methods cannot work because after the initial call setup, the mobile phone will not know the VCCRN for its newly established call. Accordingly, for the special CMDA case, a technique that is similar to the alternative call flow noted above in the text accompanying FIGS. 12 and 17 may be utilized. Here, once the CDMA mobile phone (simply referred to as the "mobile phone" in the discussion that follows) obtains IP connectivity, it can request the context of its current calls from the core VoIP network, including the VCCRN and other relevant call context parameters, by a request to the WA. In this discussion, it is assumed that the mobile phone can have a maximum of two voice calls at a time, whether active or on-hold.

Under Scenario B (CS to Wi-Fi) for the special CDMA case, when the mobile phone moves to a location where high quality Wi-Fi is available, it will typically decide to hand over the call from the CS connection to Wi-Fi. The mobile phone first obtains the VCCRN of the call that it is looking to hand over. When the mobile phone discovers the Wi-Fi connection and decides to associate with it, it will register with the core VoIP network and then issue an inband request for call contexts. The WA and FE will respond to the mobile phone with information for its current calls including the VCCRN values for these calls. The network will know which calls are active at this time and may indicate this in the information included in the response. Accordingly, using this approach the mobile phone can discover the VCCRN values for its current (at most two) calls and then correctly associate the appropriate value with each of the calls.

The mobile phone will next initiate a new call leg over the Wi-Fi connection for each current call using the appropriate VCCRN. Handover will then be implemented as with the preceding illustrative examples for non-CDMA circumstances. Although the creation of the new call leg could be implemented by directly manipulating the port on the media relay, such technique does not resolve the typical need to modify the state of the call to reflect such change. Thus, an appropriate creation of the leg by sending an Invite/HTTP to the WA (with the destination being VCCRN) has the benefit of ensuring that the call leg creation is recorded by the FE and CCS that is associated with the mobile phone.

Under Scenario B' (CS to PS) for the special CDMA case, the VCCRN discovery is the same as under Scenario B for CDMA that is immediately described above. However, in order to perform the handover, the CS connection needs to be abandoned in order to be able to set up a PS connection over the cellular network. In addition, it may be possible that the mobile phone does not know the VCCRN of the current call at the time of handover. A further difficulty is that the mobile phone may not be able to determine if the PS connection at its current location will provide acceptable call quality.

To address these issues, the mobile phone will first register over the PS-based IP connection and thus discover the VCCRN of the current calls as described above. Then it will initiate a new call leg over the PS connection to the VCCRN of the call to be handed over. A new media path will be set up, as with the previous non-CDMA examples, to the media relay and will start carrying the media stream.

There may also be some variability in how quickly the MO network detects that the CS path has been terminated and what action it takes upon the mobile phone's connection to the core VoIP network to request termination of the CS call. Accordingly, an important aspect of this technique is that the port on the mobile phone's media relay not be released immediately upon loss of the CS connection so that there is sufficient time to set up the call over the PS connection. It may be possible, in some cases in which the new call leg setup is relatively long, that some audible disruption may be heard by either end of the ongoing call, particularly at the far end. But, the call will not be dropped and continuity is still ensured using these techniques.

Under Scenario A' (PS to CS) if the mobile phone is in a call over a PS connection, then it should have already discovered the VCCRN for the call during the initial call setup or during handover to PS. In order to hand over the call to CS, the mobile phone will place a call over the CS connection. In a similar manner to the previous Scenario B' for the CDMA case, the move to the CS connection will terminate the PS connection from the mobile phone. However, if the new call leg is signaled to the core VoIP network within the time for which the media relay port is held before release, then the new call leg over CS will get plugged into the call's end-to-end media path and the call can proceed while maintaining continuity. As with the previous example, the length of call setup for the new leg may result in some audible disruption in some cases.

Aspects of the media path including security aspects are now presented. There are several aspects of the media path to be considered for voice call continuity. These include: 1) performing port mapping for a previously allocated port on a media relay, and 2) performing SRTP re-keying.

When performing port mapping, as discussed above, media relay ports are allocated and managed using TURN. Port mapping is performed for previously unallocated ports on a media relay so that the media relay can: 1) send the incoming traffic to the new IP/port on the mobile phone or the MS/SBC involved in the new call leg; 2) receive the traffic from this new IP/port and send it to the allocated port on the MR, and; 3) perform UDP/TCP (User Datagram Protocol/Transport Control Protocol) bridging on the MR if required. Such bridging may be needed if the two ends of the overall call have their media streams over different transport protocols (i.e., UDP or TCP). In this case, the media relay has to bridge the different forms of the media stream over these transports. For example, existing media relays already handle IPv4 (Internet Protocol version 4) to IPv6 (Internet Protocol version 6) bridging and vice versa.

Figure 29:
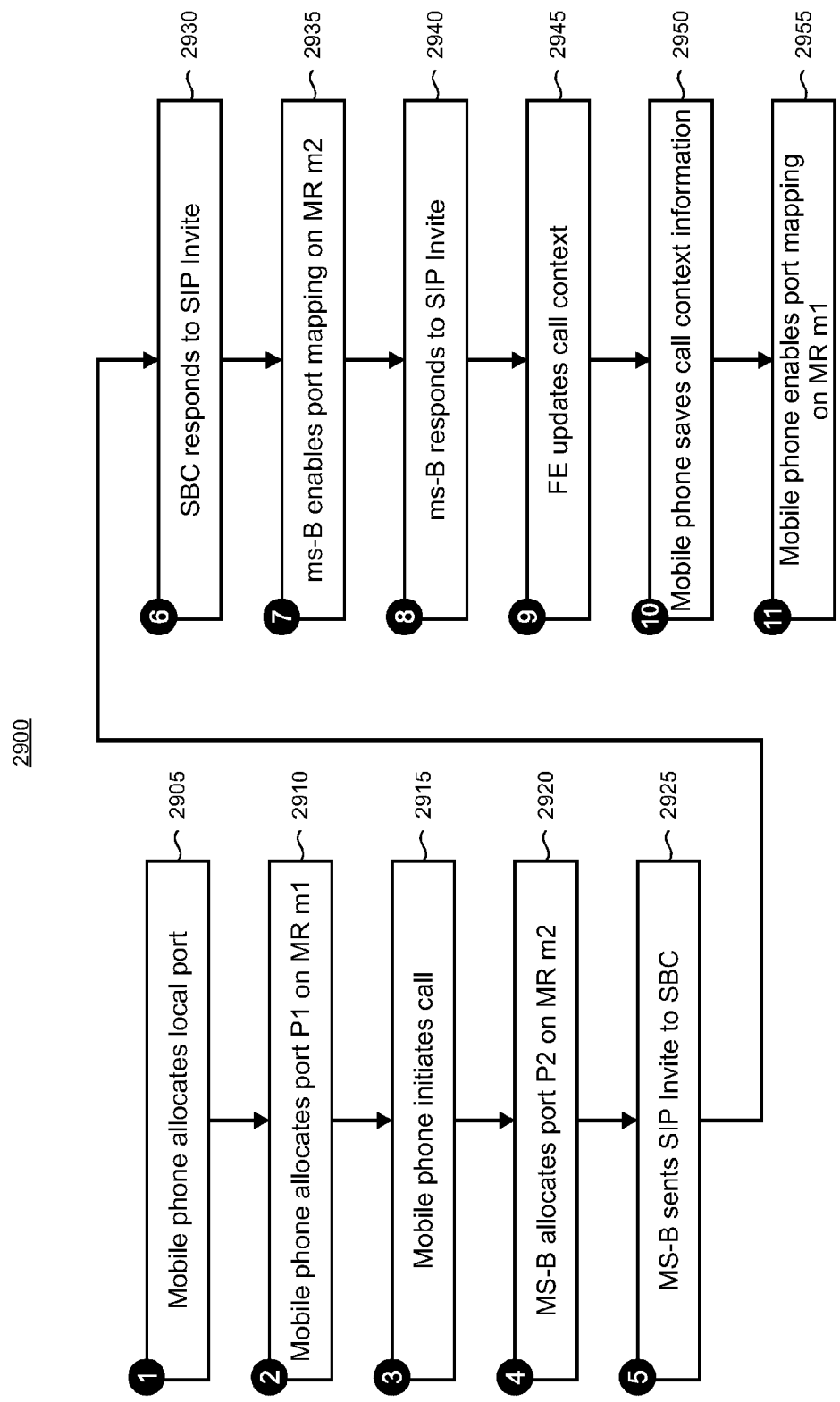
FIG. 29 shows a flowchart for illustrative media relay (MR) port allocation and mappings.
Figure 30:
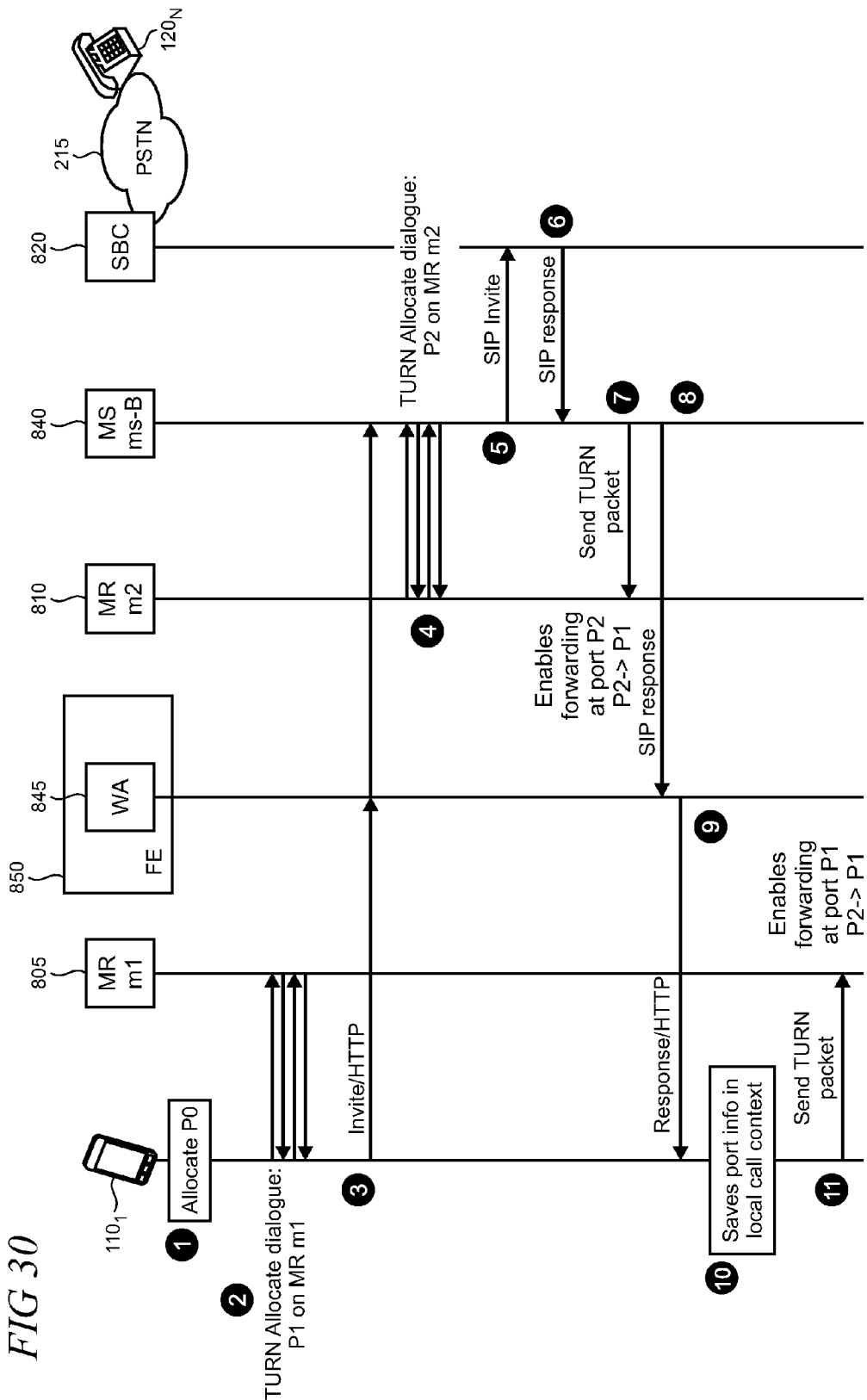
FIG. 30 shows an illustrative MR port allocation and mappings.

FIG. 29 shows a flowchart 2900 for port mapping for the illustrative case of a call being initially set up from a mobile phone 110 to equipment on a PSTN. The call flow for this case is shown above in FIGS. 11-13A/13B and described in the accompanying text. The flowchart 2900 includes circled numbers 1-11 that are indexed to the illustrative port mapping diagram shown in FIG. 30.

In step 1 at block 2905, the mobile phone 110 allocates a local port P0. In step 2 at block 2910, the mobile phone 110 allocates port P1 on the nearby media relay m1 805 using a TURN dialogue. In step 3 at block 2915, the mobile phone 110 sends a call Invite over HTTP with an SDP offering the port P1 as the preferred port. The Invite is routed by the WA 845 and FE 850 to the appropriate mediation server (here, mediation server ms-B 840) for connection to the PSTN 215.

In step 4 at block 2920, the mediation server ms-B 840 allocates port P2 on the nearby media relay m2 810 using TURN. In step 5 at block 2925, the mediation server ms-B 840, functioning as a B2BUA, sends a SIP Invite to the SBC 820 with an offered SDP with port P2. In step 6 at block 2930, the SBC allocates a local port Ps and responds to the mediation server ms-B with a SIP response message including the SDP with port Ps.

In step 7 at block 2935, the mediation server ms-B 840 enables port mapping on the media relay m2 810. It sends a TURN packet to media relay m2 supplying information about port Ps as the intended sender of the stream and port P1 as the destination to which port P2 should forward RTP related packets that arrive from port Ps. This is indicated as the mapping P2->P1 in FIG. 30.

In step 8 at block 2940, the mediation server ms-B 840 responds to the SIP invite with the complete SDP including port P2. In step 9 at block 2945, the FE 850 updates the call context by saving media path information. It forwards the response via the WA 845 to the mobile phone 110. The response includes the complete SDP and the information about ports P1 and P2. The VCC client in the mobile phone 110 saves the port information in its local call context in step 10 at block 2950. The mobile phone then enables port mapping on media relay m1 in step 11 at block 2955. In a similar manner to step 7, the phone sends a TURN packet to media relay m1 805 which supplies information about P0 as the intended sender of the stream and P2 as the destination to which port P1 should forward RTP related packets that arrive from P0. This is indicated as the mapping P1->P2 in the diagram. At this stage the end-to-end path is enabled bi-directionally from the mobile phone 110 to the SBC 820 via the two media relays m1 and m2.

Turning now to SRTP re-keying, SRTP keys are carried in the SDP Offer and Answer as part of the initial Invite and 200 OK message in the SIP dialogues in the call flows presented and discussed above. The initial offer will typically include three SRTP keys in the offered SDP in the SIP Invite. These are:

a=cryptoscale:1 client AES_CM_128_HMAC_SHA1_80
inline:Xd36oB1HVvmFxUq8JcZh8um6pULz3/YrYUxCtczM|2^31|1:1
a=crypto:2 AES_CM_128_HMAC_SHA1_80
inline:TWTImVlQtfwuZMLholYTTwsJM3sUx+hPZ5PbGi4u|2^31|1:1
a=crypto:3 AES_CM_128_HMAC_SHA1_80
inline:6ZqftFsKvldFcl2zmkT/LSGlAA981wl3YPQDHn16|2^31

The first key (offered with a=cryptoscale:1) is used in case of conference calls and is not relevant for two-party calls. The second key (offered with a=crypto:2) is the SRTP key which is preferred to be used in two-party one-on-one calls. This key contains the Master Key Index ("MKI") indicated above by 1:1 at the end of the key. This field is used in key management for re-keying.

Figure 31:
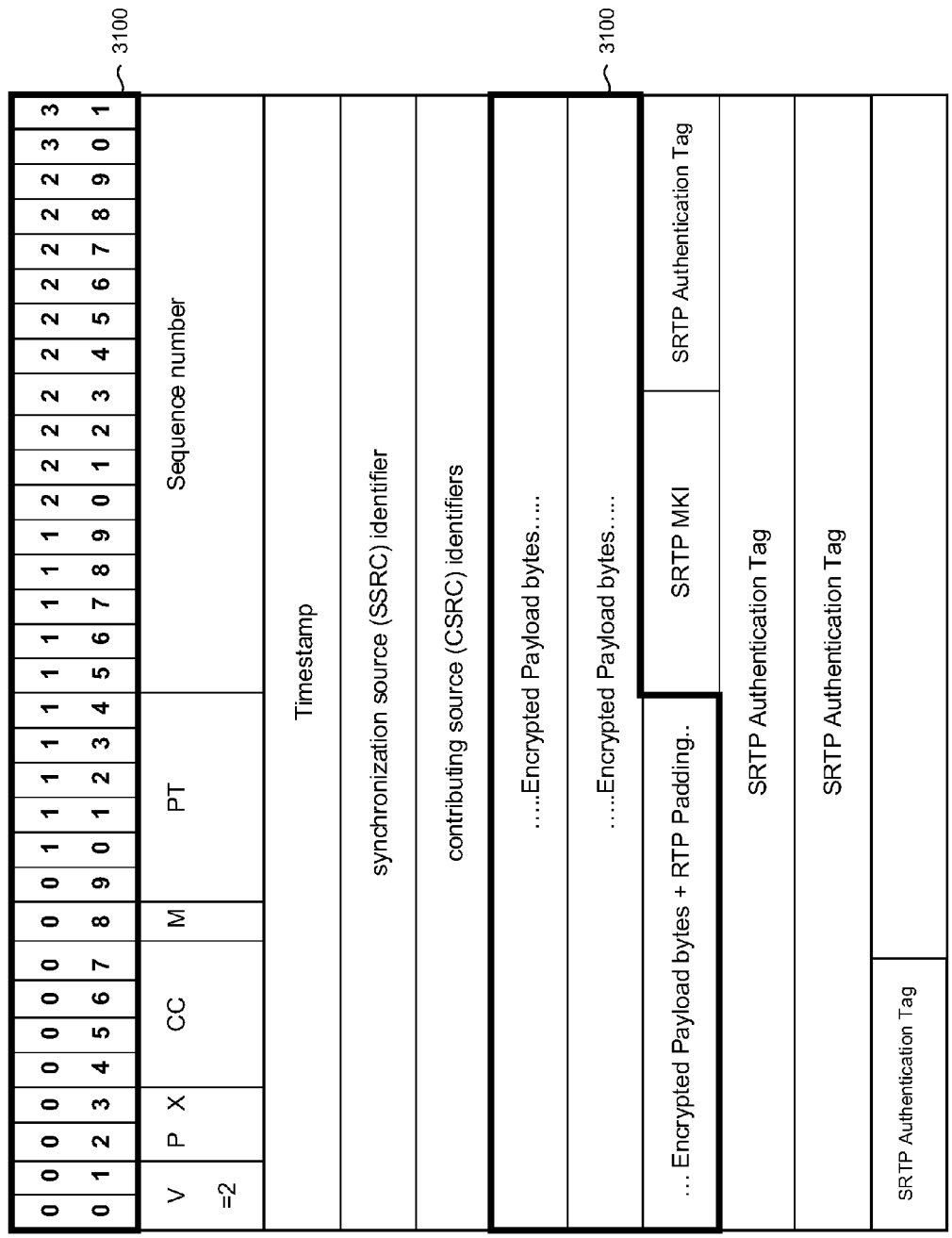
FIG. 31 shows an illustrative SRTP (Secure Real-Time Transport Protocol) packet.

The format of the SRTP packet sent on the wire is shown in FIG. 31 (only the payload bytes and padding are encrypted—shown with the heavy lines 3100 in FIG. 31) which makes clear that the MKI is included in the bytes following the payload and padding fields.

The third key (offered with a=crypto:3) is an SRTP key that comes without an MKI. It is the key that is used in two-party one-on-one calls by entities such as some gateways/SBCs which do not support MKI.

The answer from the remote side contains only one key. In the two-party, one-on-one case, the SDP answer contains the key selected by the far end. For example, if the following key is returned, a=crypto:2 AES_CM_128_HMAC_SHA1_80
inline:x2FMEeXz1GmSz1/Quyq9A9UhGIS9/zo/T42mO59c|2^31|1:1 then the "2" in the "a=crypto:2" tells the offering end that the answering end has accepted the "second" key in the original offer as the one to be used by the offering end for encrypting the stream that it originates. In addition, the answering end also sends the key it will use for the stream that it originates in the rest of the answer. This latter key is typically instantiated in a mode that is acceptable to the offering end's capabilities. Thus, the two ends can use these keys for the respective direction of the RTP/RTCP (RTP Control Protocol) stream.

After keys are exchanged and media is flowing both ways, each end uses its SRTP key to encrypt the media and uses the remote side key to decrypt the media. The media encryption/decryption relies on the index of SRTP which uses an RTP Sequence number and the number of times the RTP Sequence number has rolled over (i.e., index=2^16*ROC+RTP_SEQ). The RTP Sequence number is located in the header of each RTP packet, but the rollover counters are not sent over the wire.

Each end initializes the counter to zero at the end of the key negotiation and starts with a random initial sequence number. Each end keeps a count of how many rollovers of the sequence number have occurred and uses this information to encrypt/decrypt the packet. If there is a change of "physical" end point in the middle of the call, then the new "physical" end point cannot decrypt/encrypt correctly even if it has the keys because it does not know the current value of the rollover counter and does not know the current RTP Sequence number.

The presence of MKI in the media stream packet helps the receiving end know which key is being used to encrypt the packet without actually performing decryption of the packet. In addition, a new key is used to reset the rollover counter.

The end triggering the handover also sends the new SRTP key (ideally with a new MKI) in the SDP offered (it may actually send multiple keys for MKI and non-MKI situations since it might not be aware of the far end's capabilities). The "stationary" end will complete the offer by sending an answer with a new set of keys (it can ensure that it is using a different MKI in the SDP if MKI SRTP is selected).

Figure 26A:
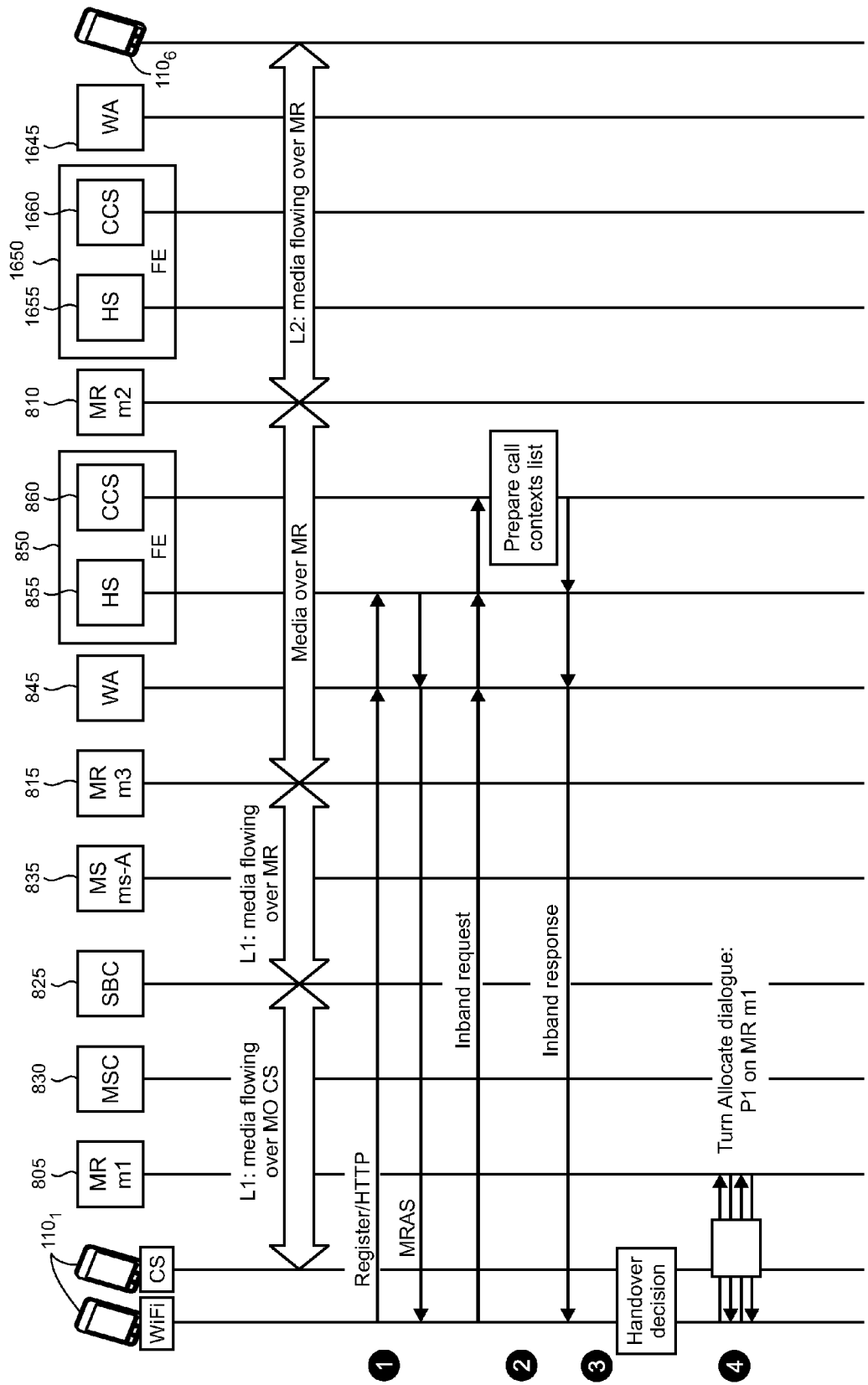
FIGS. 26A and 26B show an illustrative call flow for an immediate state of call handover from a CS service on an MO network to a VoIP network.
Figure 26B:
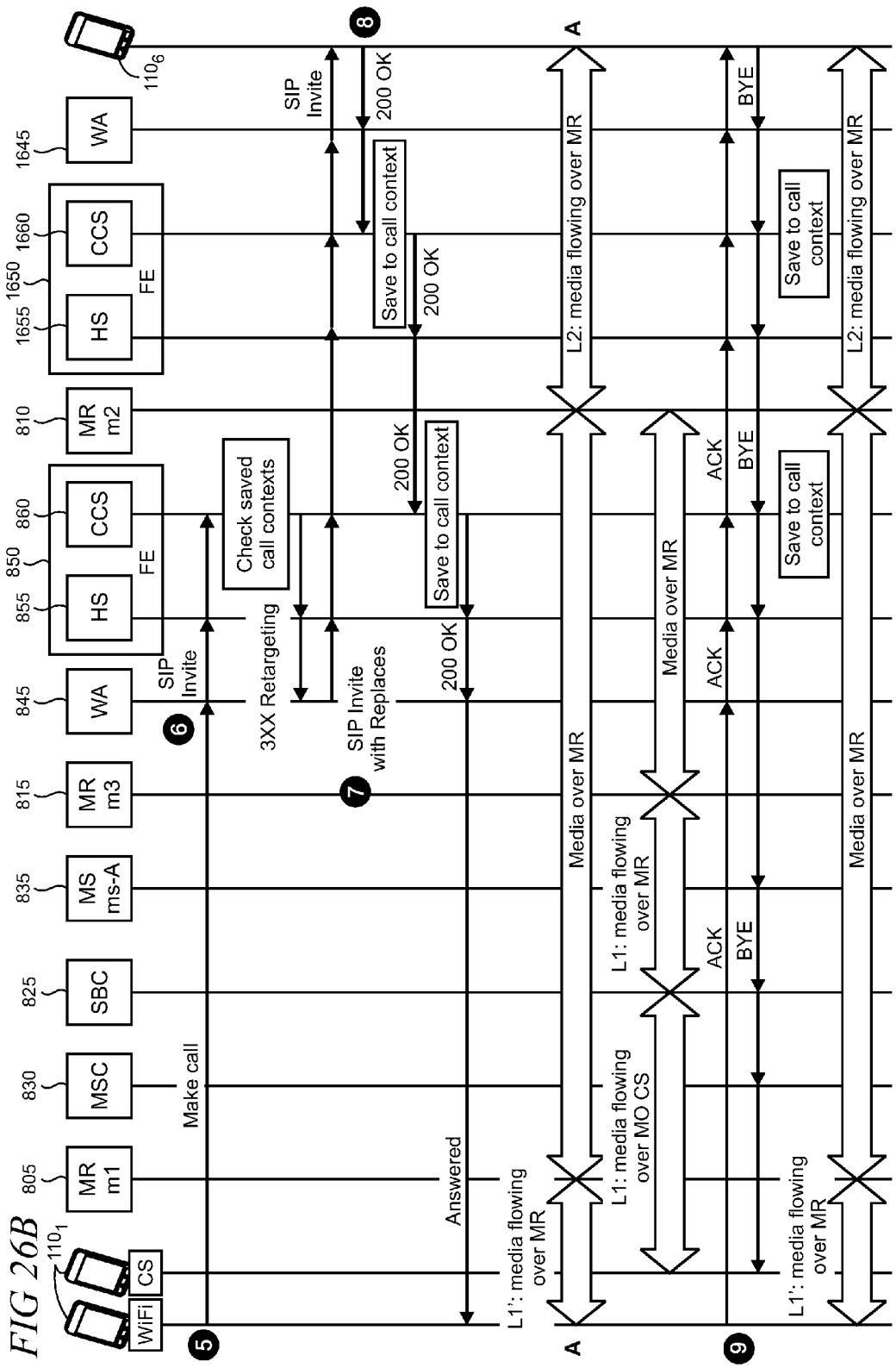

Thus for example, in the CS to IP handover call flow shown in FIGS. 26A and 26B, after the port sharing is enabled on port P1 of media relay m1 805, the mobile phone 110$_1$ on the left side is unable to decrypt the media stream received on leg L1' since it does not have either the key for that stream nor the rollover counter. Even if the network were somehow able to provide the key, it is unable to provide the rollover counter. In this example, it is only after the hand shake for the new leg is completed that the top stream indicated by the markers "A" in FIG. 26B can be decrypted end-to-end by the mobile phones on both ends.

Figure 32:
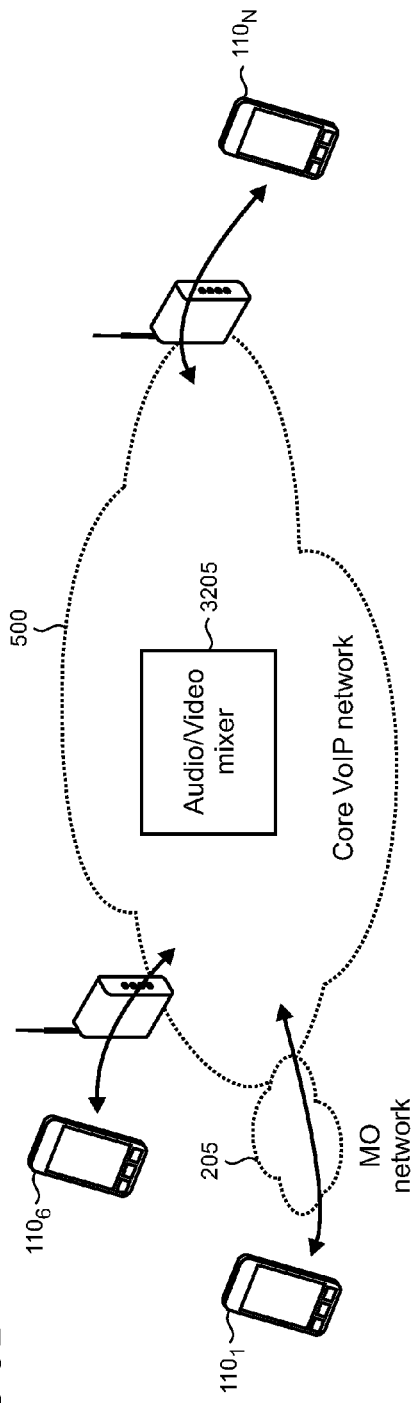
FIG. 32 shows an illustrative hybrid network in which an audio/video mixer is included in the core VoIP network to implement multi-party calls.

The above-described voice call continuity techniques may also be applied to scenarios involving multi-party calls (e.g., three-party conference calls) using an audio/video mixer 3205 as an additional network element in the core VoIP network 500 as shown in FIG. 32. It will be appreciated that once a multi-party conference call is set up, the handover of any given call leg may be performed in a similar manner as with a two-party call, as described above. In addition, a handover may be performed in situations in which a conference call is migrated to a different conferencing server. For example, a server may go down, or it may be desirable to migrate a conference to a server that is closer to more of the conference participants in order to improve quality, reduce latency, and the like.

Figure 33:
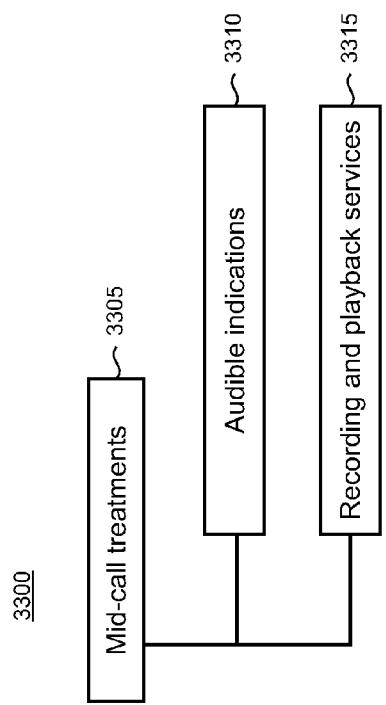
FIG. 33 shows an illustrative taxonomy of mid-call treatments that may be implemented using a hybrid network.

The hybrid network design described above enables delivery of a variety of mid-call treatments in the media stream. Such mid-call treatments are possible because the core VoIP network anchors the media stream of the call and therefore provides a mechanism to provide additional call features. FIG. 33 shows an illustrative taxonomy 3300 of such treatments. As shown, the mid-call treatments 3305 may include audible indications 3310 and recording and playback services 3315.

The audible indications 3310 may comprise one or more tones, recorded or synthesized voice, or other form of audible message that can be used to notify the user at the far end of the call (i.e., the end of the call that is not presently undergoing a handover) that a call transition is ongoing. In the case of a mid-call interruption, another treatment could insert an audible indicator requesting that the user at the far end stay on the call (e.g., "hold the line") while the call is being adjusted. These treatments serve to keep the users at the far ends from terminating the call in case there is a short period of silence in the call or other perceived interruption which might lead the far end user to believe the call has been dropped or disconnected.

The recording and playback services 3315 of the mid-call treatments 3305 may include capturing portions of the conversations in a call, with the participant's permission, for later playback under certain conditions. In one illustrative example using a multi-party call scenario, parties to the call may be offered a replay of any conversation that may have been missed in the event of a call drop or other interruption that may occur during a handover. The replay could occur at either normal speed or at a faster than normal speed so that a party could get caught up quickly and rejoin the conversation.

Figure 34:
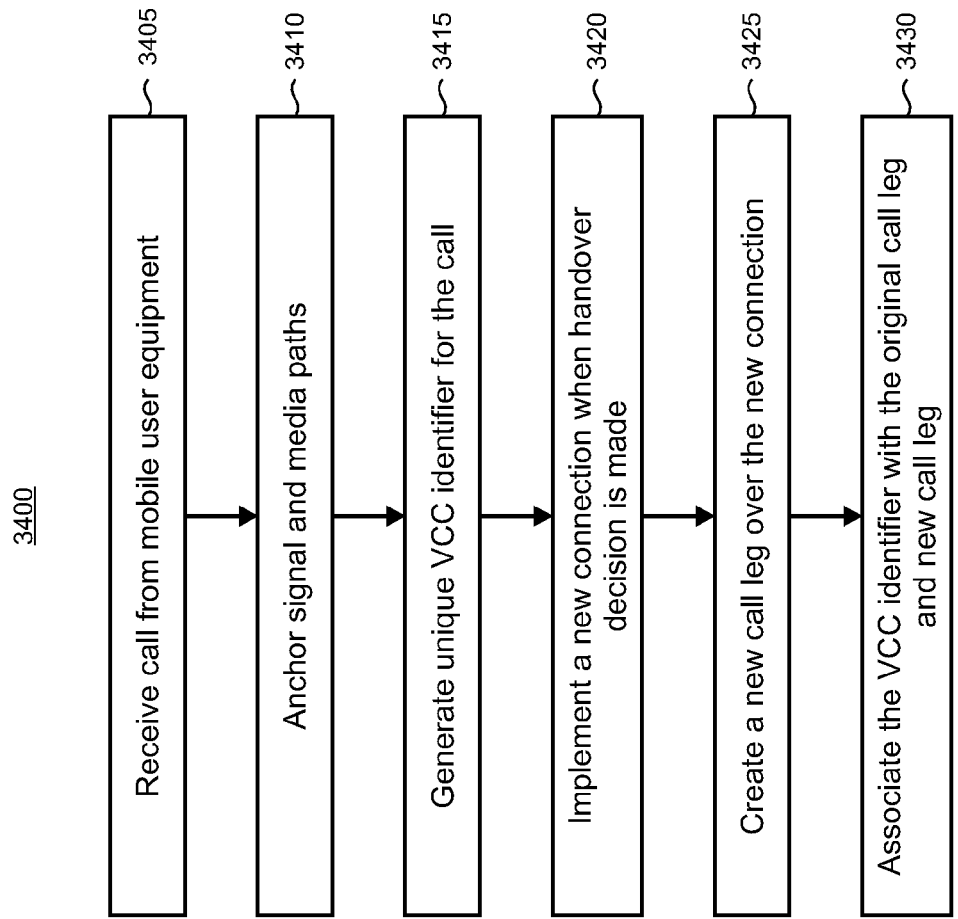
FIGS. 34-36 show various illustrative methods involving voice call continuity over a hybrid network.

FIG. 34 is a flowchart of an illustrative method 3400 for providing voice call continuity in a hybrid network that comprises loosely coupled network portions. In some implementations, the network portions include at least an MO network and a VoIP network. At block 3405, a call is received from mobile user equipment that accesses the hybrid network over a connection to one of the network portions. At block 3410, both a media path and a signal path for the call are anchored in the VoIP network without regard to the call's point of origin or termination in the hybrid network. At block 3415, a VCC identifier is generated for the call in which the VCC identifier is unique for each call on the mobile user equipment. At block 3420, a new call connection is implemented upon a handover decision being made. At block 3425, a new call leg is created over the new connection. At block 3430, the VCC identifier is associated with each of the original call leg and new call leg so that the legs can be connected at a common port in the VoIP network.

Figure 35:
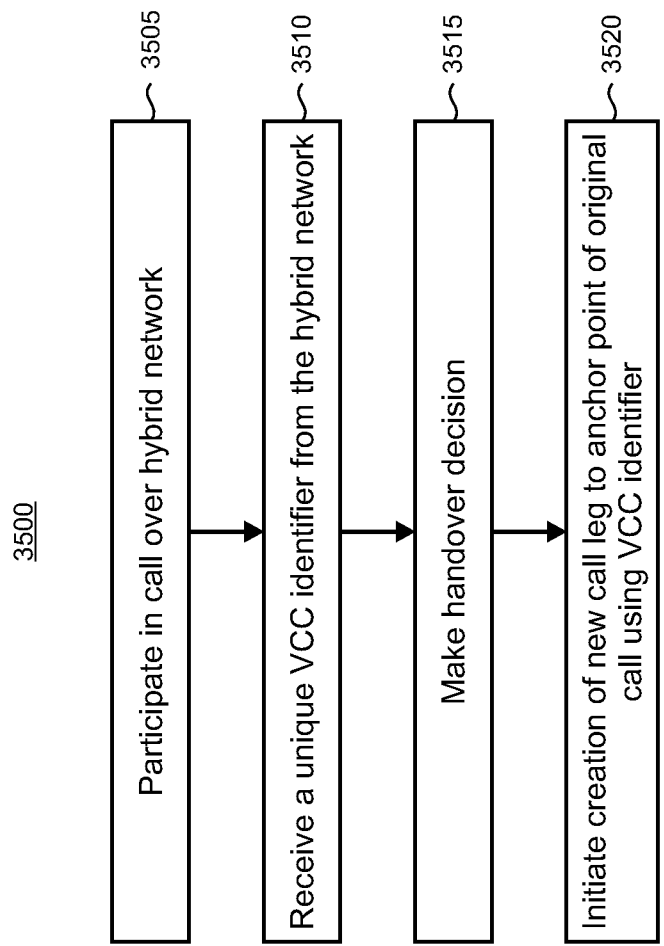

FIG. 35 is a flowchart of an illustrative method 3500 that may be performed by a voice call continuity client that is instantiated on mobile user equipment. At block 3505, the mobile user equipment participates in a call over a connection to a hybrid network that has loosely coupled portions including an MO network, a VoIP network, and a PSTN. The call includes an original call leg that is anchored in the VoIP network. At block 3510, a VCC identifier is received from the hybrid network. At block 3515, a handover decision is made to hand over the call to a new call leg. At block 3520, creation of a new call leg is initiated to the anchor point of the original call using the VCC identifier.

Figure 36:
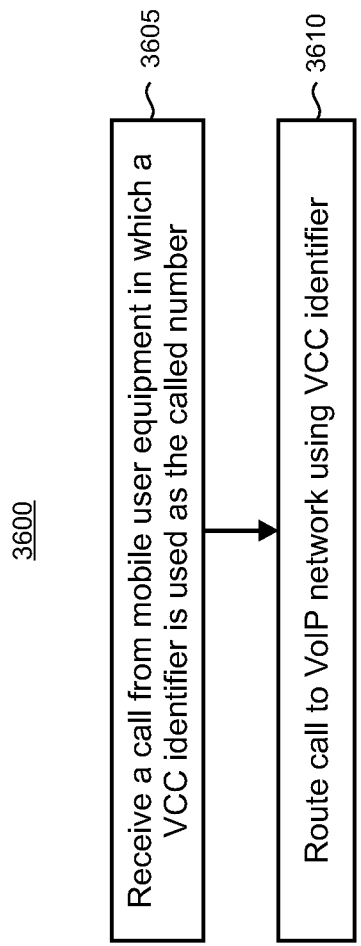

FIG. 36 is a flowchart of an illustrative method 3600 for operating an MO network portion of a hybrid network having two or more loosely coupled network portions. The network portions may include the MO network portion, a VoIP network portion, and a PSTN portion. At block 3605, a call is received from a mobile user equipment in which the mobile user equipment uses a voice call continuity identifier as the called number. The voice call continuity identifier is generated by the VoIP network portion of the hybrid network and identifies the VoIP network portion as the recipient of the call. At block 3610, the call is routed to a VoIP network portion of the hybrid network based on the voice call continuity identifier so that the call is anchored in the VoIP network.

Figure 37:
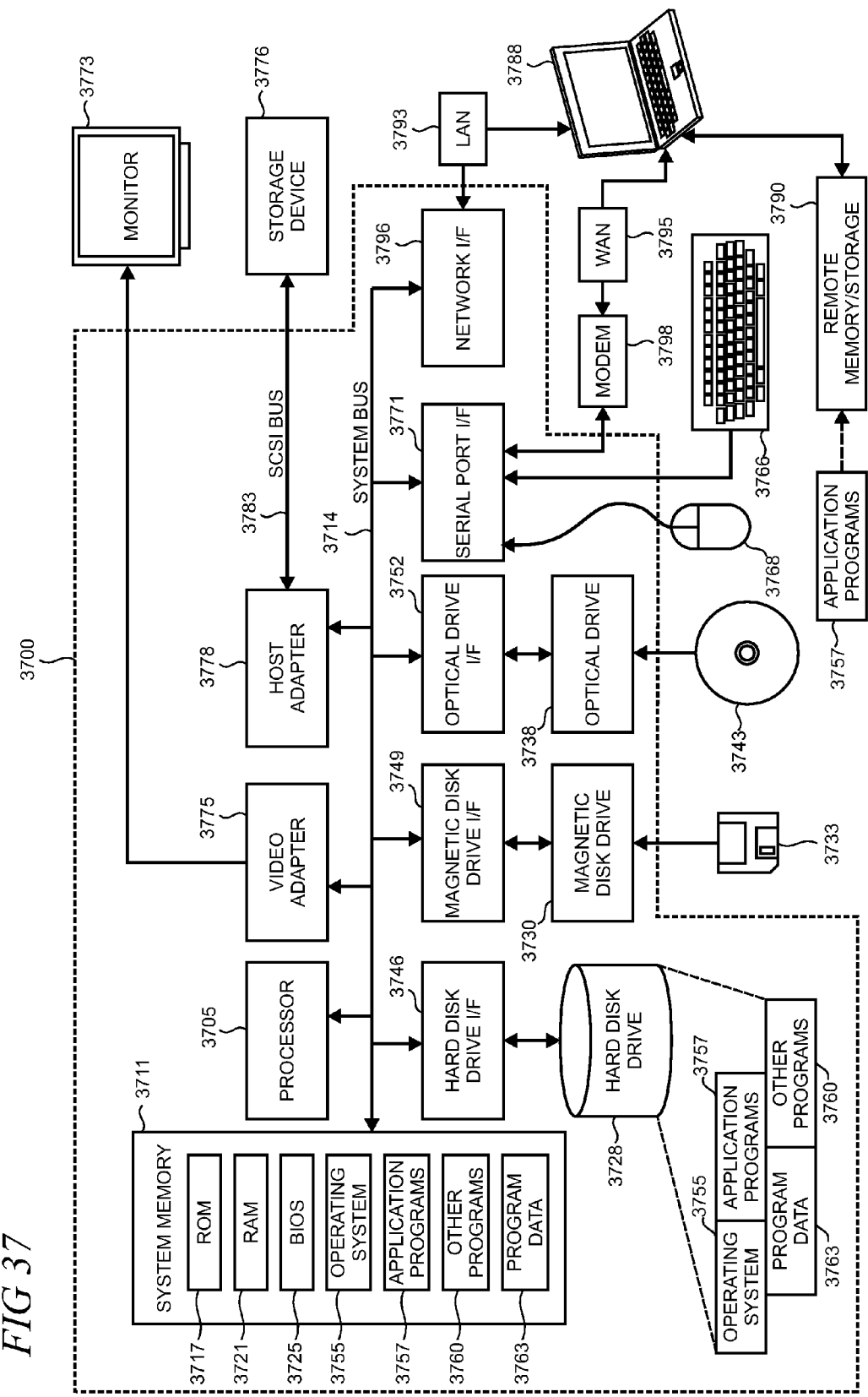
FIG. 37 is a simplified block diagram of an illustrative computer system such as a personal computer ("PC") that may be used in part to implement the present voice call continuity.

FIG. 37 is a simplified block diagram of an illustrative computer system 3700 such as a personal computer (PC), client machine, or server with which the present voice call continuity may be implemented. Computer system 3700 includes a processor 3705, a system memory 3711, and a system bus 3714 that couples various system components including the system memory 3711 to the processor 3705. The system bus 3714 may be any of several types of bus structures including a memory bus or memory controller, a peripheral bus, or a local bus using any of a variety of bus architectures. The system memory 3711 includes read only memory (ROM) 3717 and random access memory (RAM) 3721. A basic input/output system (BIOS) 3725, containing the basic routines that help to transfer information between elements within the computer system 3700, such as during startup, is stored in ROM 3717. The computer system 3700 may further include a hard disk drive 3728 for reading from and writing to an internally disposed hard disk (not shown), a magnetic disk drive 3730 for reading from or writing to a removable magnetic disk 3733 (e.g., a floppy disk), and an optical disk drive 3738 for reading from or writing to a removable optical disk 3743 such as a CD (compact disc), DVD (digital versatile disc), or other optical media. The hard disk drive 3728, magnetic disk drive 3730, and optical disk drive 3738 are connected to the system bus 3714 by a hard disk drive interface 3746, a magnetic disk drive interface 3749, and an optical drive interface 3752, respectively. The drives and their associated computer readable storage media provide non-volatile storage of computer readable instructions, data structures, program modules, and other data for the computer system 3700. Although this illustrative example shows a hard disk, a removable magnetic disk 3733, and a removable optical disk 3743, other types of computer readable storage media which can store data that is accessible by a computer such as magnetic cassettes, flash memory cards, digital video disks, data cartridges, random access memories (RAMs), read only memories (ROMs), and the like may also be used in some applications of the present voice call continuity. In addition, as used herein, the term computer readable storage medium includes one or more instances of a media type (e.g., one or more magnetic disks, one or more CDs, etc.). For purposes of this specification and the claims, the phrase "computer-readable storage medium" and variations thereof, does not include waves, signals, and/or other transitory and/or intangible communication media.

A number of program modules may be stored on the hard disk 3728, magnetic disk 3733, optical disk 3743, ROM 3717, or RAM 3721, including an operating system 3755, one or more application programs 3757, other program modules 3760, and program data 3763. A user may enter commands and information into the computer system 3700 through input devices such as a keyboard 3766 and pointing device 3768 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 3705 through a serial port interface 3771 that is coupled to the system bus 3714, but may be connected by other interfaces, such as a parallel port, game port, or universal serial bus ("USB"). A monitor 3773 or other type of display device is also connected to the system bus 3714 via an interface, such as a video adapter 3775. In addition to the monitor 3773, personal computers typically include other peripheral output devices (not shown), such as speakers and printers. The illustrative example shown in FIG. 37 also includes a host adapter 3778, a Small Computer System Interface (SCSI) bus 3783, and an external storage device 3776 connected to the SCSI bus 3783.

The computer system 3700 is operable in a networked environment using logical connections to one or more remote computers, such as a remote computer 3788. The remote computer 3788 may be selected as another personal computer, a server, a router, a network PC, a peer device, or other common network node, and typically includes many or all of the elements described above relative to the computer system 3700, although only a single representative remote memory/storage device 3790 is shown in FIG. 37. The logical connections depicted in FIG. 37 include a local area network ("LAN") 3793 and a wide area network ("WAN") 3795. Such networking environments are often deployed, for example, in offices, enterprise-wide computer networks, intranets, and the Internet.

When used in a LAN networking environment, the computer system 3700 is connected to the local area network 3793 through a network interface or adapter 3796. When used in a WAN networking environment, the computer system 3700 typically includes a broadband modem 3798, network gateway, or other means for establishing communications over the wide area network 3795, such as the Internet. The broadband modem 3798, which may be internal or external, is connected to the system bus 3714 via a serial port interface 3771. In a networked environment, program modules related to the computer system 3700, or portions thereof, may be stored in the remote memory storage device 3790. It is noted that the network connections shown in FIG. 37 are illustrative and other means of establishing a communications link between the computers may be used depending on the specific requirements of an application of voice call continuity in hybrid networks.

Figure 38:
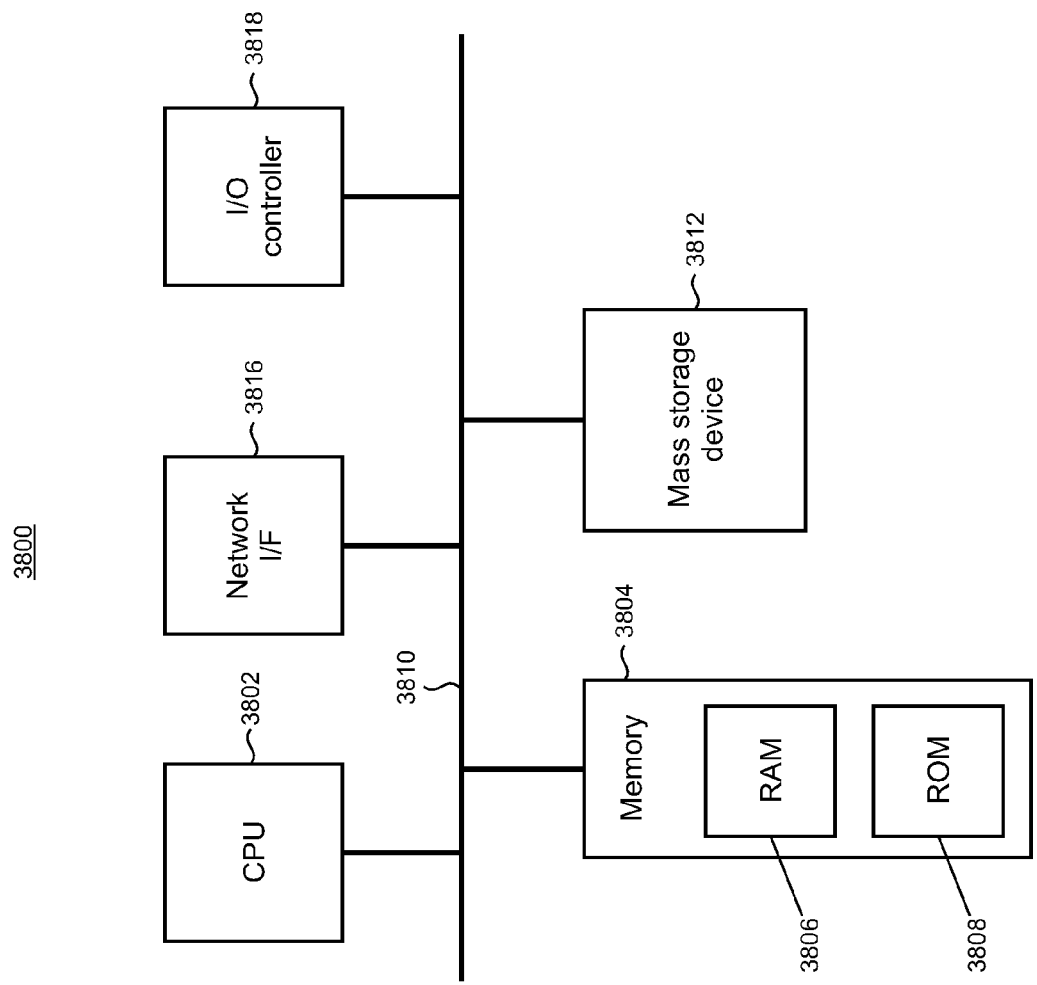
FIG. 38 shows a block diagram of an illustrative device that may be used in part to implement the present voice call continuity.

FIG. 38 shows an illustrative architecture 3800 for a device capable of executing the various components described herein for providing voice call continuity. Thus, the architecture 3800 illustrated in FIG. 38 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 3800 may be utilized to execute any aspect of the components presented herein.

The architecture 3800 illustrated in FIG. 38 includes a CPU 3802, a system memory 3804, including a RAM 3806 and a ROM 3808, and a system bus 3810 that couples the memory 3804 to the CPU 3802. A basic input/output system containing the basic routines that help to transfer information between elements within the architecture 3800, such as during startup, is stored in the ROM 3808. The architecture 3800 further includes a mass storage device 3812 for storing software code or other computer-executed code that is utilized to implement applications, the file system, and the operating system.

The mass storage device 3812 is connected to the CPU 3802 through a mass storage controller (not shown) connected to the bus 3810. The mass storage device 3812 and its associated computer-readable storage media provide non-volatile storage for the architecture 3800. Although the description of computer-readable storage media contained herein refers to a mass storage device, such as a hard disk or CD-ROM drive, it should be appreciated by those skilled in the art that computer-readable media can be any available computer storage media that can be accessed by the architecture 3800.

Although the description of computer-readable storage media contained herein refers to a mass storage device, such as a hard disk or CD-ROM drive, it should be appreciated by those skilled in the art that computer-readable storage media can be any available storage media that can be accessed by the architecture 3800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 3800.

According to various embodiments, the architecture 3800 may operate in a networked environment using logical connections to remote computers through a network. The architecture 3800 may connect to the network through a network interface unit 3816 connected to the bus 3810. It should be appreciated that the network interface unit 3816 also may be utilized to connect to other types of networks and remote computer systems. The architecture 3800 also may include an input/output controller 3818 for receiving and processing input from a number of other devices, including a keyboard, mouse, or electronic stylus (not shown in FIG. 38). Similarly, the input/output controller 3818 may provide output to a display screen, a printer, or other type of output device (also not shown in FIG. 38).

It should be appreciated that the software components described herein may, when loaded into the CPU 3802 and executed, transform the CPU 3802 and the overall architecture 3800 from a general-purpose computing system into a special-purpose computing system customized to facilitate the functionality presented herein. The CPU 3802 may be constructed from any number of transistors or other discrete circuit elements, which may individually or collectively assume any number of states. More specifically, the CPU 3802 may operate as a finite-state machine, in response to executable instructions contained within the software modules disclosed herein. These computer-executable instructions may transform the CPU 3802 by specifying how the CPU 3802 transitions between states, thereby transforming the transistors or other discrete hardware elements constituting the CPU 3802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 3800 in order to store and execute the software components presented herein. It also should be appreciated that the architecture 3800 may include other types of computing devices, including handheld computers, embedded computer systems, smartphones, PDAs, and other types of computing devices known to those skilled in the art. It is also contemplated that the architecture 3800 may not include all of the components shown in FIG. 38, may include other components that are not explicitly shown in FIG. 38, or may utilize an architecture completely different from that shown in FIG. 38.

Figure 39:
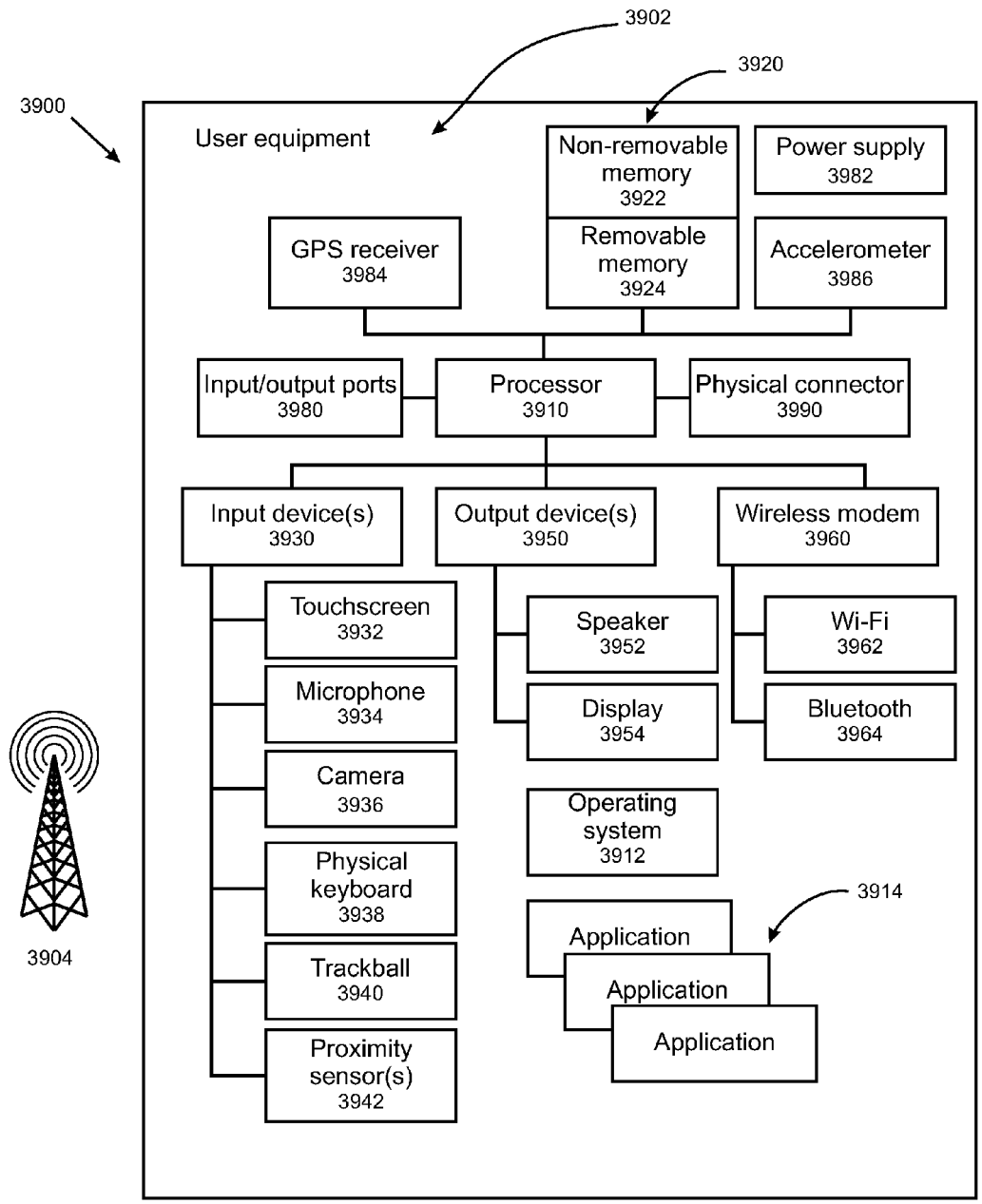
FIG. 39 is a block diagram of an illustrative user equipment such as a mobile phone.

FIG. 39 is a functional block diagram of an illustrative user equipment 3900 or mobile device such as a mobile phone or smartphone including a variety of optional hardware and software components, shown generally at 3902. Any components 3902 in the mobile device can communicate with any other component, although, for ease of illustration, not all connections are shown. The mobile device can be any of a variety of computing devices (e.g., cell phone, smartphone, handheld computer, Personal Digital Assistant (PDA), etc.) and can allow wireless two-way communications with one or more mobile communication networks 3904, such as a cellular or satellite network.

The illustrated mobile device 3900 can include a controller or processor 3910 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 3912 can control the allocation and usage of the components 3902, including power states, above-lock states, and below-lock states, and provides support for one or more application programs 3914. The application programs can include common mobile computing applications (e.g., image-capture applications, email applications, calendars, contact managers, web browsers, messaging applications), or any other computing application.

The illustrated mobile device 3900 can include memory 3920. Memory 3920 can include non-removable memory 3922 and/or removable memory 3924. The non-removable memory 3922 can include RAM, ROM, flash memory, a hard disk, or other well-known memory storage technologies. The removable memory 3924 can include flash memory or a Subscriber Identity Module (SIM) card, which is well known in GSM (Global System for Mobile communications) systems, or other well-known memory storage technologies, such as "smart cards." The memory 3920 can be used for storing data and/or code for running the operating system 3912 and the application programs 3914. Example data can include web pages, text, images, sound files, video data, or other data sets to be sent to and/or received from one or more network servers or other devices via one or more wired or wireless networks.

The memory 3920 may also be arranged as, or include, one or more computer-readable storage media implemented in any method or technology for storage of information such as computer-readable instructions, data structures, program modules or other data. For example, computer-readable media includes, but is not limited to, RAM (random access memory), ROM (read only memory), EPROM (erasable programmable read only memory), EEPROM (electrically erasable programmable read only memory), Flash memory or other solid state memory technology, CD-ROM (compact-disc ROM), DVD, (Digital Versatile Disc) HD-DVD (High Definition DVD), BLU-RAY, or other optical storage, magnetic cassettes, magnetic tape, magnetic disk storage or other magnetic storage devices, or any other medium which can be used to store the desired information and which can be accessed by the mobile device 3900.

The memory 3920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 3900 can support one or more input devices 3930; such as a touch screen 3932; microphone 3934 for implementation of voice input for voice recognition, voice commands and the like; camera 3936; physical keyboard 3938; trackball 3940; and/or proximity sensor 3942; and one or more output devices 3950, such as a speaker 3952 and one or more displays 3954. Other input devices (not shown) using gesture recognition may also be utilized in some cases. Other possible output devices (not shown) can include piezoelectric or haptic output devices. Some devices can serve more than one input/output function. For example, touch screen 3932 and display 3954 can be combined into a single input/output device.

A wireless modem 3960 can be coupled to an antenna (not shown) and can support two-way communications between the processor 3910 and external devices, as is well understood in the art. The modem 3960 is shown generically and can include a cellular modem for communicating with the mobile communication network 3904 and/or other radio-based modems (e.g., Bluetooth 3964 or Wi-Fi 3962). The wireless modem 3960 is typically configured for communication with one or more cellular networks, such as a GSM network for data and voice communications within a single cellular network, between cellular networks, or between the mobile device and a public switched telephone network (PSTN).

The mobile device can further include at least one input/output port 3980, a power supply 3982, a satellite navigation system receiver 3984, such as a Global Positioning System (GPS) receiver, an accelerometer 3986, a gyroscope (not shown), and/or a physical connector 3990, which can be a USB port, IEEE 1394 (FireWire) port, and/or an RS-232 port. The illustrated components 3902 are not required or all-inclusive, as any components can be deleted and other components can be added.

Based on the foregoing, it should be appreciated that technologies for providing and using voice call continuity in hybrid networks have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for providing voice call continuity in a hybrid network comprising loosely coupled network portions, the network portions including at least a mobile operator network and a VoIP (Voice over Internet Protocol) network, the method comprising the steps of:
   receiving a call from a mobile user equipment that accesses the hybrid network over a connection to one of the network portions;
   anchoring both a media path and a signal path for the call in the VoIP network irrespective of the call's point of origin or point of termination in the hybrid network, the anchored call including an original call leg;
   generating a voice call continuity identifier for the call, the voice call continuity identifier being unique for each call on the mobile user equipment;
   upon initiation of a decision to perform a handover, implementing a new connection to one of the network portions;
   creating a new call leg over the new connection; and
   associating the voice call continuity identifier with each of the original call leg and new call leg so that the legs are connectable at a common port in the VoIP network.

2. The method of claim 1 further including a step of connecting a media stream for the new call leg to a media stream of the original call leg at a common port in the VoIP network by using the voice call continuity identifier.

3. The method of claim 1 further including a step of terminating the original call leg to complete the handover.

4. The method of claim 3 further including a step of determining the new leg's stability prior to terminating the original call leg.

5. The method of claim 1 further including a step of utilizing a plurality of media servers to anchor the media path for the call, the media servers being one of media relay or conference bridge.

6. The method of claim 5 further including a step of holding a state for ports on the media server for a predetermined time interval after terminating the original call leg.

7. The method of claim 1 further including a step of communicating the voice call continuity identifier to the mobile user equipment for saving in a local call context, the communicating being performed during an initial call setup or a time during the call's lifetime.

8. The method of claim 1 in which the hybrid network further includes a PSTN (Public Switched Telephone Network) portion.

9. The method of claim 1 in which the voice call continuity identifier has a format of standard telephone number or a format of a URI/URL (Uniform Resource Identifier/Uniform Resource Locator).

10. The method of claim 1 further including a step of storing the voice call continuity identifier in a call context store associated with the VoIP network, the call context store comprising either a monolithic or distributed storage substrate.

11. The method of claim 1 further including a step of maintaining the original call leg and new call leg simultaneously so that parallel media paths between call ends are implemented.

12. The method of claim 11 further including a step of directing media flows over the parallel paths so as to minimize perception of interruption during the handover.

13. The method of claim 1 further including a step of performing one or more mid-call treatments comprising generating an audible indicator to be played at a far end user equipment to indicate status of the call during handover and recording portions of the call for playback, the playback being at either normal or accelerated speed.

14. A mobile user equipment, comprising:
- at least one processor; and
- memory operatively coupled to the processor and storing computer-readable instructions that, when executed by the at least one processor, implement a voice call continuity client that performs a method comprising the steps of:
  - participating in a call over a connection to a hybrid network having loosely coupled network portions including a mobile operator network, a VoIP (Voice over Internet Protocol) network, and a PSTN (Public Switched Telephone Network), the call including an original call leg that is anchored in the VoIP network,
  - receiving a voice call continuity (VCC) identifier from the hybrid network, the VCC identifier being unique for each active and on-hold call on the mobile user equipment;
  - making a handover decision to hand over the call to a new call leg, and
  - initiating creation of a new call leg to the anchor point of the original call using the voice call continuity identifier.

15. The mobile user equipment of claim 14 in which the method further includes a step of assessing one of connection, network, or environmental conditions when making the handover decision.

16. The mobile user equipment of claim 14 in which the method further includes a step of storing the voice call continuity identifier in a local call context.

17. The mobile user equipment of claim 14 in which the method further includes a step of selecting a new connection for the new call leg, the selected connection offering one of lower cost compared to a current connection or improved call quality compared to the current connection.

18. A method of operating a mobile operator network portion of a hybrid network having two or more loosely coupled network portions comprising at least two of mobile operator network portion, a VoIP (Voice over Internet Protocol) network portion, or a PSTN (Public Switched Telephone Network) portion, the method comprising the steps of:
- receiving a call from a mobile user equipment, the mobile user equipment using a voice call continuity identifier as the called number, the voice call continuity identifier being generated by a VoIP network portion of the hybrid network, being unique for each call on the mobile user equipment, and identifying the VoIP network portion as the recipient of the call; and
- routing a call to the VoIP network portion of the hybrid network based on the voice call continuity identifier so that the call is anchored in the VoIP network.

19. The method of claim 18 in which the voice call continuity identifier is not associated with a callable device or service on the hybrid network other than the VoIP network portion.

20. The method of claim 18 in which both signaling and media paths of the call are anchored in the VoIP network.

* * * * *